(12) United States Patent
Fujii

(10) Patent No.: US 11,750,068 B2
(45) Date of Patent: Sep. 5, 2023

(54) ELECTRIC WORK MACHINE

(71) Applicant: MAKITA CORPORATION, Anjo (JP)

(72) Inventor: Fuminari Fujii, Anjo (JP)

(73) Assignee: MAKITA CORPORATION, Anjo (JP)

( * ) Notice: Subject to any disclaimer, the term of this patent is extended or adjusted under 35 U.S.C. 154(b) by 63 days.

(21) Appl. No.: 17/323,565

(22) Filed: May 18, 2021

(65) Prior Publication Data

US 2022/0006362 A1 Jan. 6, 2022

(30) Foreign Application Priority Data

Jul. 2, 2020 (JP) ................................ 2020-114928

(51) Int. Cl.
| | |
|---|---|
| *H02K 11/21* | (2016.01) |
| *H02K 1/18* | (2006.01) |
| *H02K 3/28* | (2006.01) |
| *H02K 3/32* | (2006.01) |
| *H02K 7/14* | (2006.01) |
| *H02K 1/2795* | (2022.01) |

(52) U.S. Cl.
CPC .............. *H02K 11/21* (2016.01); *H02K 1/182* (2013.01); *H02K 1/2795* (2022.01); *H02K 3/28* (2013.01); *H02K 3/32* (2013.01); *H02K 7/145* (2013.01)

(58) Field of Classification Search
CPC .......... H02K 11/00; H02K 11/21; H02K 7/00; H02K 7/14; H02K 7/145; H02K 5/00; H02K 5/22; H02K 5/225; H02K 3/00; H02K 3/28; H02K 3/32; H02K 3/34; H02K 29/00; H02K 29/08
See application file for complete search history.

(56) References Cited

U.S. PATENT DOCUMENTS

| | | | | |
|---|---|---|---|---|
| 4,604,665 | A | * 8/1986 | Muller | ................... H02K 7/086 |
| | | | | 310/67 R |
| 2009/0261693 | A1* | 10/2009 | Debrailly | ............. F16C 35/067 |
| | | | | 310/68 B |
| 2019/0101416 | A1* | 4/2019 | Kobayashi | ........... G01D 5/2451 |

FOREIGN PATENT DOCUMENTS

| | | | | |
|---|---|---|---|---|
| DE | 102015213043 | * | 1/2017 | ............. H02K 11/25 |
| JP | 5512781 | B2 | 6/2014 | |

* cited by examiner

*Primary Examiner* — Tran N Nguyen
(74) *Attorney, Agent, or Firm* — Oliff PLC

(57) ABSTRACT

An electric work machine includes a smaller motor. An electric work machine includes a motor including a stator and a rotor rotatable about a rotation axis, and a sensor board including a rotation sensor that detects rotation of the rotor and a plate supporting the rotation sensor. The plate includes a first surface facing an end face of the rotor in an axial direction parallel to the rotation axis and a support area receiving the rotation sensor that faces the end face, and a second surface facing at least a part of the stator. In the axial direction, a distance between the support area and the end face is shorter than a distance between at least a part of the second surface and the end face.

19 Claims, 41 Drawing Sheets

ELECTRIC WORK MACHINE

CROSS-REFERENCE TO RELATED APPLICATIONS

This application claims the benefit of priority to Japanese Patent Application No. 2020-114928, filed on Jul. 2, 2020, the entire contents of which are hereby incorporated by reference.

BACKGROUND

1. Technical Field

The present disclosure relates to an electric work machine.

2. Description of the Background

In the technical field of electric work machines, a known power tool includes a motor and a sensor board as described in, for example, Japanese Patent No. 5512781.

BRIEF SUMMARY

Electric work machines are designed to include smaller motors. A large electric work machine including a large motor may be difficult to handle by an operator.

One or more aspects of the present disclosure are directed to an electric work machine including a smaller motor.

A first aspect of the present disclosure provides an electric work machine, including:
 a motor including a stator and a rotor, the rotor being rotatable about a rotation axis; and
 a sensor board including
  a rotation sensor configured to detect rotation of the rotor, and
  a plate supporting the rotation sensor, the plate including
   a first surface facing an end face of the rotor in an axial direction parallel to the rotation axis, the first surface including a support area receiving the rotation sensor that faces the end face of the rotor, and
   a second surface facing at least a part of the stator,
 wherein in the axial direction, a distance between the support area and the end face of the rotor is shorter than a distance between at least a part of the second surface and the end face of the rotor.

A second aspect of the present disclosure provides an electric work machine, including:
 a motor including
  a rotor rotatable about a rotation axis, and
  a stator including
   a stator core surrounding the rotor,
   an insulator fixed to the stator core,
   a coil fixed to the insulator, and
   a coil stopper radially inward from the coil and located on the insulator; and
 a sensor board including
  a rotation sensor configured to detect rotation of the rotor, and
  a plate supporting the rotation sensor,
 wherein the rotation sensor and at least a part of the coil stopper are aligned in an axial direction parallel to the rotation axis.

The electric work machine according to the above aspects of the present disclosure includes a smaller motor.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or upward and downward). The terms indicate relative positions or directions with respect to the center of an electric work machine.

An electric work machine includes a motor. In the embodiments, a direction parallel to a rotation axis AX of the motor is referred to as an axial direction for convenience. A direction radial from the rotation axis AX of the motor is referred to as a radial direction or radially for convenience. A direction about the rotation axis AX of the motor is referred to as a circumferential direction, circumferentially, or a rotation direction for convenience.

A position nearer the rotation axis AX of the motor in the radial direction, or a radial direction toward the rotation axis AX, is referred to as radially inward for convenience. A position farther from the rotation axis AX of the motor in the radial direction, or a radial direction away from the rotation axis AX, is referred to as radially outward for convenience. A position in one circumferential direction, or one circumferential direction, is referred to as a first circumferential direction for convenience. A position in the other circumferential direction, or the other circumferential direction, is referred to as a second circumferential direction for convenience.

First Embodiment

Electric Work Machine

Figure 1:
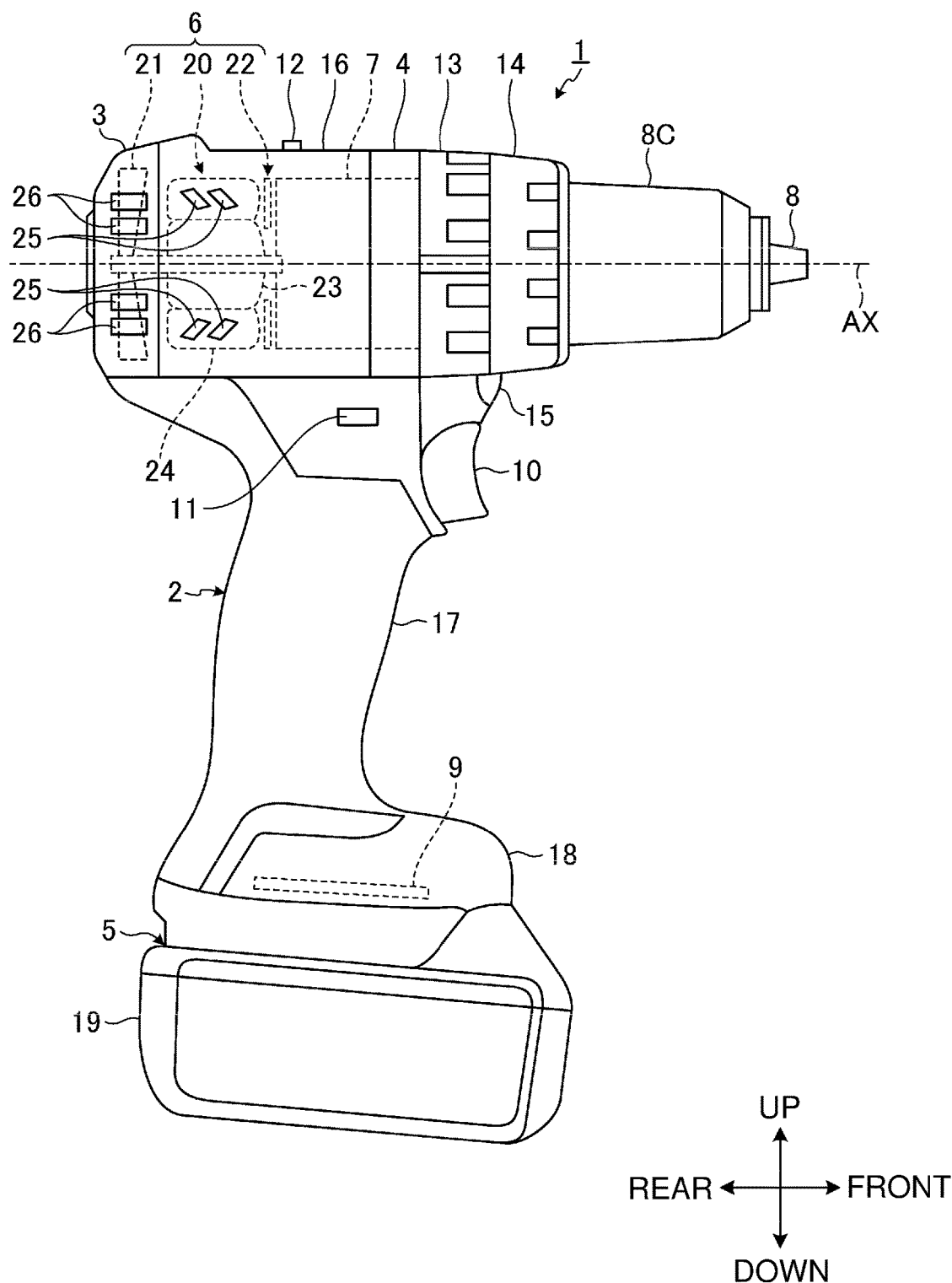
FIG. 1 is a side view of an electric work machine according to a first embodiment.

FIG. 1 is a side view of an electric work machine 1 according to the present embodiment. The electric work machine 1 according to the present embodiment is a vibration driver drill, which is an example of a power tool. As shown in FIG. 1, the electric work machine 1 includes a housing 2, a rear cover 3, a gear case 4, a battery mount 5, a motor assembly 6, a power transmission 7, a spindle 8, a controller 9, a trigger switch 10, a forward-reverse switch lever 11, a speed switch lever 12, a mode change ring 13, a change ring 14, and a lamp 15.

The housing 2 includes a motor compartment 16, a grip 17, and a controller compartment 18. The housing 2 is formed from a synthetic resin.

The motor compartment 16 accommodates at least a part of the motor assembly 6. The motor compartment 16 is cylindrical.

The grip 17 is gripped by an operator of the electric work machine 1. The grip 17 protrudes downward from a lower portion of the motor compartment 16.

The controller compartment 18 accommodates the controller 9. The controller compartment 18 is connected to the lower end of the grip 17. The controller compartment 18 has larger outer dimensions than the grip 17 in the front-rear and lateral directions.

The rear cover 3 is connected to the rear of the motor compartment 16 to cover a rear opening in the motor compartment 16. The rear cover 3 is formed from a synthetic resin.

The gear case 4 is connected to the front of the motor compartment 16. The gear case 4 accommodates at least a part of the power transmission 7. The gear case 4 is cylindrical. The gear case 4 is formed from a metal.

The battery mount 5 is located below the controller compartment 18. A battery pack 19 is attached to the battery mount 5 in a detachable manner. The battery pack 19 may be a secondary battery. The battery pack 19 in the present embodiment is a rechargeable lithium-ion battery. The battery pack 19 functions as a power supply for the electric work machine 1. The battery pack 19 is attached to the battery mount 5 to power the electric work machine 1.

The motor assembly 6 includes a motor 20, a fan 21, and a sensor unit 22. The motor 20 is a power source for the electric work machine 1. The motor 20 includes a rotor 23 and a stator 24. The rotor 23 rotates about a rotation axis AX. The fan 21 generates an airflow for cooling the motor 20. The fan 21 rotates with a rotational force generated by the motor 20. The sensor unit 22 detects rotation of the rotor 23. A detection signal from the sensor unit 22 is output to the controller 9.

The motor compartment 16 has inlets 25. The rear cover 3 has outlets 26. The outlets 26 are located rearward from the inlets 25. The inlets 25 connect the inside and the outside of the housing 2. The outlets 26 connect the inside and the outside of the housing 2. The inlets 25 are located on the right and the left of the motor compartment 16. The outlets 26 are located on the right and the left of the rear cover 3. As the fan 21 rotates, air outside the housing 2 flows into the internal space of the housing 2 through the inlets 25 and cools the motor 20. Air inside the housing 2 flows out of the housing 2 through the outlets 26.

The power transmission 7 transmits a rotational force generated by the motor 20 to the spindle 8. The power transmission 7 includes multiple gears.

The spindle 8 rotates about the rotation axis AX with a rotational force from the motor 20 transmitted from the power transmission 7. The spindle 8 has an insertion hole to receive a tip tool. A chuck unit 8C for holding a tip tool at least partially surrounds the spindle 8. The tip tool placed in the insertion hole in the spindle 8 is held by the chuck unit 8C.

The controller 9 controls the motor 20. The controller 9 controls a driving current supplied from the battery pack 19 to the motor 20 in response to a detection signal from the sensor unit 22. The controller 9 is accommodated in the controller compartment 18. The controller 9 includes a circuit board on which multiple electronic components are mounted. Examples of the electronic components mounted on the board include a processor such as a central processing unit (CPU), a nonvolatile memory such as a read-only memory (ROM) or a storage device, a volatile memory such as a random-access memory (RAM), a field-effect transistor (FET), and a resistor.

The trigger switch 10 is operable by the operator to drive the motor 20. The trigger switch 10 is located on an upper portion of the grip 17. The trigger switch 10 protrudes frontward from the upper front of the grip 17. The trigger switch 10 is operable by the operator to move rearward. The operator moves the trigger switch 10 rearward with, for example, a forefinger. This causes the trigger switch 10 to generate an operation signal. The operation signal from the trigger switch 10 is input into the controller 9. The controller 9 drives the motor 20 in response to the operation signal from the trigger switch 10. When the trigger switch 10 stops being operated, the motor 20 is stopped. The operator stops the motor 20 by stopping rearward movement of the trigger switch 10 performed with, for example, a forefinger.

The forward-reverse switch lever 11 is operable to switch the rotation direction of the motor 20 between forward and reverse. The forward-reverse switch lever 11 is located between the lower end of the motor compartment 16 and the upper end of the grip 17. The forward-reverse switch lever 11 is operable by the operator to move left or right. This operation switches the rotation direction of the motor 20, thus switching the rotation direction of the spindle 8.

The speed switch lever 12 is operable to switch the rotational speed of the spindle 8 between a first speed and a second speed. The speed switch lever 12 is located in an upper portion of the motor compartment 16. The speed switch lever 12 is moved frontward or rearward. This operation switches the rotational speed of the motor 20.

The mode change ring 13 changes the operation mode of the electric work machine 1. The mode change ring 13 is located frontward from the gear case 4. The mode change ring 13 is rotatable by the operator. The operation mode of the electric work machine 1 includes a vibration mode and a non-vibration mode. In the vibration mode, the spindle 8 vibrates in the axial direction. In the non-vibration mode, the spindle 8 does not vibrate in the axial direction. The non-vibration mode includes a drill mode and a clutch mode. In the drill mode, power transmission to the spindle 8 is enabled independently of a rotation load on the spindle 8. In the clutch mode, power transmission to the spindle 8 is disabled depending on a rotation load on the spindle 8.

The change ring 14 is operable to set a release value for disabling power transmission to the spindle 8. The change ring 14 is located frontward from the mode change ring 13. The change ring 14 is rotatable by the operator. The release value indicates a rotation load on the spindle 8. When the rotation load on the spindle 8 reaches the release value, the power transmission to the spindle 8 is disabled.

The lamp 15 emits illumination light to illuminate ahead of the electric work machine 1. The lamp 15 includes light-emitting diodes (LEDs). The lamp 15 is located at the upper front of the grip 17.

Motor Assembly

Figure 2:
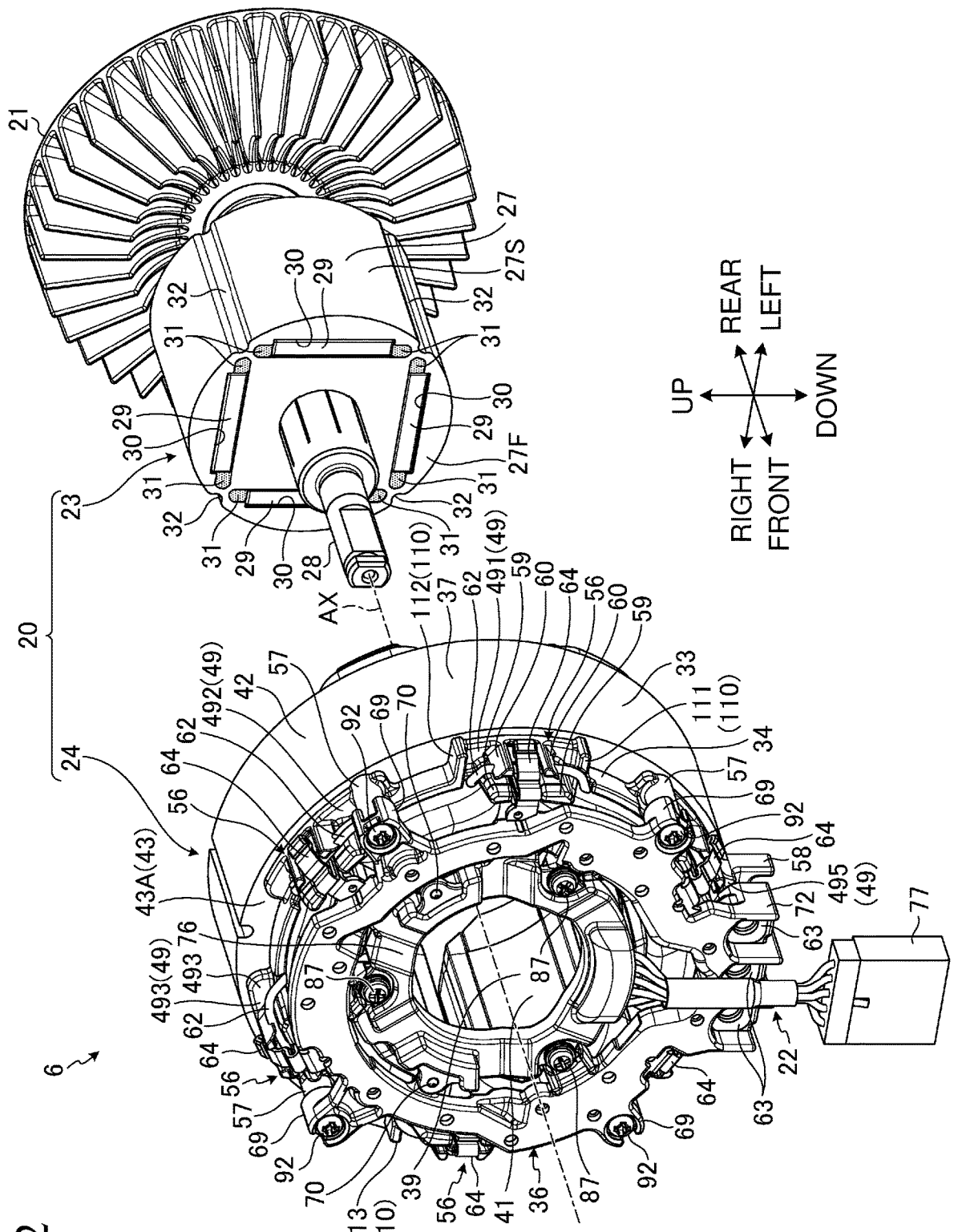
FIG. 2 is an exploded front perspective view of a motor assembly in the first embodiment.
Figure 3:
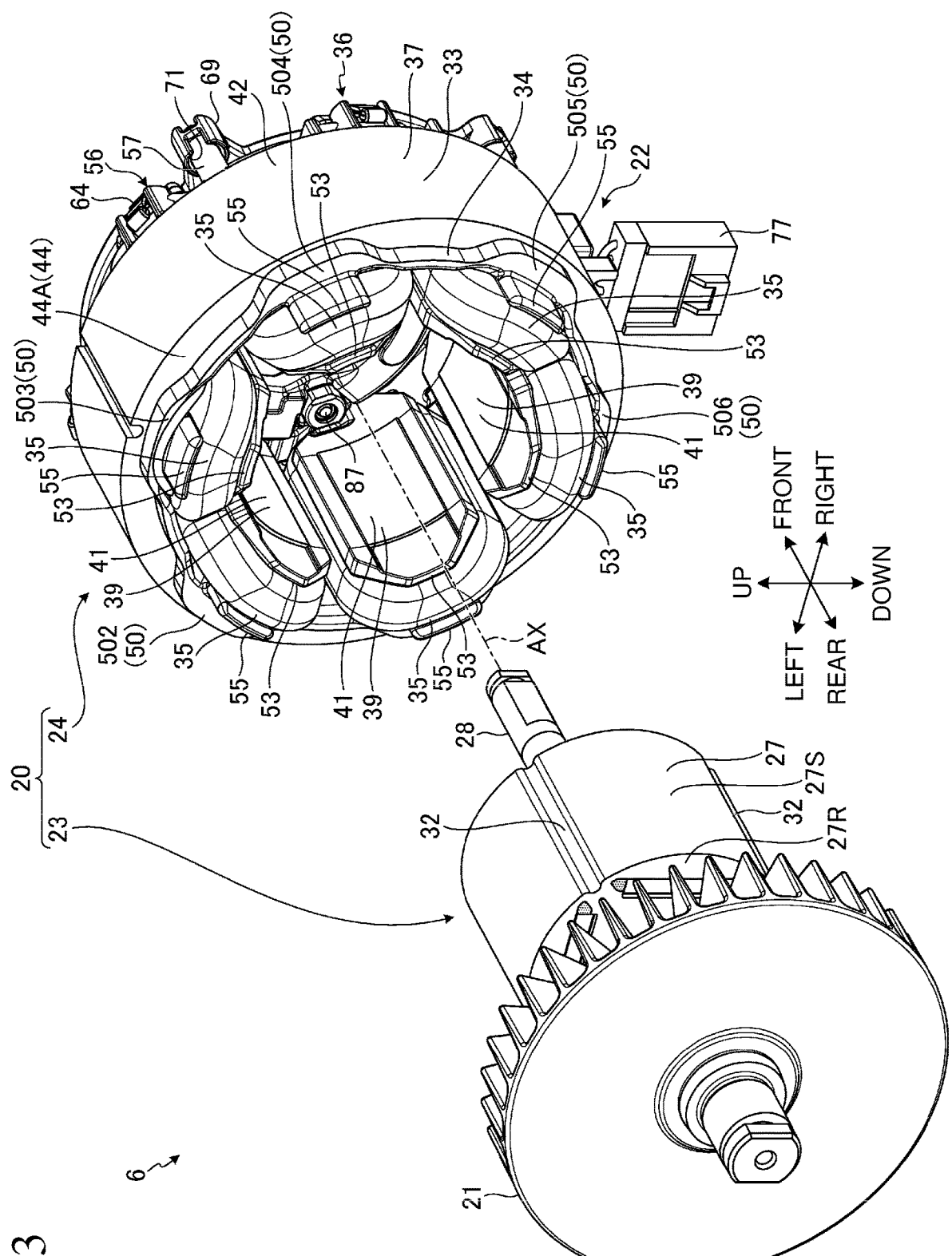
FIG. 3 is an exploded rear perspective view of the motor assembly in the first embodiment.

FIG. 2 is an exploded front perspective view of the motor assembly 6 in the present embodiment. FIG. 3 is an exploded rear perspective view of the motor assembly 6 in the present embodiment. The motor assembly 6 includes the motor 20, the fan 21, and the sensor unit 22.

In the present embodiment, the rotation axis AX of the motor 20 extends in the front-rear direction. The axial direction and the front-rear direction are parallel to each other. Hereafter, a first axial direction is referred to as the front and a second axial direction opposite to the first axial direction is referred to as the rear for convenience.

Motor

The motor 20 is driven by power supplied from the battery pack 19. The motor 20 generates a rotational force for rotating the spindle 8.

The motor 20 includes the rotor 23 and the stator 24. The rotor 23 rotates relative to the stator 24. The motor 20 in the present embodiment is a brushless inner-rotor motor. The stator 24 surrounds the rotor 23. The rotor 23 rotates about the rotation axis AX.

The rotor 23 includes a rotor core 27, a rotor shaft 28, and permanent magnets 29.

The rotor core 27 includes multiple steel plates stacked on one another. The steel plates are iron-based metal plates. The rotor core 27 surrounds the rotation axis AX. The rotor core 27 includes an end face 27F facing frontward, an end face 27R facing rearward, and an outer surface 27S facing radially outward.

The rotor shaft 28 extends in the axial direction. The rotor shaft 28 is located inside the rotor core 27. The rotor core 27 and the rotor shaft 28 are fixed to each other. The rotor shaft 28 has a front portion protruding frontward from the end face 27F of the rotor core 27. The rotor shaft 28 has a rear portion protruding rearward from the end face 27R of the rotor core 27. The rotor shaft 28 has the front portion rotatably supported by a front bearing (not shown). The rotor shaft 28 has the rear portion rotatably supported by a rear bearing (not shown). The rotor shaft 28 has its front end connected to the power transmission 7.

The permanent magnets 29 are held by the rotor core 27. In the present embodiment, four permanent magnets 29 surround the rotation axis AX. The permanent magnets 29 are fixed to the rotor core 27. The permanent magnets 29 are, for example, neodymium-iron-boron magnets. The permanent magnets 29 are plates embedded in the rotor core 27.

The motor 20 is an interior permanent magnet (IPM) motor. The rotor core 27 has magnet slots 30 extending in the axial direction. The permanent magnets 29 are placed in the respective magnet slots 30. Each permanent magnet 29 has a gap between its outer surface and an inner surface of the magnet slot 30 that is filled with a resin 31.

The rotor core 27 has recesses 32 extending in the axial direction on the outer surface 27S. The recesses 32 have their front ends connected to the end face 27F of the rotor core 27, and rear ends connected to the end face 27R of the rotor core 27. The recesses 32 are located on the outer surface 27S of the rotor core 27. In the present embodiment, four recesses 32 surround the rotation axis AX. The recesses 32 are located at circumferentially equal intervals to reduce noise caused by rotation of the rotor core 27. The recesses 32 may be eliminated.

The fan 21 generates an airflow for cooling the motor 20. The fan 21 is located rearward from the stator 24 and the rotor core 27. The fan 21 is fastened to a rear portion of the rotor shaft 28. The fan 21 at least partially faces the end face 27R of the rotor core 27. The fan 21 rotates with a rotational force generated by the motor 20. As the rotor shaft 28 rotates, the fan 21 rotates together with the rotor shaft 28.

Figure 4:
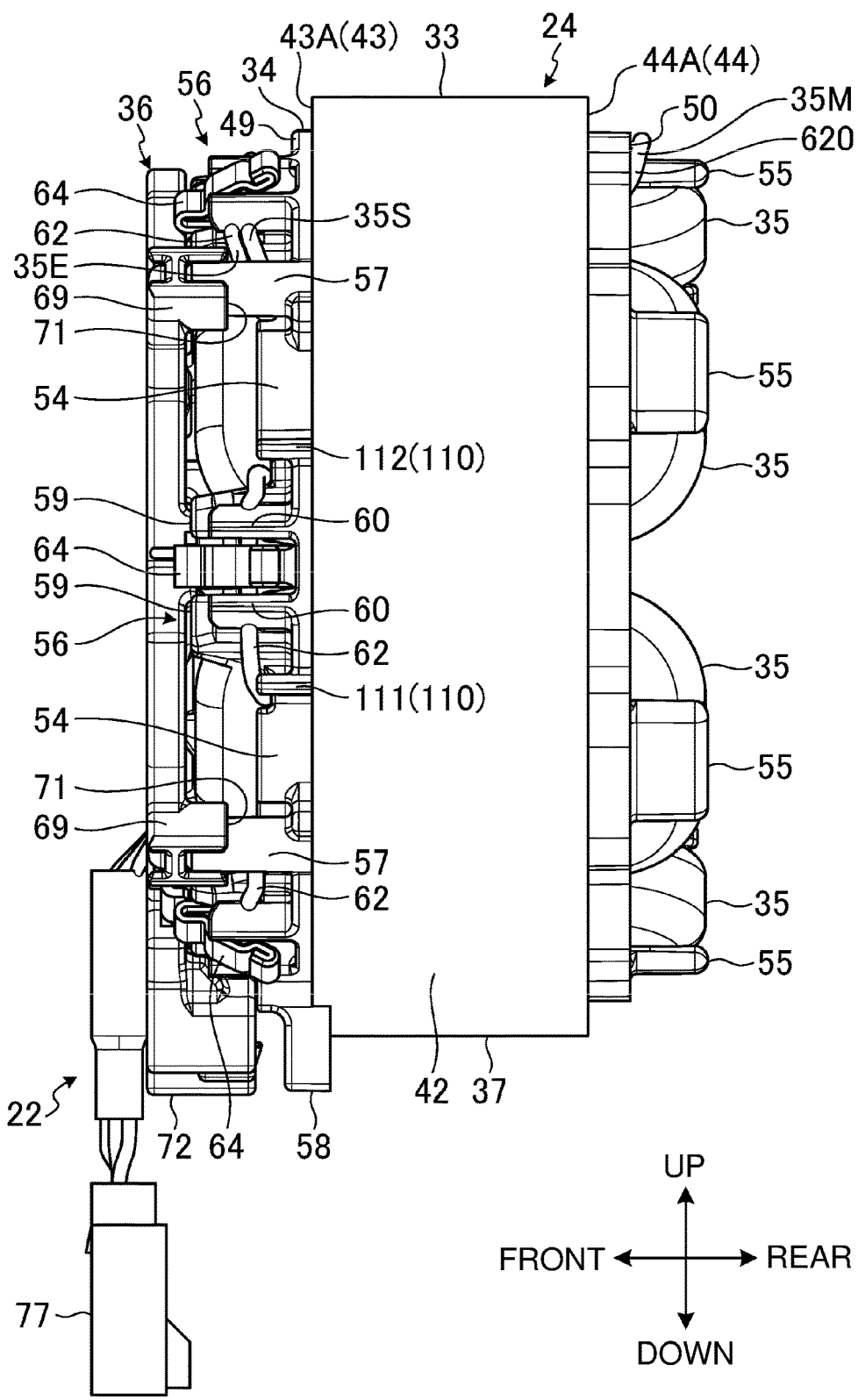
FIG. 4 is a left side view of a stator and a sensor unit in the first embodiment.
Figure 5:
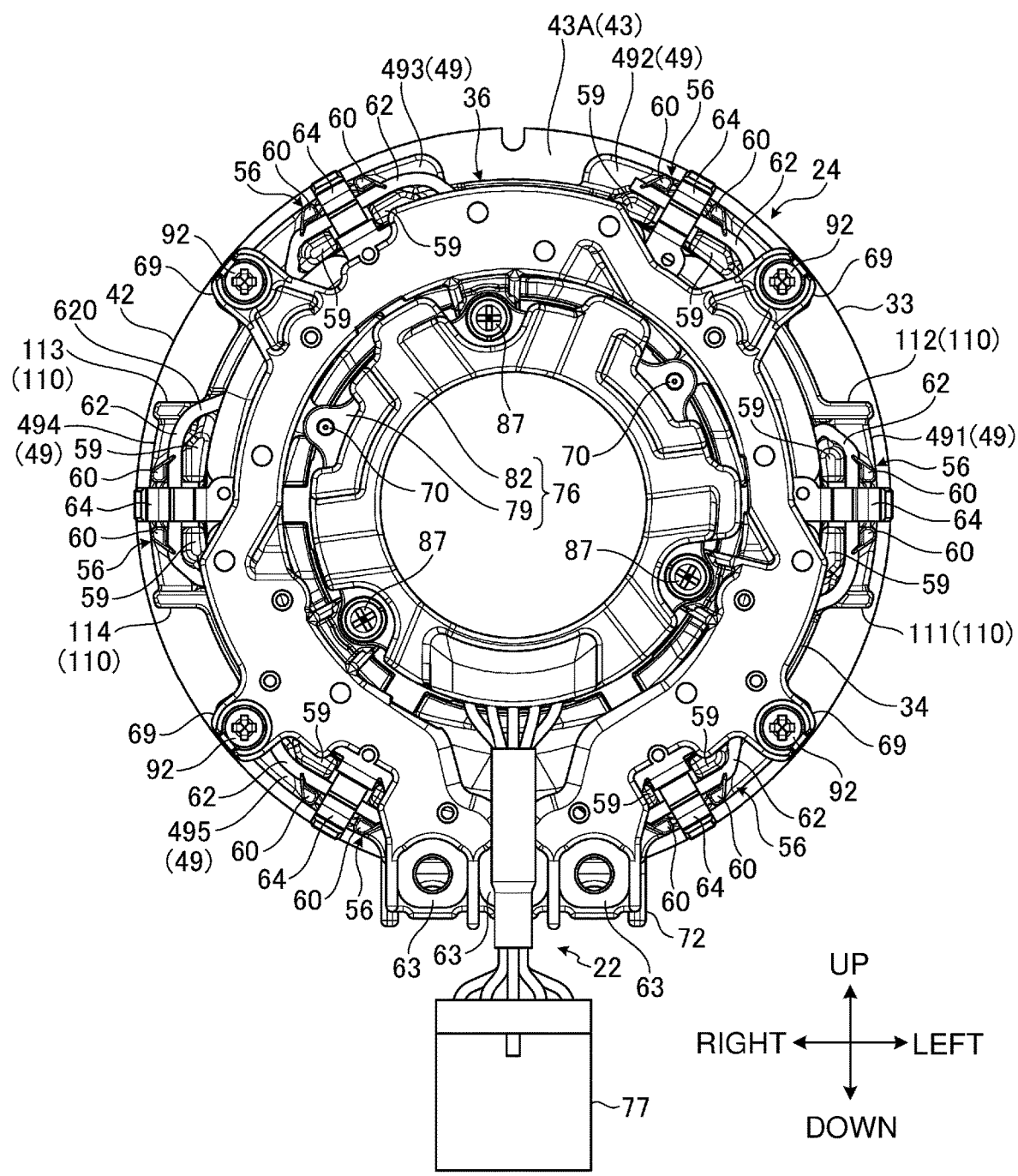
FIG. 5 is a front view of the stator and the sensor unit in the first embodiment.
Figure 6:
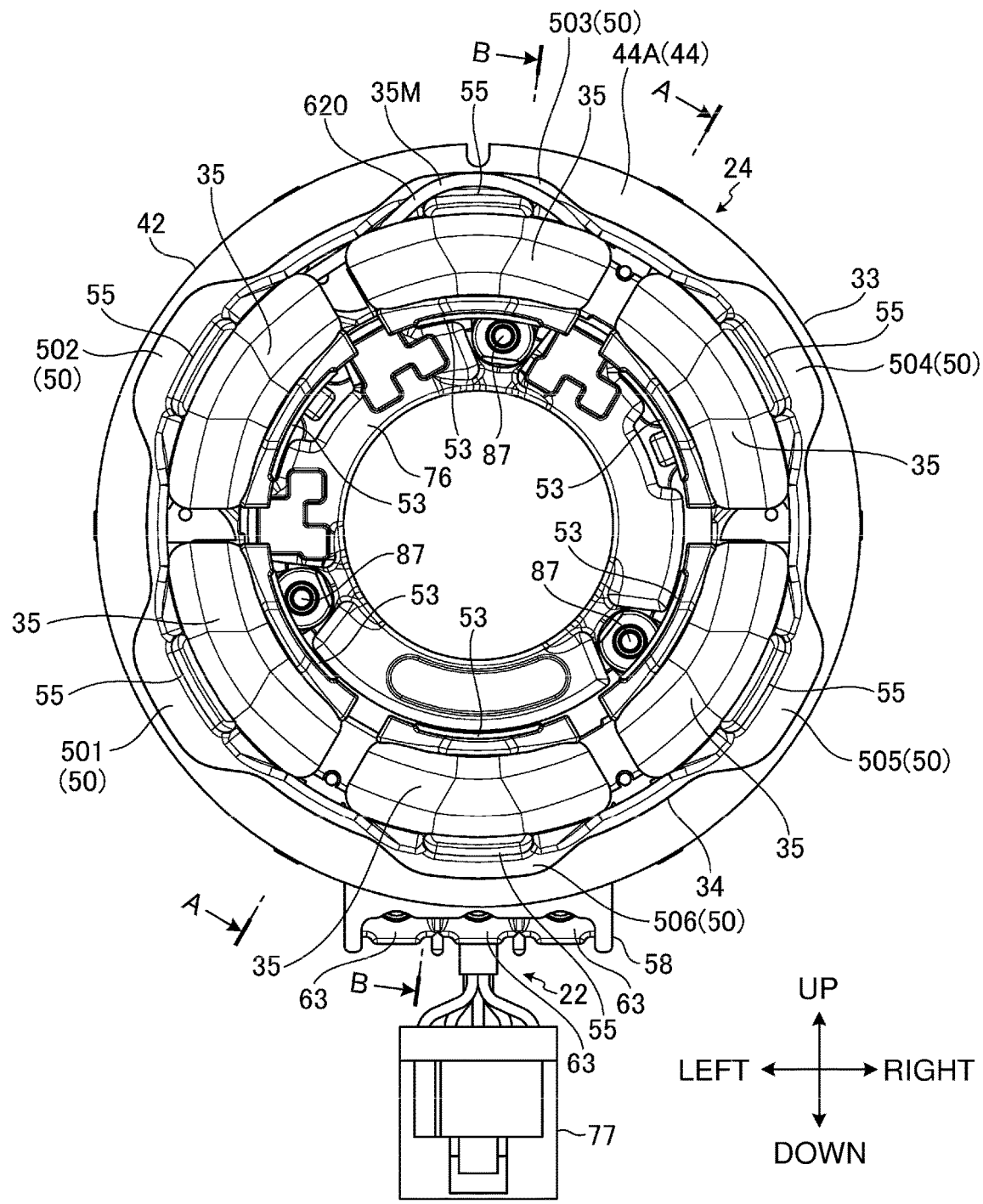
FIG. 6 is a rear view of the stator and the sensor unit in the first embodiment.
Figure 7:
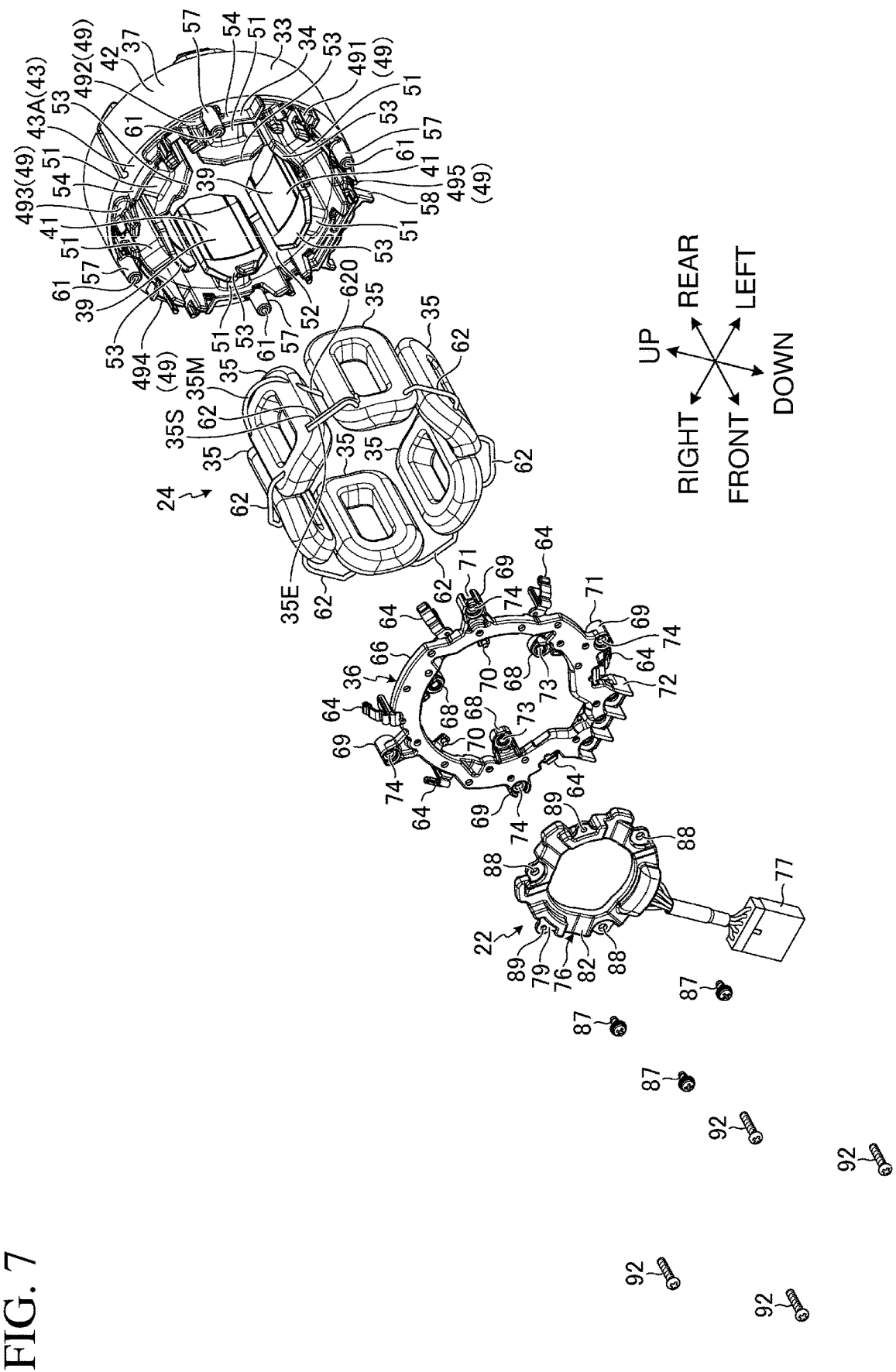
FIG. 7 is an exploded front perspective view of the stator and the sensor unit in the first embodiment.
Figure 8:
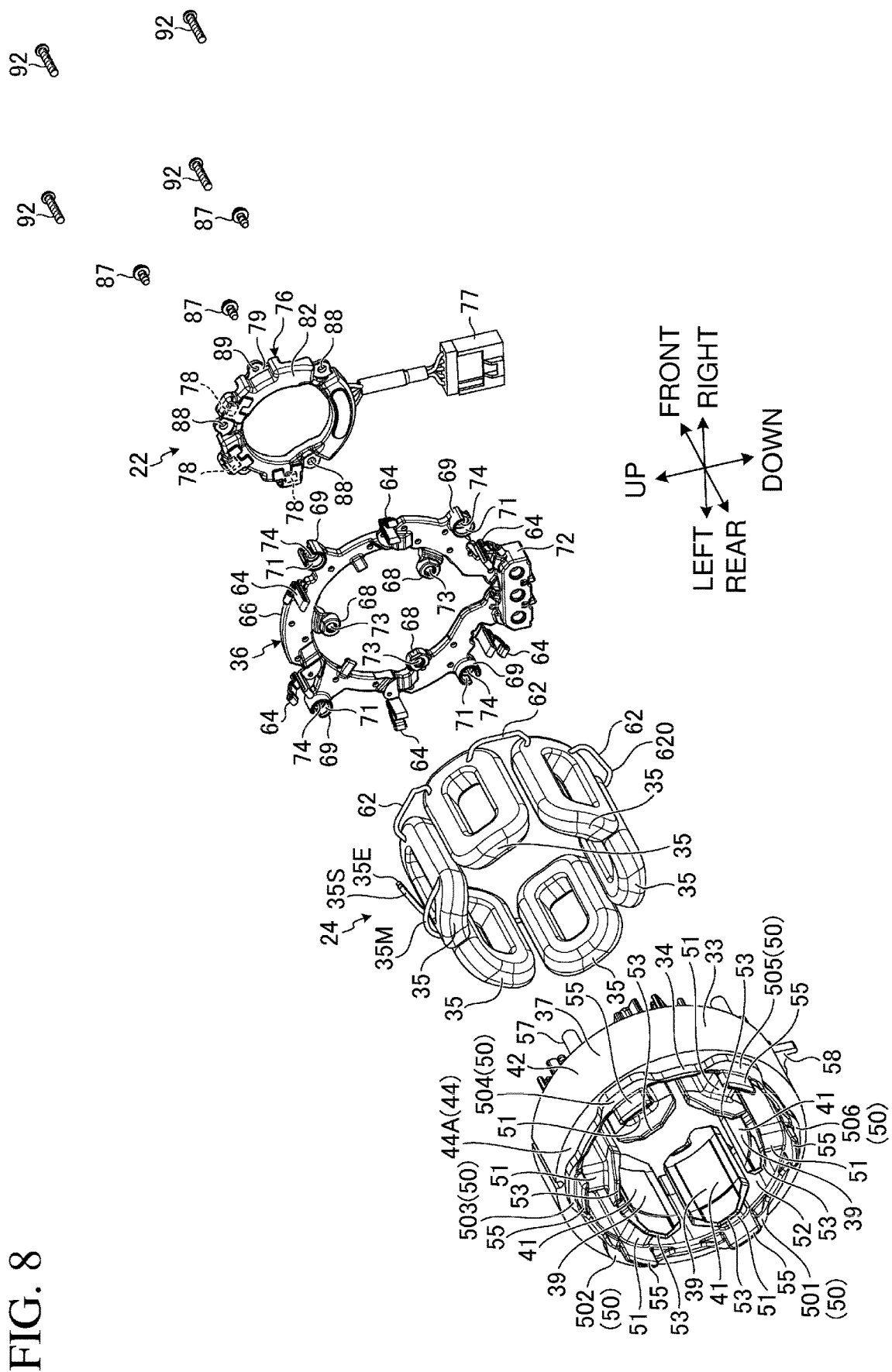
FIG. 8 is an exploded rear perspective view of the stator and the sensor unit in the first embodiment.

FIG. 4 is a left side view of the stator 24 and the sensor unit 22 in the present embodiment. FIG. 5 is a front view of the stator 24 and the sensor unit 22 in the present embodiment. FIG. 6 is a rear view of the stator 24 and the sensor unit 22 in the present embodiment. FIG. 7 is an exploded front perspective view of the stator 24 and the sensor unit 22 in the present embodiment. FIG. 8 is an exploded rear perspective view of the stator 24 and the sensor unit 22 in the present embodiment.

As shown in FIGS. 2 to 8, the stator 24 includes a stator core 33, an insulator 34, coils 35, and a busbar unit 36.

The stator core 33 includes multiple steel plates stacked on one another. The steel plates are iron-based metal plates. The stator core 33 surrounds the rotor core 27. The insulator 34 is an electrical insulating member formed from a synthetic resin. The insulator 34 is fixed to the stator core 33. The insulator 34 is integral with the stator core 33. The insulator 34 is fixed to the stator core 33 by, for example, insert molding. The stator 24 includes the multiple (six in the present embodiment) coils 35. The coils 35 are fixed to the insulator 34. The busbar unit 36 is fixed to the insulator 34.

Figure 9:
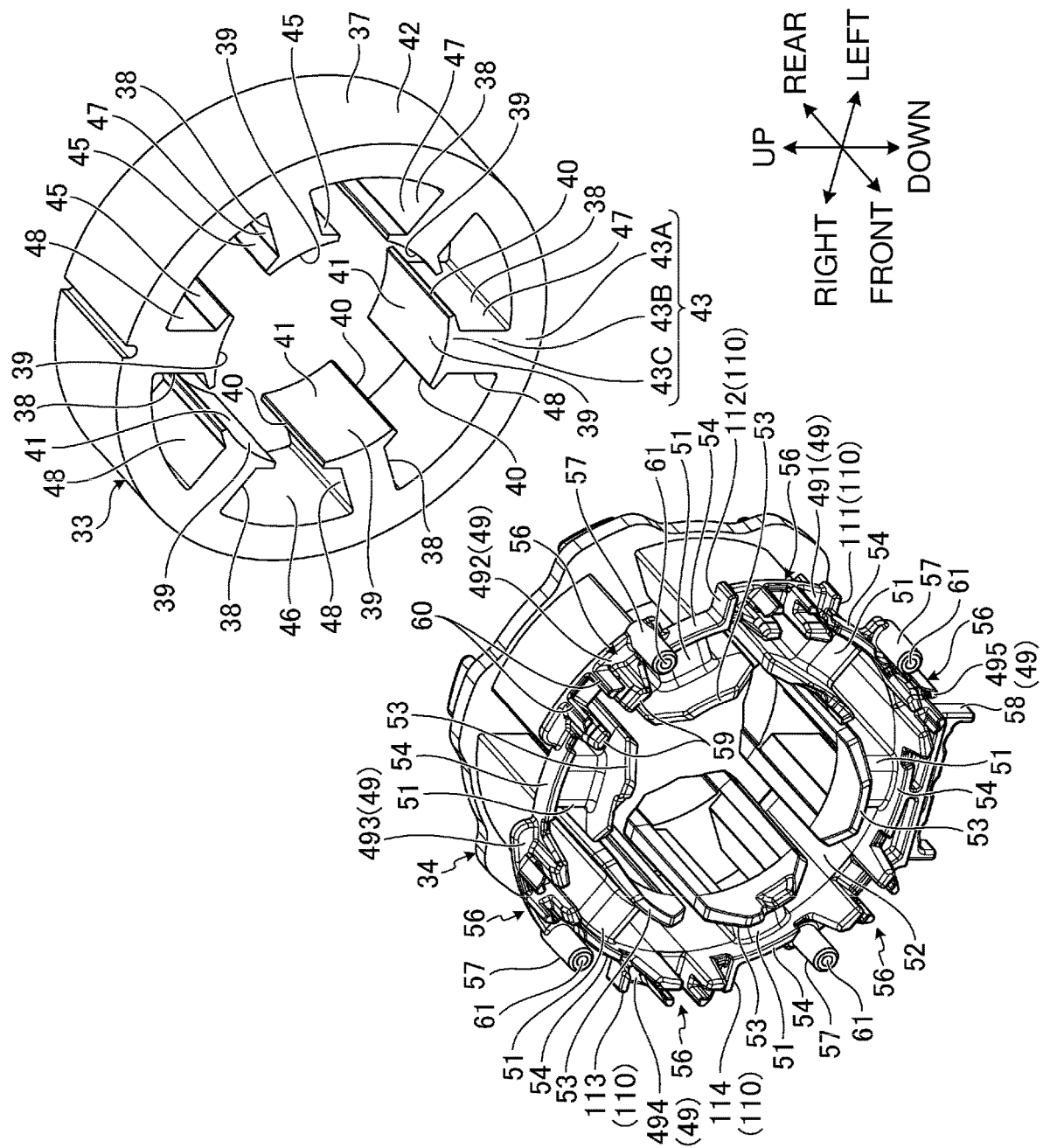
FIG. 9 is an exploded front perspective view of a stator core and an insulator in the first embodiment.
Figure 10:
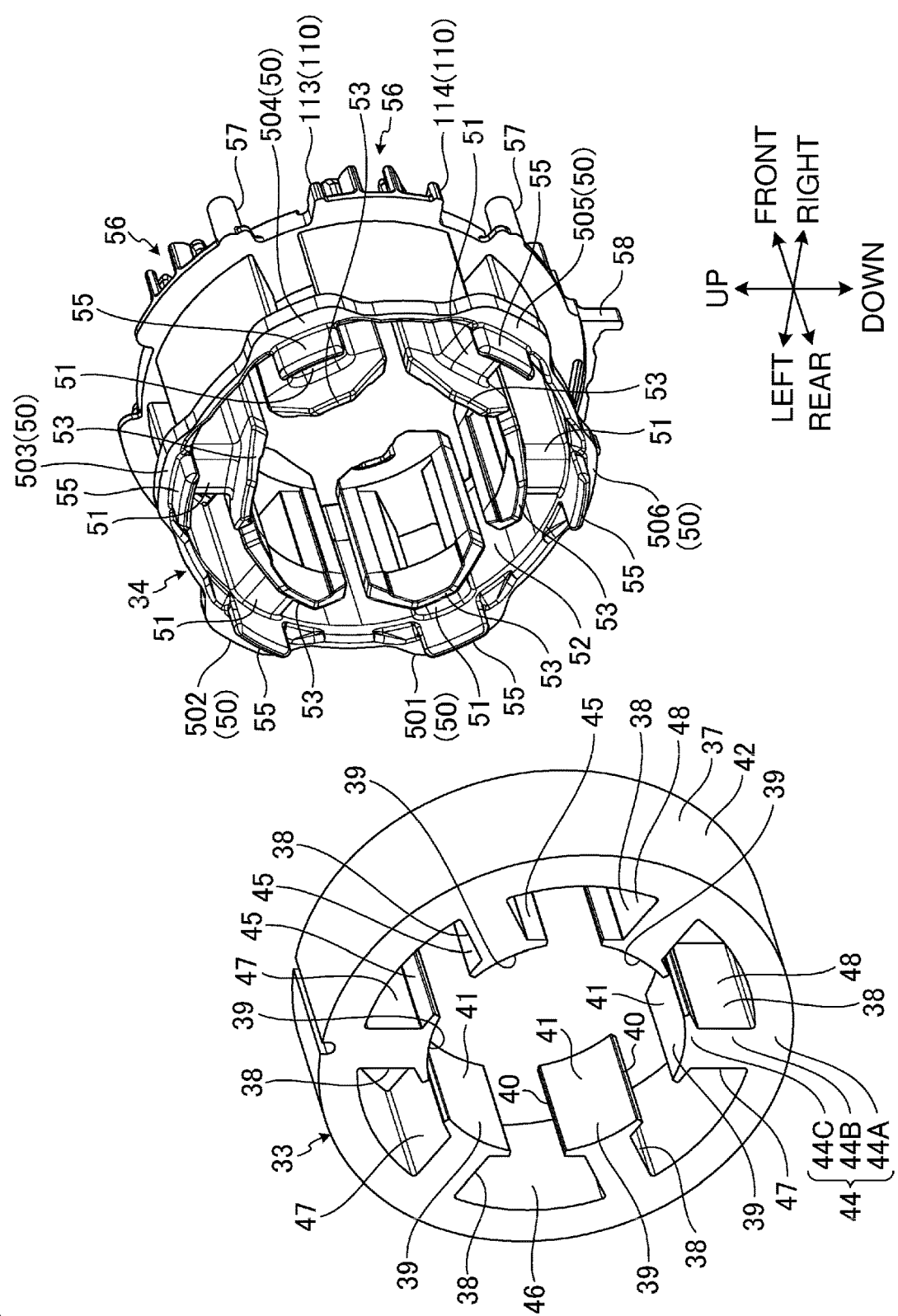
FIG. 10 is an exploded rear perspective view of the stator core and the insulator in the first embodiment.

FIG. 9 is an exploded front perspective view of the stator core 33 and the insulator 34 in the present embodiment. FIG. 10 is an exploded rear perspective view of the stator core 33 and the insulator 34 in the present embodiment.

The stator core 33 includes an outer cylinder 37, teeth 38, and inner walls 39. The outer cylinder 37 surrounds the rotation axis AX. The teeth 38 protrude radially inward from the inner surface of the outer cylinder 37. The multiple (six in the present embodiment) teeth 38 are located circumferentially at intervals. Each inner wall 39 is connected to the radially inner end of the corresponding tooth 38. Each inner wall 39 is larger than the corresponding tooth 38 in the circumferential direction. Each tooth 38 has the center aligned with the center of the corresponding inner wall 39 in the circumferential direction. Each inner wall 39 has a protrusion 40 protruding from the inner end of the corresponding tooth 38 in the first circumferential direction and a protrusion 40 protruding in the second circumferential direction.

The surface of the stator core 33 includes inner surfaces 41, an outer surface 42, an end face 43, an end face 44, opposing surfaces 45, opposing surfaces 46, side surfaces 47, and side surfaces 48.

The inner surfaces 41 are on the inner walls 39 and face radially inward. The inner surfaces 41 face the rotor core 27. The inner surfaces 41 are arc-shaped in a plane orthogonal to the rotation axis AX.

The outer surface 42 is on the outer cylinder 37 and faces radially outward.

The end face 43 faces frontward. The end face 43 includes an end face 43A, end faces 43B and end faces 43C. The end face 43A is at the front of the outer cylinder 37. The end faces 43B are at the front of the teeth 38. The end faces 43C are at the front of the inner walls 39. The end face 43A on the outer cylinder 37, the end faces 43B on the teeth 38, and the end faces 43C on the inner walls 39 are in the same plane. The end face 43 is orthogonal to the rotation axis AX.

The end face 44 faces rearward. The end face 44 includes an end face 44A, end faces 44B, and end faces 44C. The end face 44A is at the rear of the outer cylinder 37. The end faces 44B are at the rear of the teeth 38. The end faces 44C are at the rear of the inner walls 39. The end face 44A on the outer cylinder 37, the end faces 44B on the teeth 38, and the end faces 44C on the inner walls 39 are in the same plane. The end face 44 is orthogonal to the rotation axis AX.

The opposing surfaces 45 are on the inner walls 39 and face radially outward.

The opposing surfaces 46 are on the outer cylinder 37 and face radially inward.

The side surfaces 47 are on the teeth 38 and face in the first circumferential direction.

The side surfaces 48 are on the teeth 38 and face in the second circumferential direction.

The insulator 34 covers at least a part of the surface of the stator core 33. The insulator 34 includes covers 49, covers 50, covers 51, and a cover 52. The covers 49 cover at least parts of the end face 43A at the front of the outer cylinder 37. The covers 50 cover at least parts of the end face 44A at the rear of the outer cylinder 37. The covers 51 cover the surfaces of the teeth 38. The surface of each tooth 38 includes the end face 43B, the end face 44B, the side surface 47, and the side surface 48. The coils 35 are wound around the teeth 38 with the covers 51 between them. The cover 52 covers the opposing surfaces 46 on the outer cylinder 37. The covers 49, the covers 50, the covers 51, and the cover 52 are integral with one another.

The covers 49 include cover areas 491, 492, 493, 494, and 495. The cover areas 491 to 495 are located circumferentially on the end face 43A on the outer cylinder 37 at intervals.

The cover area 491 is defined in a left portion of the end face 43A. The cover area 492 is defined in an upper left portion of the end face 43A. The cover area 493 is defined in an upper right portion of the end face 43A. The cover area 494 is defined in a right portion of the end face 43A. The cover area 495 is defined in a lower portion of the end face 43A. The cover area 495 is larger than each of the cover areas 491 to 494 in the circumferential direction.

The covers 50 include cover areas 501, 502, 503, 504, 505, and 506. The cover areas 501 to 506 are located circumferentially on the end face 44A on the outer cylinder 37 at intervals.

The cover area 501 is defined in a lower left portion of the end face 44A. The cover area 502 is defined in an upper left portion of the end face 44A. The cover area 503 is defined in an upper portion of the end face 44A. The cover area 504 is defined in an upper right portion of the end face 44A. The cover area 505 is defined in a lower right portion of the end face 44A. The cover area 506 is defined in a lower portion of the end face 44A. The cover areas 501 to 506 each have the same dimension in the circumferential direction.

The insulator 34 includes coil stoppers 53, coil stoppers 54, coil stoppers 55, wire supports 56, screw bosses 57, a joint 58, and ribs 110.

Each coil stopper 53 is connected to the radially inner end of the corresponding cover 51. With the coils 35 wound around the respective covers 51, the coil stoppers 53 are radially inward from the coils 35.

Each coil stopper 53 surrounds the corresponding inner wall 39. Each coil stopper 53 is larger than the corresponding cover 51 in the axial direction. Each coil stopper 53 is larger than the corresponding cover 51 in the circumferential direction.

Each coil stopper 53 is connected to the radially outer end of the corresponding cover 51. Each coil stopper 53 protrudes frontward and rearward from the cover 51. Each coil stopper 53 protrudes in the first and second circumferential directions from the cover 51. Each coil stopper 53 at least partially protrudes frontward from the end face 43 of the stator core 33. Each coil stopper 53 at least partially protrudes rearward from the end face 44 of the stator core 33.

Each coil stopper 54 is connected to the radially outer end of the corresponding cover 51. Each coil stopper 54 protrudes frontward from the end face 43 of the stator core 33. In the axial direction, the distance between the end face 43 and the front end of each coil stopper 54 is smaller than the distance between the end face 43 and the front end of each coil stopper 53. In other words, each coil stopper 54 protrudes from the end face 43 by a smaller degree than each coil stopper 53.

Each coil stopper 55 is connected to the radially outer end of the corresponding cover 51. Each coil stopper 55 protrudes rearward from the end face 44 of the stator core 33. In the axial direction, the distance between the end face 43 and the rear end of each coil stopper 55 is larger than the distance between the end face 43 and the rear end of each coil stopper 53. In other words, each coil stopper 55 protrudes from the end face 43 by a greater degree than each coil stopper 53.

The wire supports 56 are located on the covers 49 in a one-to-one correspondence with the coils 35. The wire supports 56 are radially outward from the coils 35. Each wire support 56 includes a pair of protrusions 59 and a pair of protrusions 60. Each pair of protrusions 59 protrude frontward from the corresponding cover 49. Each pair of protrusions 60 protrude frontward from the corresponding cover 49. Each pair of protrusions 59 are located circumferentially. Each pair of protrusions 60 are located circumferentially. The protrusions 60 are radially outward from the protrusions 59. In the axial direction, the distance between the end face 43 and the front end of each protrusion 59 is larger than the distance between the end face 43 and the front end of each protrusion 60. In other words, each protrusion 59 protrudes from the end face 43 by a greater degree than each protrusion 60.

A single wire support 56 is located on each of the cover areas 491 to 494. Two wire supports 56 are located on the cover area 495.

The screw bosses 57 are located on the covers 49. Each screw boss 57 protrudes frontward from the corresponding cover 49. The multiple (four in the present embodiment) screw bosses 57 are located at intervals around the rotation axis AX. A single screw boss 57 is located on each of the cover area 492 and the cover area 493. Two screw bosses 57 are located on the cover area 495. Each screw boss 57 has a screw hole 61.

Each rib 110 is located on a part of the corresponding cover 49. Each rib 110 protrudes frontward from a surface of the corresponding cover 49. In the present embodiment, each of the cover area 491 and the cover area 494 includes one or more ribs 110 that extend laterally. The ribs 110 on the cover area 491 are located on both circumferential ends of the wire support 56. The ribs 110 on the cover area 494 are located on both circumferential ends of the wire support 56.

The ribs 110 in the present embodiment include a rib 111, a rib 112, a rib 113, and a rib 114. The ribs 111 and 112 are located on the cover area 491. The ribs 113 and 114 are located on the cover area 494.

The rib 111 on the cover area 491 is downward from the wire support 56. The rib 112 on the cover area 491 is upward from the wire support 56. The rib 113 on the cover area 494 is upward from the wire support 56. The rib 114 on the cover area 494 is downward from the wire support 56.

The joint 58 protrudes radially outward from the cover area 495 covering a lower portion of the end face 43A.

Figure 11:
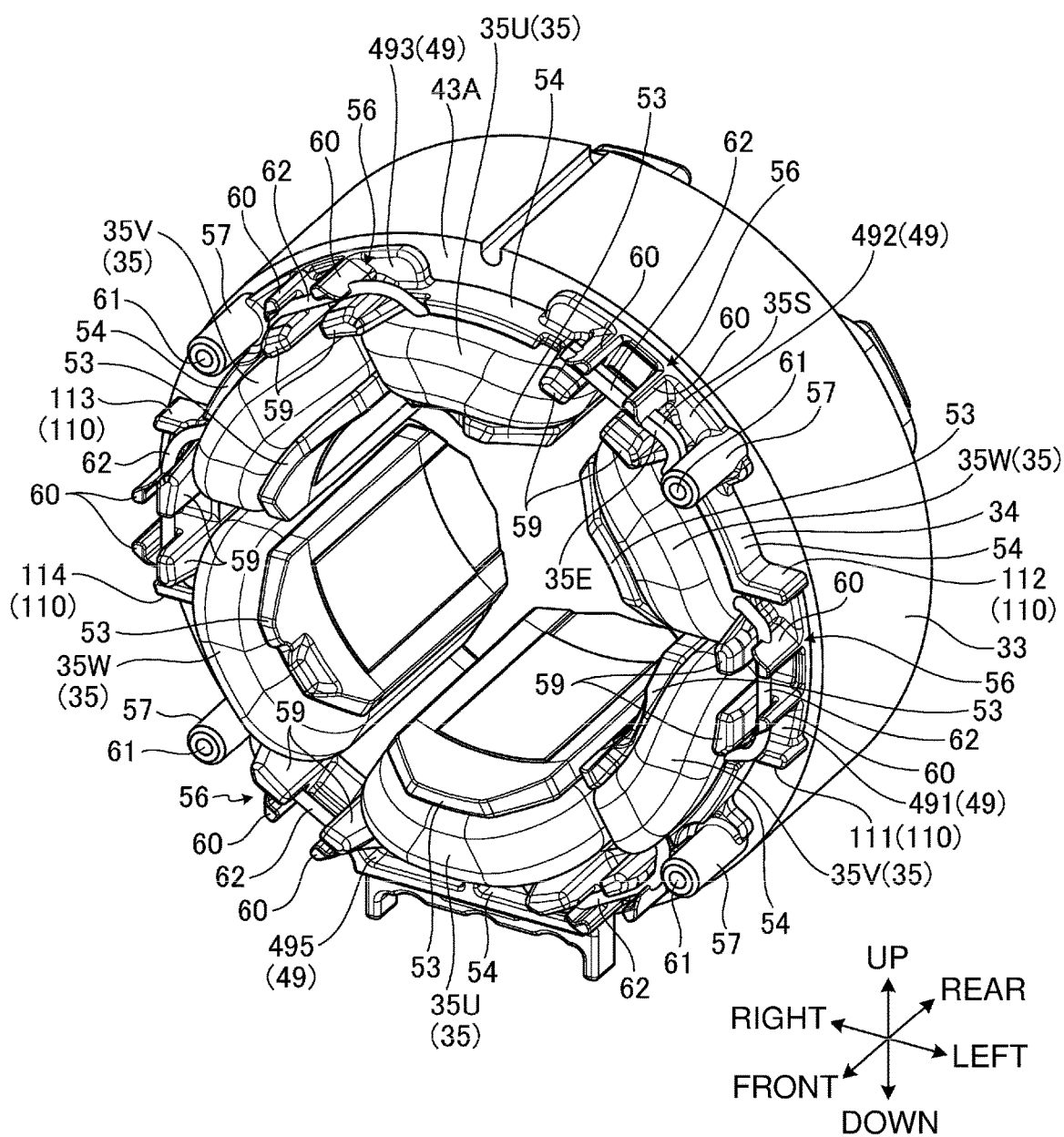
FIG. 11 is a front perspective view of coils fixed to the insulator in the first embodiment.
Figure 12:
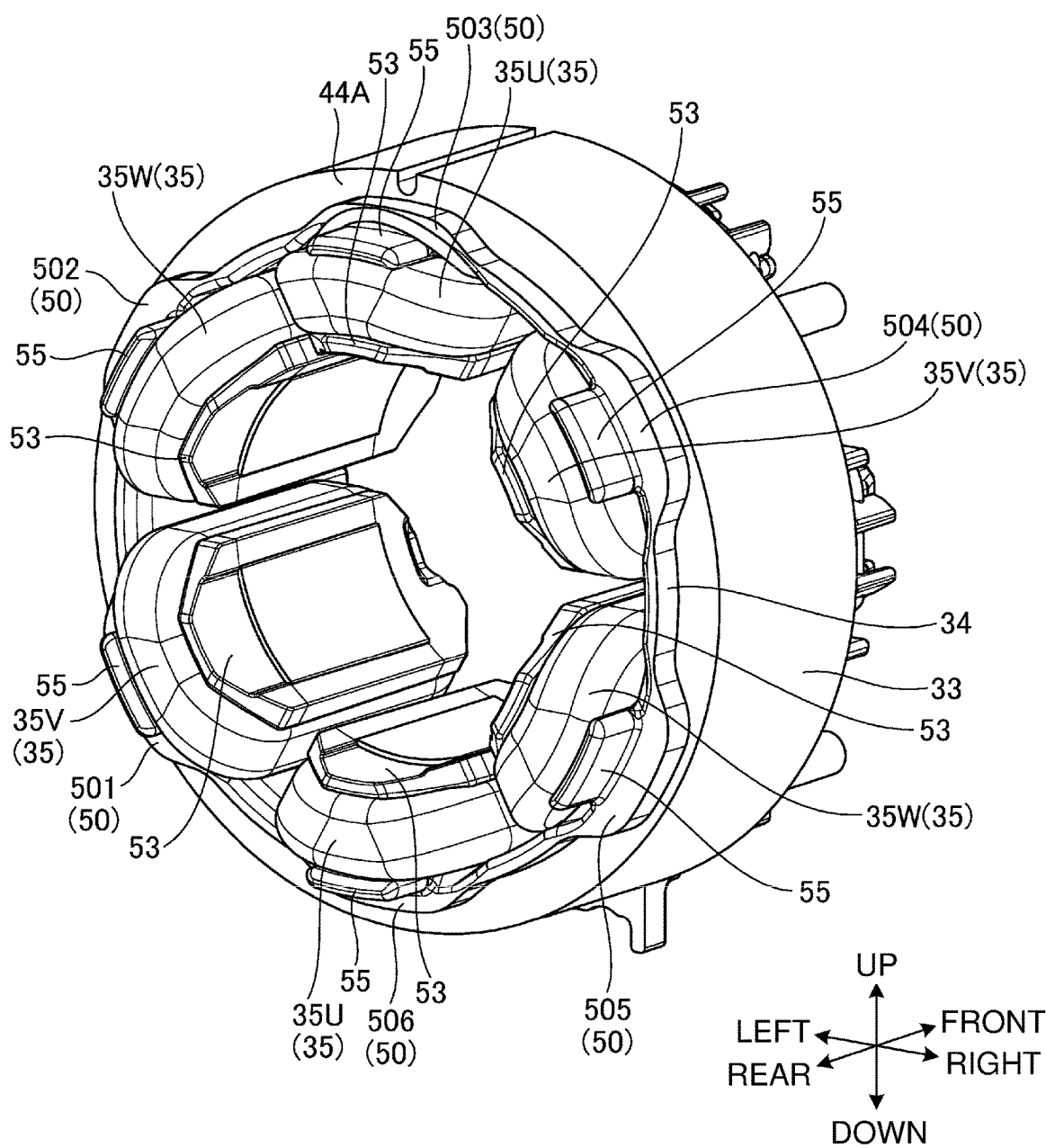
FIG. 12 is a rear perspective view of the coils fixed to the insulator in the first embodiment.

FIG. 11 is a front perspective view of the coils 35 fixed to the insulator 34 in the present embodiment. FIG. 12 is a rear perspective view of the coils 35 fixed to the insulator 34 in the present embodiment.

The multiple (six in the present embodiment) coils 35 are wound around the stator core 33 with the insulator 34 in between. Each coil 35 surrounds the corresponding cover 51. Each coil 35 is wound around each of the teeth 38 with the corresponding cover 51 between them.

With the coils 35 wound around the respective covers 51, the coil stoppers 53 are radially inward from the coils 35.

With the coils 35 wound around the respective covers 51, the coil stoppers 54 are radially outward from the coils 35.

With the coils 35 wound around the respective covers 51, the coil stoppers 55 are radially outward from the coils 35.

In the radial direction, a part of each coil 35 is located between the corresponding coil stoppers 53 and 54. In the radial direction, another part of each coil 35 is located between the corresponding coil stoppers 53 and 55. The multiple coils 35 are fixed to the insulator 34. The coils 35 and the stator core 33 are insulated from each other by the insulator 34.

The multiple coils 35 are formed by winding a single wire 620. Each coil 35 is connected to a circumferentially adjacent coil 35 with a connection wire 62, which is a part of the wire 620. Each connection wire 62 is a part of the wire 620 between two adjacent coils 35. In the axial direction, each connection wire 62 is located between the center of the corresponding coil 35 and the front end of the coil 35.

Each connection wire 62 is supported by the corresponding wire support 56 in the insulator 34. The connection wires 62 in the present embodiment are located between the protrusions 59 and the protrusions 60 in the radial direction.

As shown in FIGS. 4 and 6, the wire 620 has a middle portion 35M radially outward from the coil stopper 55. As shown in FIGS. 7 and 8, the middle portion 35M protrudes radially outward from one coil 35. The middle portion 35M is radially outward from the connection wires 62. In the axial direction, the middle portion 35M is located between the center of the coil 35 and the rear end of the coil 35. The middle portion 35M radially outward from the coil stopper 55 improves the cooling capability of the coils 35.

Figure 13:
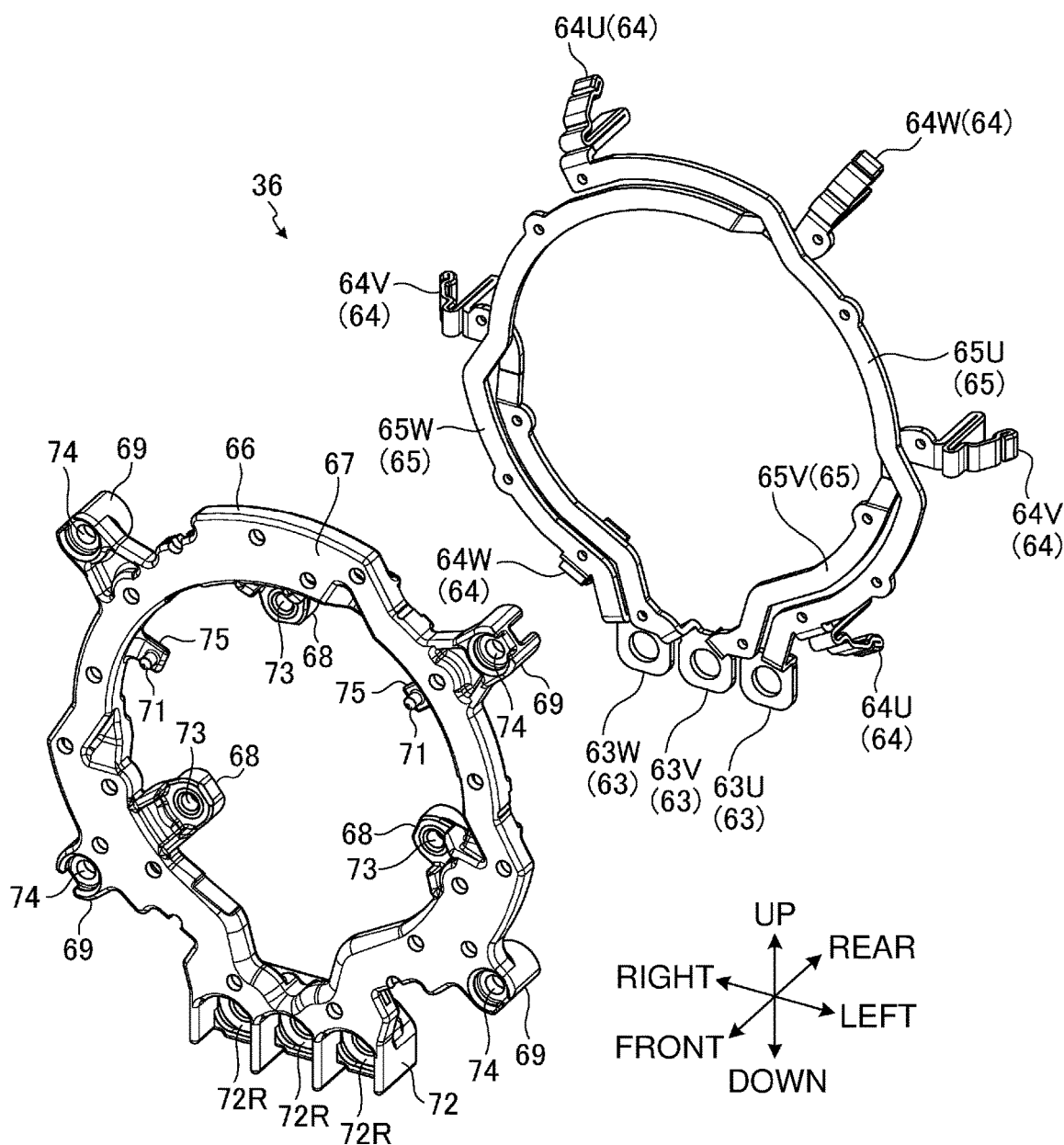
FIG. 13 is an exploded front perspective view of a busbar unit in the first embodiment.
Figure 14:
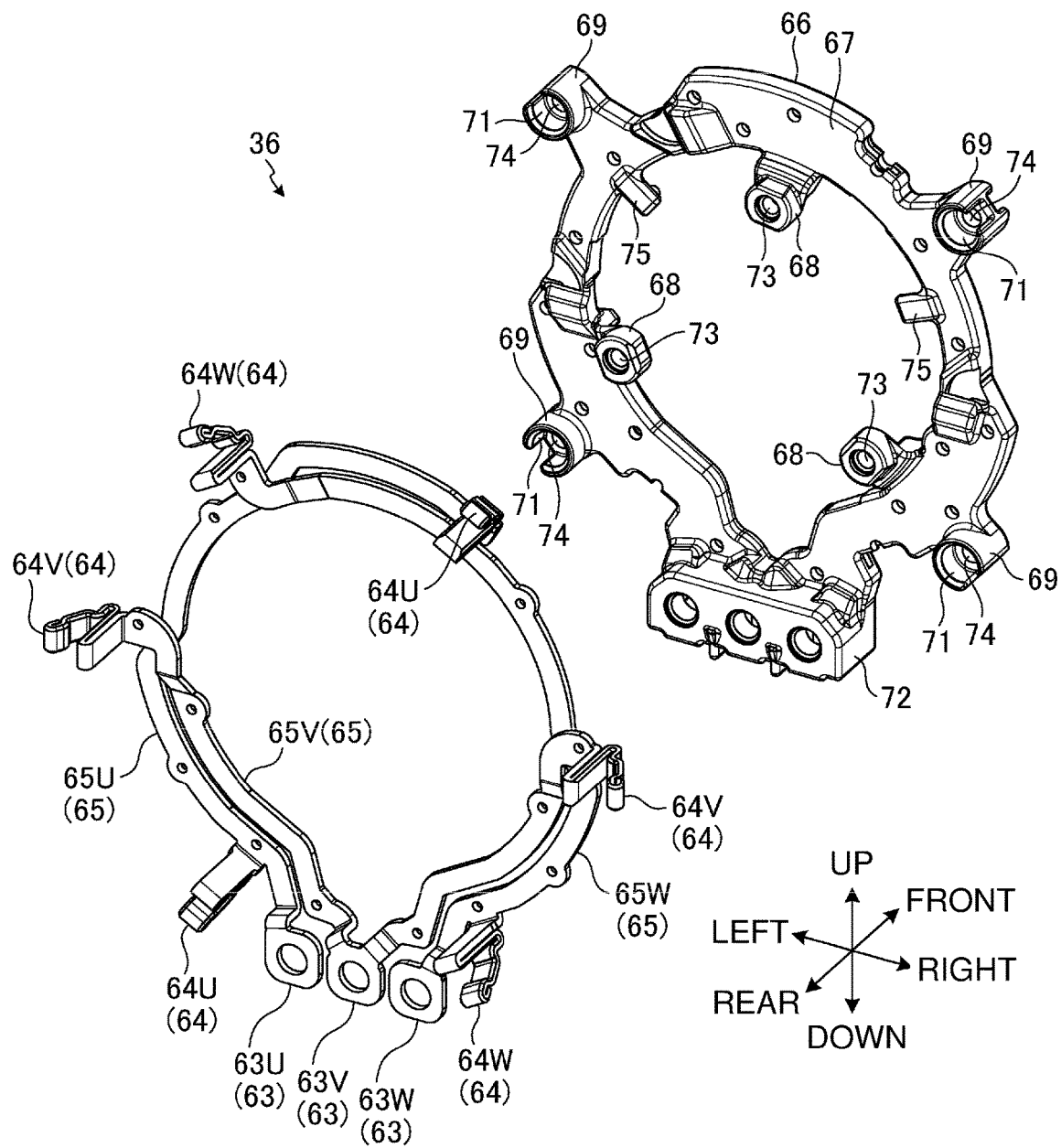
FIG. 14 is an exploded rear perspective view of the busbar unit in the first embodiment.

FIG. 13 is an exploded front perspective view of the busbar unit 36 in the present embodiment. FIG. 14 is an exploded rear perspective view of the busbar unit 36 in the present embodiment.

A driving current from the battery pack 19 is supplied to the busbar unit 36 through the controller 9. The controller 9 controls the driving current supplied from the battery pack 19 to the busbar unit 36. The busbar unit 36 includes external terminals 63, fuse terminals 64, short-circuiting members 65, and an insulating member 66.

The external terminals 63 are connected to the battery pack 19 through the controller 9. A driving current from the battery pack 19 is supplied to the external terminals 63 through power supply lines. The busbar unit 36 in the present embodiment includes three external terminals 63.

The fuse terminals 64 are connected to the coils 35 with the connection wires 62. The fuse terminals 64 conduct electricity. The connection wires 62 supported by the wire supports 56 are connected to the fuse terminals 64. Each connection wire 62 is placed in a bent portion of the corresponding fuse terminal 64. Each fuse terminal 64 and the corresponding connection wire 62 are welded together. The fuse terminals 64 are thus connected to the coils 35 with the connection wires 62.

In the axial direction, the middle portion 35M is located between the center of the coil 35 and the rear end of the coil 35. Each connection wire 62 is located between the center of the corresponding coil 35 and the front end of the coil 35. The fuse terminals 64 are thus connected to the connection wires 62 without interfering with the middle portion 35M.

The multiple (six in the present embodiment) fuse terminals 64 surround the rotation axis AX. The fuse terminals 64 are aligned in the axial direction and correspond one-to-one with the coils 35.

Each short-circuiting member 65 connects (short-circuits) a pair of connection wires 62 radially opposed to each other. A pair of connection wires 62 radially opposed to each other are 180° apart from each other in the circumferential direction. The short-circuiting members 65 connect the external terminals 63 and the fuse terminals 64. The short-circuiting members 65 conduct electricity. Each short-circuiting member 65 is curved in a plane orthogonal to the rotation axis AX. The busbar unit 36 includes the multiple (three in the present embodiment) short-circuiting members 65. Each short-circuiting member 65 connects (short-circuits) one external terminal 63 and two fuse terminals 64.

The insulating member 66 is formed from a synthetic resin. The insulating member 66 surrounds the rotation axis AX. The insulating member 66 supports the external terminals 63 and the short-circuiting members 65. The insulating member 66 supports the fuse terminals 64 with the short-circuiting members 65 between them. The insulating member 66 includes a base 67, first screw bosses 68, second screw bosses 69, positioning pins 70, positioning recesses 71, and a joint 72.

The base 67 is annular. Each short-circuiting member 65 is at least partially inside the base 67. The base 67 is integral with the short-circuiting members 65. The short-circuiting members 65 are molded with a synthetic resin used for the base 67. The base 67 may be fixed to the short-circuiting members 65 by, for example, insert molding. The base 67 insulates the three short-circuiting members 65 from one another.

The first screw bosses 68 protrude radially inward from the inner edge of the base 67. The multiple (three in the present embodiment) first screw bosses 68 are located at circumferentially equal intervals. Each first screw boss 68 has a screw hole 73. The second screw bosses 69 protrude radially outward from the outer edge of the base 67.

The multiple (four in the present embodiment) second screw bosses 69 are located circumferentially. Each second screw boss 69 has an opening 74.

The positioning pins 70 are radially inward from the base 67. The insulating member 66 includes supports 75 protruding radially inward from the inner edge of the base 67. Each positioning pin 70 protrudes frontward from the corresponding support 75. The multiple (two in the present embodiment) supports 75 and the multiple positioning pins 70 are located circumferentially. A single positioning pin 70 is located on each of the supports 75.

The positioning recesses 71 are radially outward from the base 67. Each positioning recess 71 is located in the corresponding second screw boss 69. Each positioning recess 71 is recessed frontward from the rear end face of the corresponding second screw boss 69.

The joint 72 protrudes downward from a lower portion of the base 67. The joint 72 faces the joint 58 in the insulator 34. The joint 72 has three recesses 72R that receive the external terminals 63. Each recess 72R receives a single external terminal 63.

Figure 15:
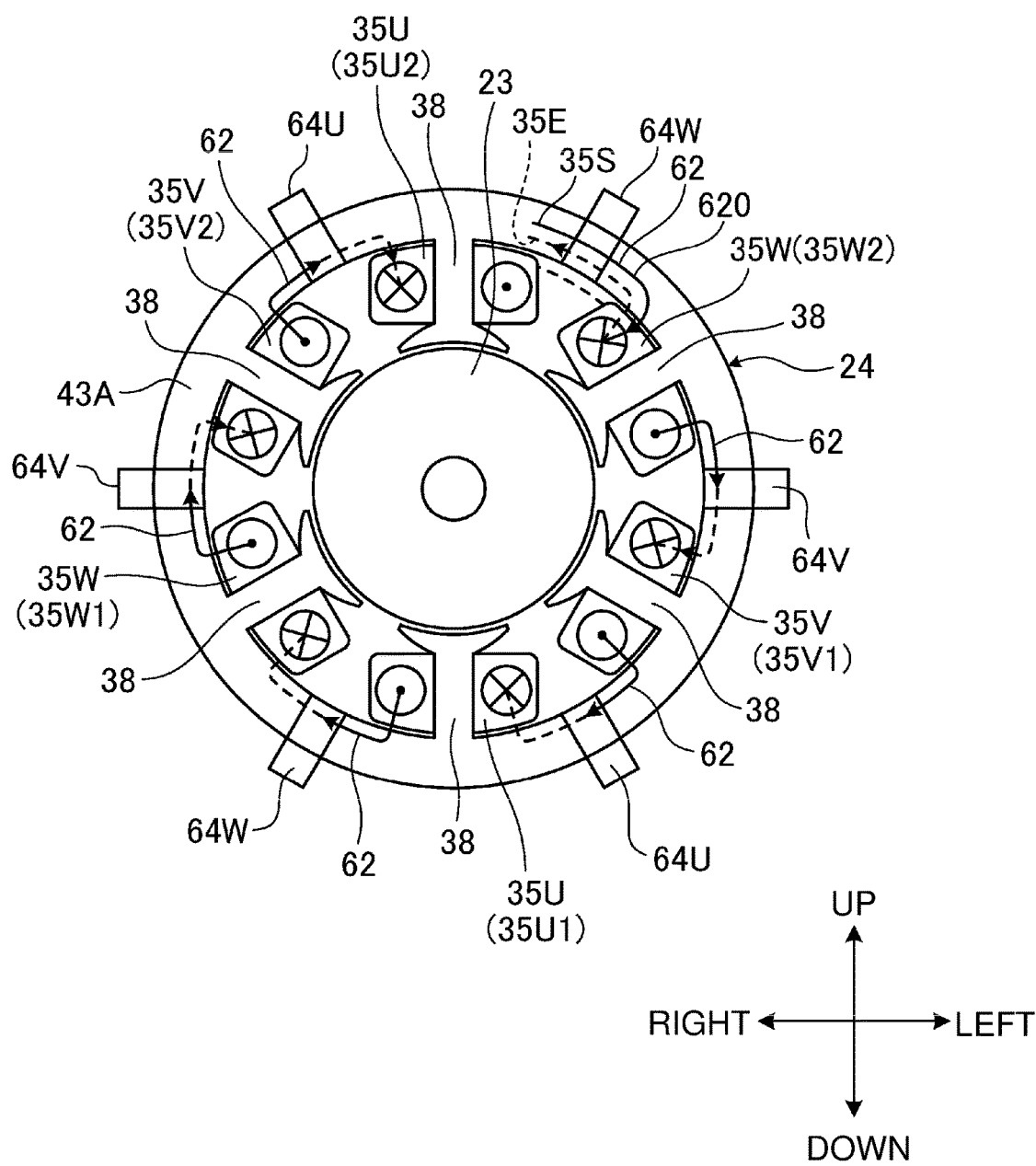
FIG. 15 is a schematic diagram of the stator in the first embodiment.
Figure 16:
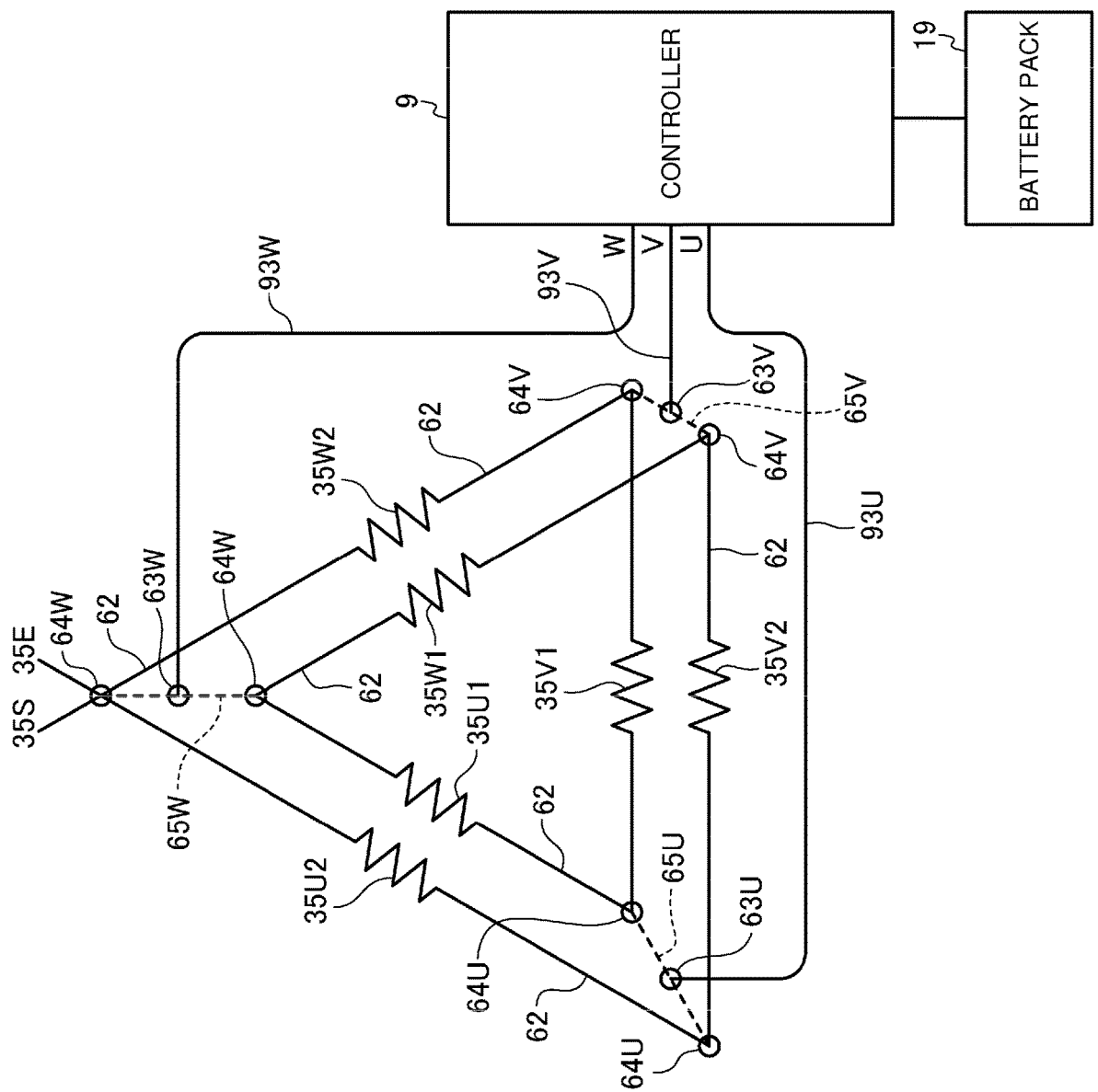
FIG. 16 is a schematic diagram of connected coils in the first embodiment.

FIG. 15 is a schematic diagram of the stator 24 in the present embodiment. FIG. 16 is a schematic diagram of connected coils 35 in the present embodiment.

The multiple coils 35 are formed by winding the single wire 620. As shown in FIGS. 15 and 16, the wire 620 includes a wind start portion 35S first wound around one tooth 38. The wire 620 is wound sequentially around each of circumferentially adjacent teeth 38 to form the six coils 35. The wire 620 includes a wind end portion 35E that is wound finally.

A driving current from the battery pack 19 is supplied to the external terminals 63 in the busbar unit 36 through the controller 9 and the power supply lines. The driving current supplied from the battery pack 19 to the external terminals 63 flows through the short-circuiting members 65 and the fuse terminals 64, and is then supplied to the coils 35 through the connection wires 62.

In the present embodiment, a driving current supplied from the battery pack 19 to the motor 20 includes a U-phase driving current, a V-phase driving current, and a W-phase driving current.

The power supply lines include a power supply line 93U, a power supply line 93V, and a power supply line 93W. The U-phase driving current is supplied to the power supply line 93U. The V-phase driving current is supplied to the power supply line 93V. The W-phase driving current is supplied to the power supply line 93W.

The external terminals 63 include an external terminal 63U, an external terminal 63V, and an external terminal 63W. The U-phase driving current is supplied to the external terminal 63U. The V-phase driving current is supplied to the external terminal 63V. The W-phase driving current is supplied to the external terminal 63W.

The short-circuiting members 65 include short-circuiting members 65U, 65V, and 65W. The short-circuiting member 65U is connected to the power supply line 93U through the external terminal 63U. The short-circuiting member 65V is connected to the power supply line 93V through the external terminal 63V. The short-circuiting member 65W is connected to the power supply line 93W through the external terminal 63W.

Each fuse terminal 64 includes pairs of fuse terminals 64U, 64V, and 64W. The pair of fuse terminals 64U are connected to the short-circuiting member 65U. The pair of fuse terminals 64V are connected to the short-circuiting member 65V. The pair of fuse terminals 64W are connected to the short-circuiting member 65W.

As shown in FIGS. 13 and 14, the short-circuiting member 65U connects the external terminal 63U and each of the pair of fuse terminals 64U. The short-circuiting member 65V connects the external terminal 63V and each of the pair of fuse terminals 64V. The short-circuiting member 65W connects the external terminal 63W and each of the pair of fuse terminals 64W. The external terminal 63U, the fuse terminals 64U, and the short-circuiting member 65U are integral with one another. The external terminal 63V, the fuse terminals 64V, and the short-circuiting member 65V are integral with one another. The external terminal 63W, the fuse terminals 64W, and the short-circuiting member 65W are integral with one another.

When the busbar unit 36 has a circumferentially upper end located at 0°, a circumferentially left end at 90°, a circumferentially lower end at 180°, and a circumferentially right end at 270°, the external terminal 63U is located at 180°. One fuse terminal 64U is located at 150°. The other fuse terminal 64U is located at 330°.

The external terminal 63V is located at 180°. One fuse terminal 64V is located at 90°. The other fuse terminal 64V is located at 270°.

The external terminal 63W is located at 180°. One fuse terminal 64W is located at 30°. The other fuse terminal 64W is located at 210°.

Each of the six coils 35 is assigned to one of a U-(U-V-) phase, a V-(V-W-) phase, and a W-(W-U-) phase.

Each pair of coils 35 is assigned to the U-phase, the V-phase, or the W-phase. The six coils 35 include a pair of U-phase coils 35U assigned to the U-phase, a pair of V-phase coils 35V assigned to the V-phase, and a pair of W-phase coils 35W assigned to the W-phase.

As shown in FIGS. 11 and 12, the pair of U-phase coils 35U are radially opposed to each other. The pair of V-phase coils 35V are radially opposed to each other. The pair of W-phase coils 35W are radially opposed to each other.

As shown in FIG. 15, a U-phase coil 35U1 is circumferentially adjacent to a V-phase coil 35V1. The V-phase coil 35V1 is adjacent to a W-phase coil 35W2. The W-phase coil 35W2 is adjacent to a U-phase coil 35U2. The U-phase coil 35U2 is adjacent to a V-phase coil 35V2. The V-phase coil 35V2 is adjacent to a W-phase coil 35W1. The U-phase coil 35U1 and the U-phase coil 35U2 are radially opposed to each other. The V-phase coil 35V1 and the V-phase coil 35V2 are radially opposed to each other. The W-phase coil 35W1 and the W-phase coil 35W2 are radially opposed to each other.

One fuse terminal 64U is connected to the connection wire 62 connecting the U-phase coil 35U1 and the circumferentially adjacent V-phase coil 35V1. The other fuse terminal 64U is connected to the connection wire 62 connecting the U-phase coil 35U2 and the circumferentially adjacent V-phase coil 35V2. One fuse terminal 64V is connected to the connection wire 62 connecting the V-phase coil 35V1 and the circumferentially adjacent W-phase coil 35W2. The other fuse terminal 64V is connected to the connection wire 62 connecting the V-phase coil 35V2 and the circumferentially adjacent W-phase coil 35W1. One fuse terminal 64W is connected to the connection wire 62 connecting the W-phase coil 35W2 and the circumferentially adjacent U-phase coil 35U2. The other fuse terminal 64W is connected to the connection wire 62 connecting the W-phase coil 35W1 and the circumferentially adjacent U-phase coil 35U1.

As shown in FIG. 16, a set of the U-phase coil 35U1, the V-phase coil 35V1, and the W-phase coil 35W1 is delta-connected. A set of the U-phase coil 35U2, the V-phase coil 35V2, and the W-phase coil 35W2 is delta-connected. The two delta connections are arranged in parallel.

The U-phase driving current input into the power supply line 93U is supplied to the pair of fuse terminals 64U through the short-circuiting member 65U. When the U-phase coil 35U1 is excited to be a north pole, the U-phase coil 35U2 is excited to be a south pole. The V-phase coil 35V1 adjacent to the U-phase coil 35U1 excited to be a north pole is excited to be a south pole. The V-phase coil 35V2 adjacent to the U-phase coil 35U2 excited to be a south pole is excited to be a north pole.

The V-phase driving current input into the power supply line 93V is supplied to the pair of fuse terminals 64V through the short-circuiting member 65V. When the V-phase coil 35V1 is excited to be a north pole, the V-phase coil 35V2 is excited to be a south pole. The W-phase coil 35W1 adjacent to the V-phase coil 35V1 excited to be a north pole is excited to be a south pole. The W-phase coil 35W2 adjacent to the V-phase coil 35V2 excited to be a south pole is excited to be a north pole.

The W-phase driving current input into the power supply line 93W is supplied to the pair of fuse terminals 64W through the short-circuiting member 65W. When the W-phase coil 35W1 is excited to be a north pole, the W-phase coil 35W2 is excited to be a south pole. The U-phase coil 35U1 adjacent to the W-phase coil 35W1 excited to be a north pole is excited to be a south pole. The U-phase coil 35U2 adjacent to the W-phase coil 35W2 excited to be a south pole is excited to be a north pole.

Sensor Unit

Figure 17:
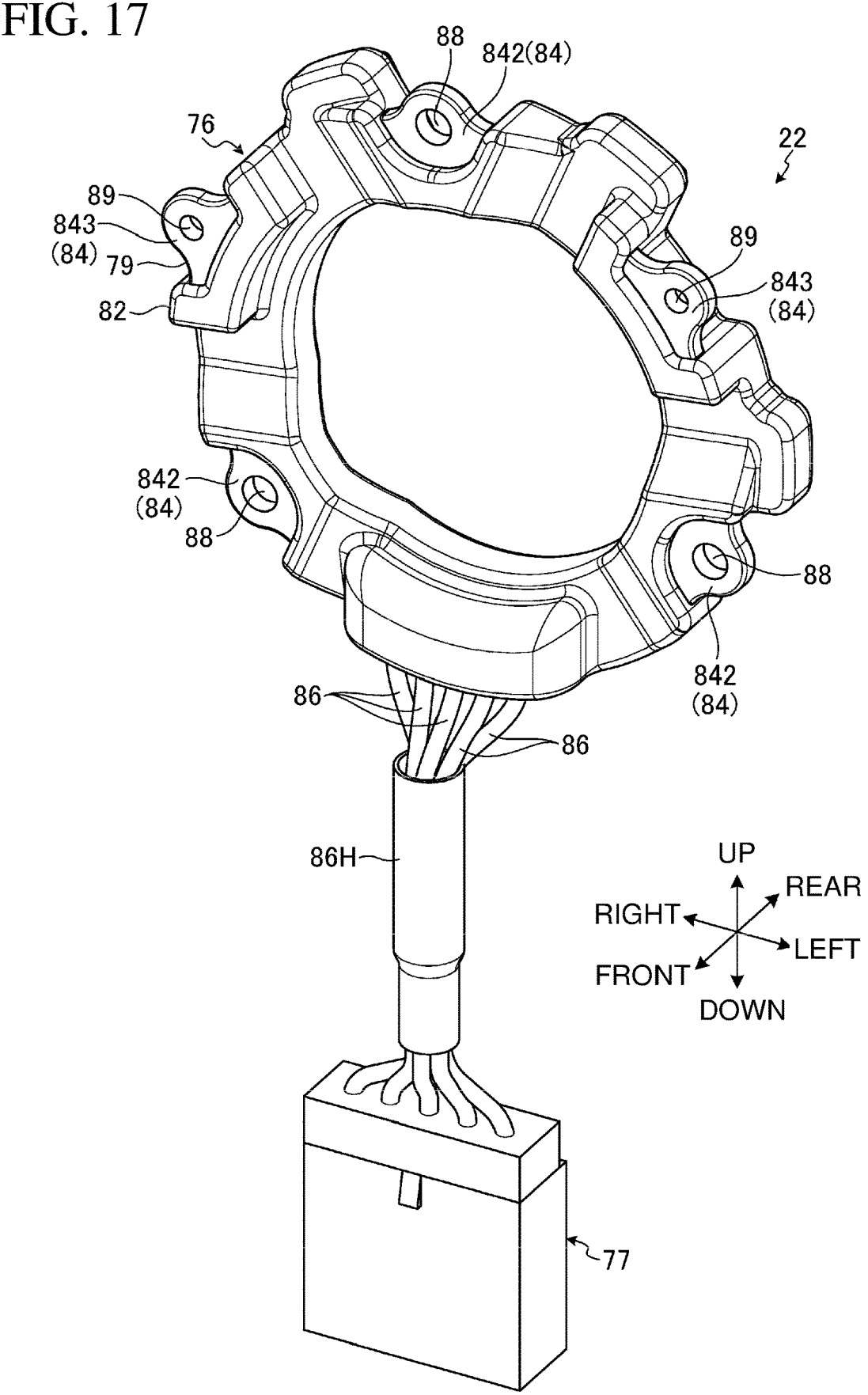
FIG. 17 is a front perspective view of the sensor unit in the first embodiment.
Figure 18:
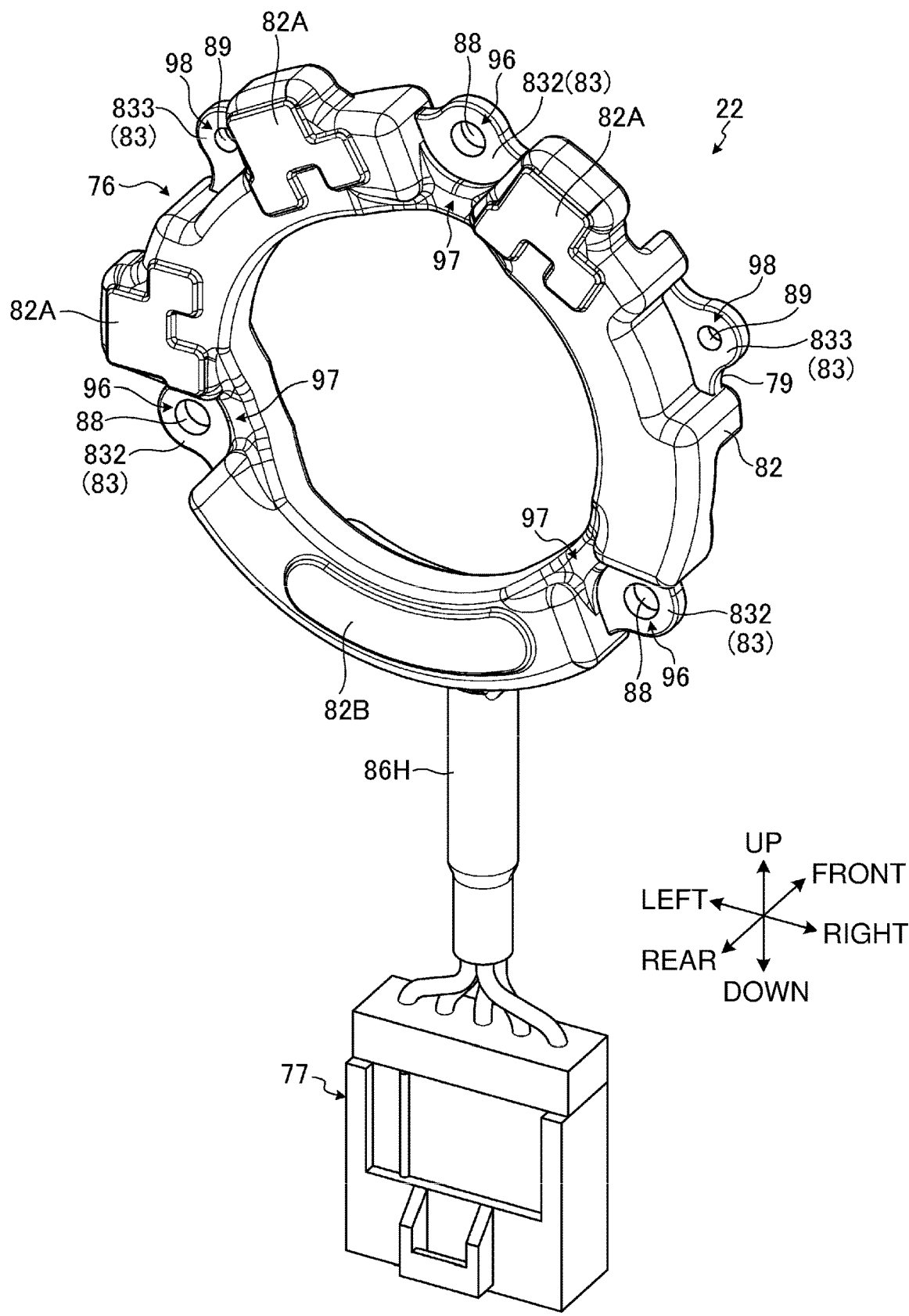
FIG. 18 is a rear perspective view of the sensor unit in the first embodiment.
Figure 19:
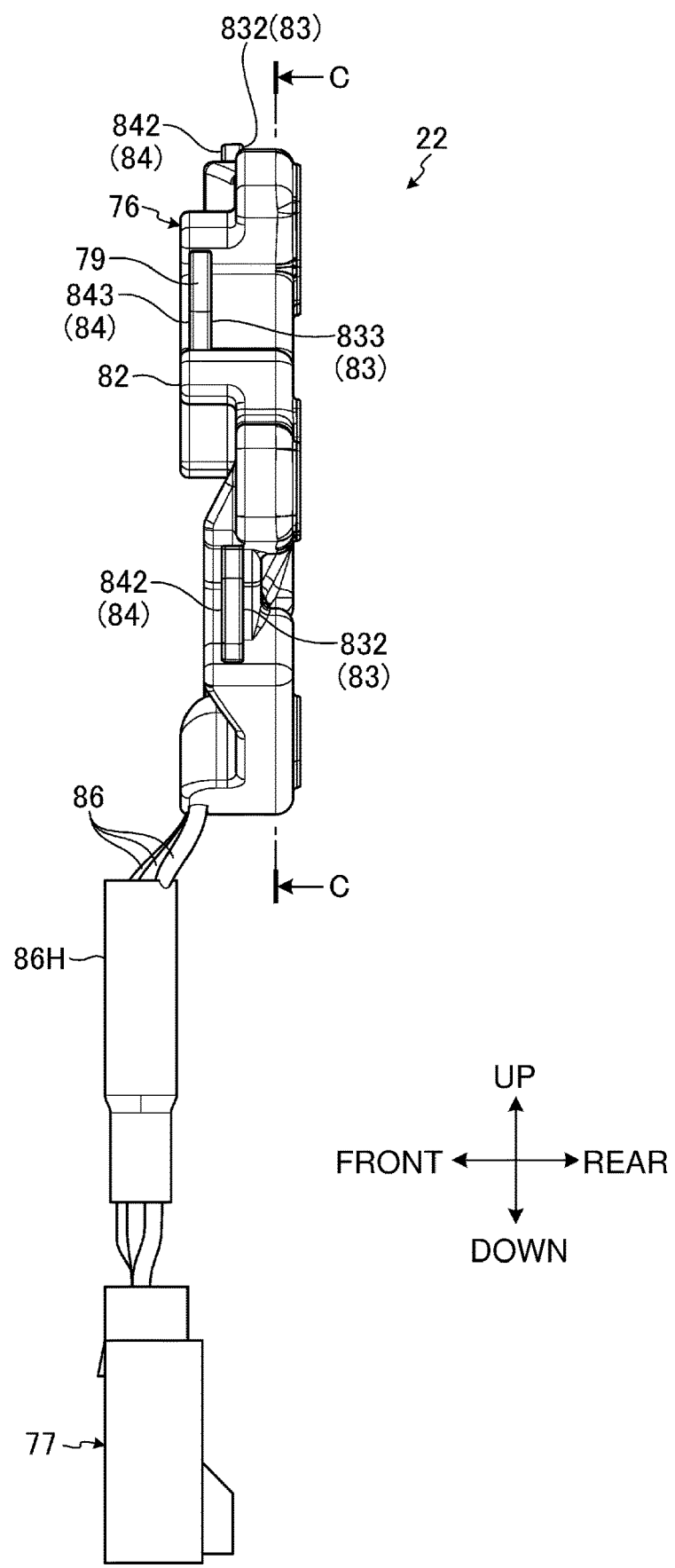
FIG. 19 is a left side view of the sensor unit in the first embodiment.
Figure 20:
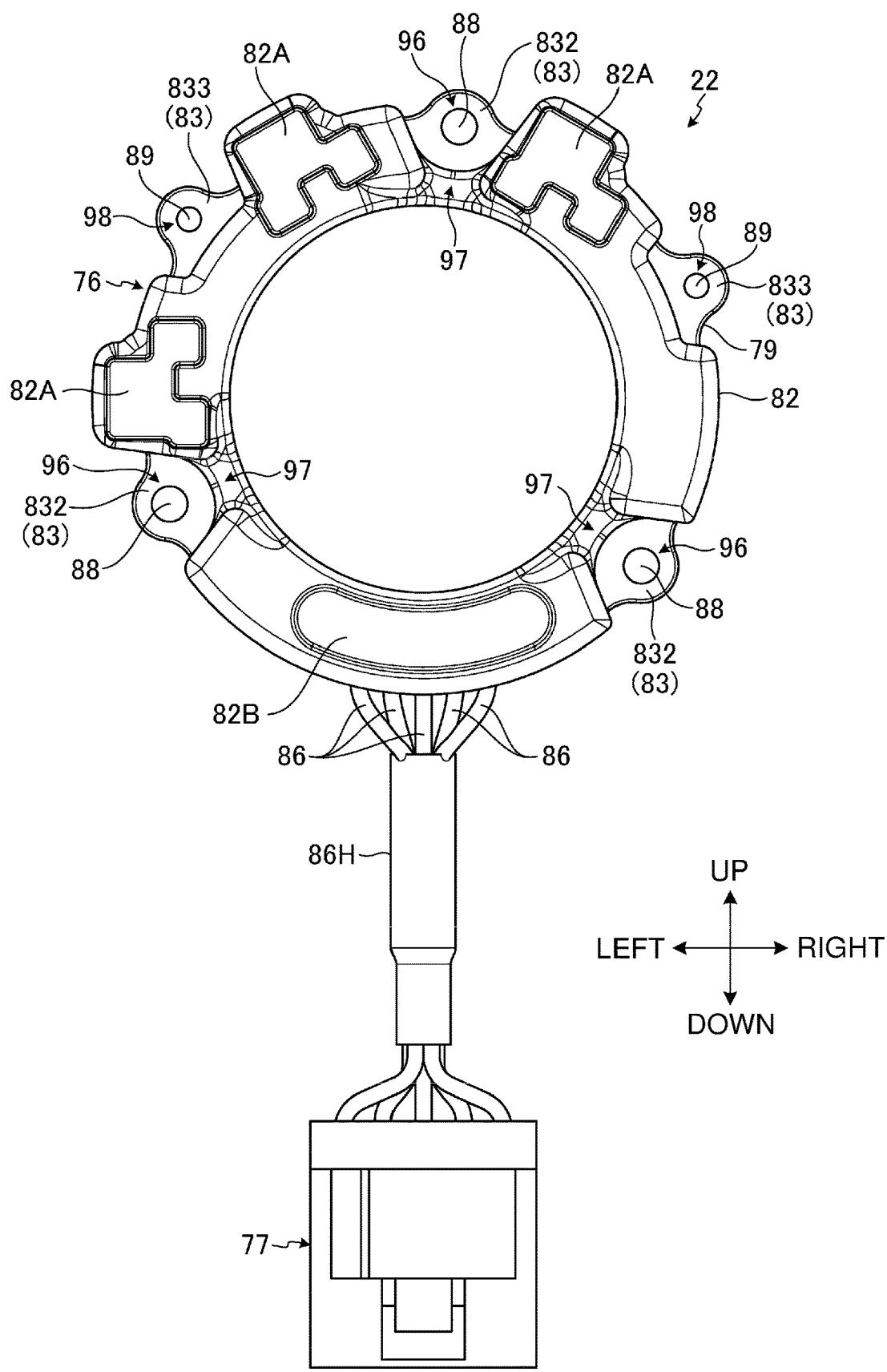
FIG. 20 is a rear view of the sensor unit in the first embodiment.
Figure 21:
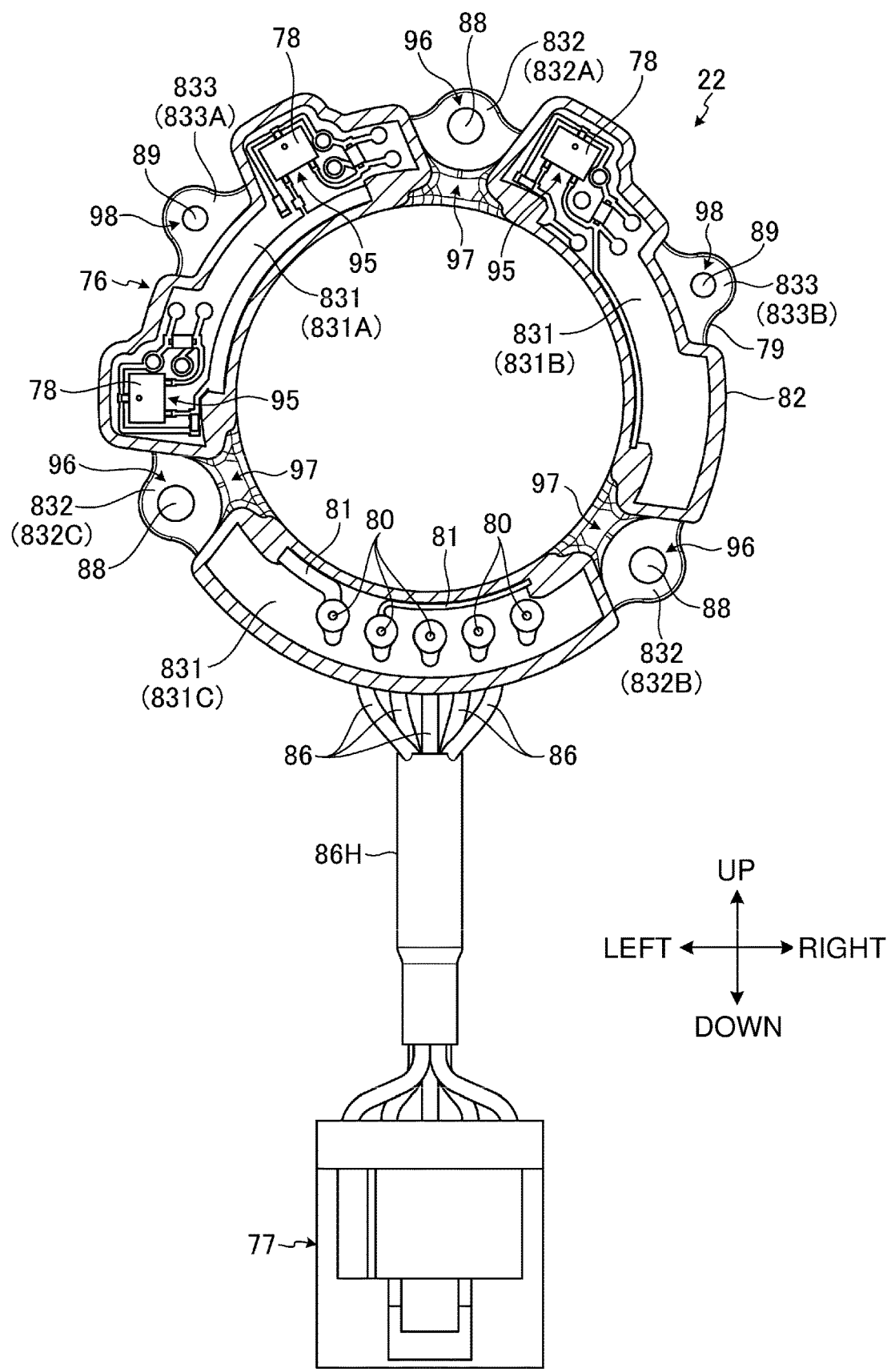
FIG. 21 is a cross-sectional view of the sensor unit in the first embodiment.
Figure 22:
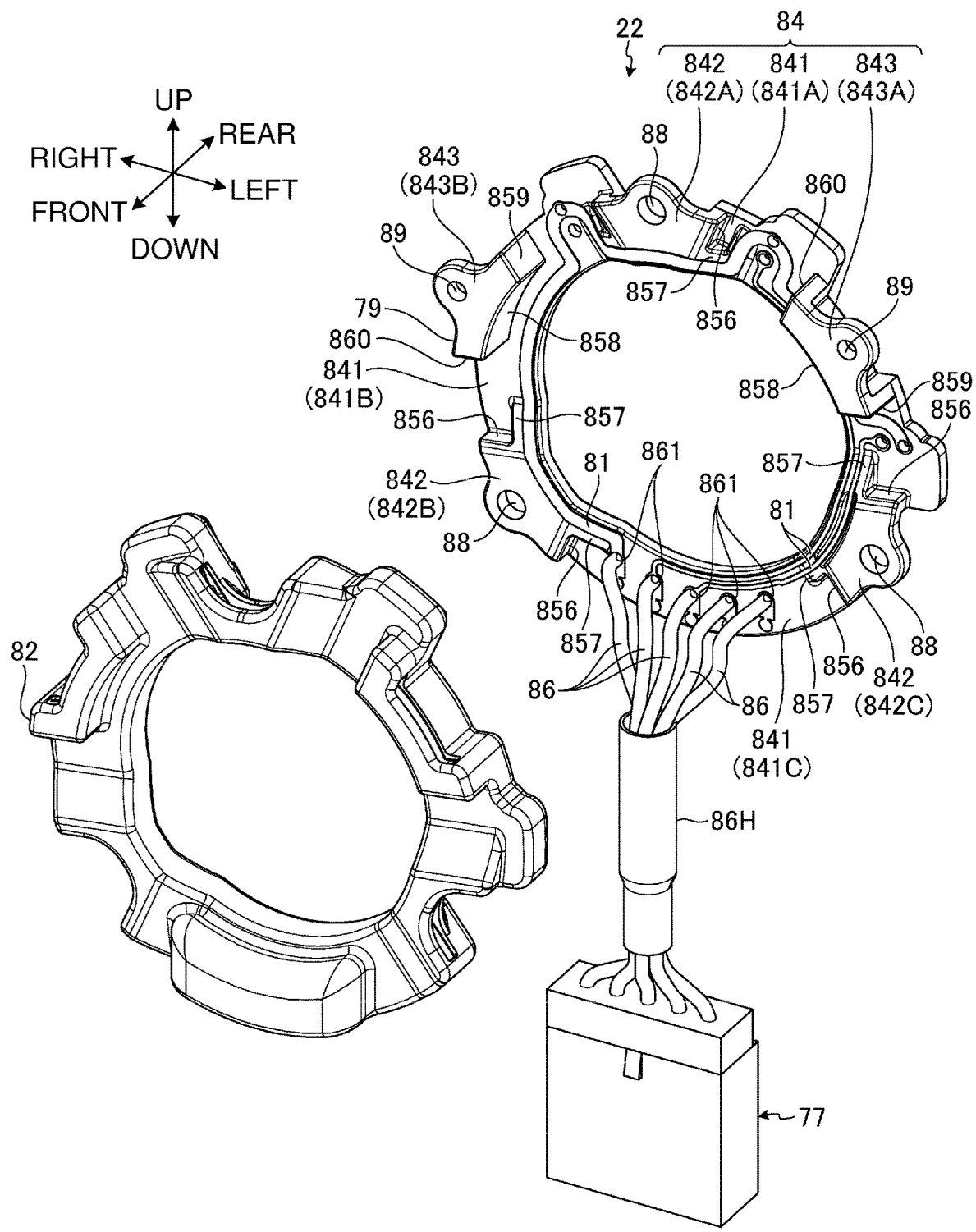
FIG. 22 is an exploded front perspective view of the sensor unit in the first embodiment.
Figure 23:
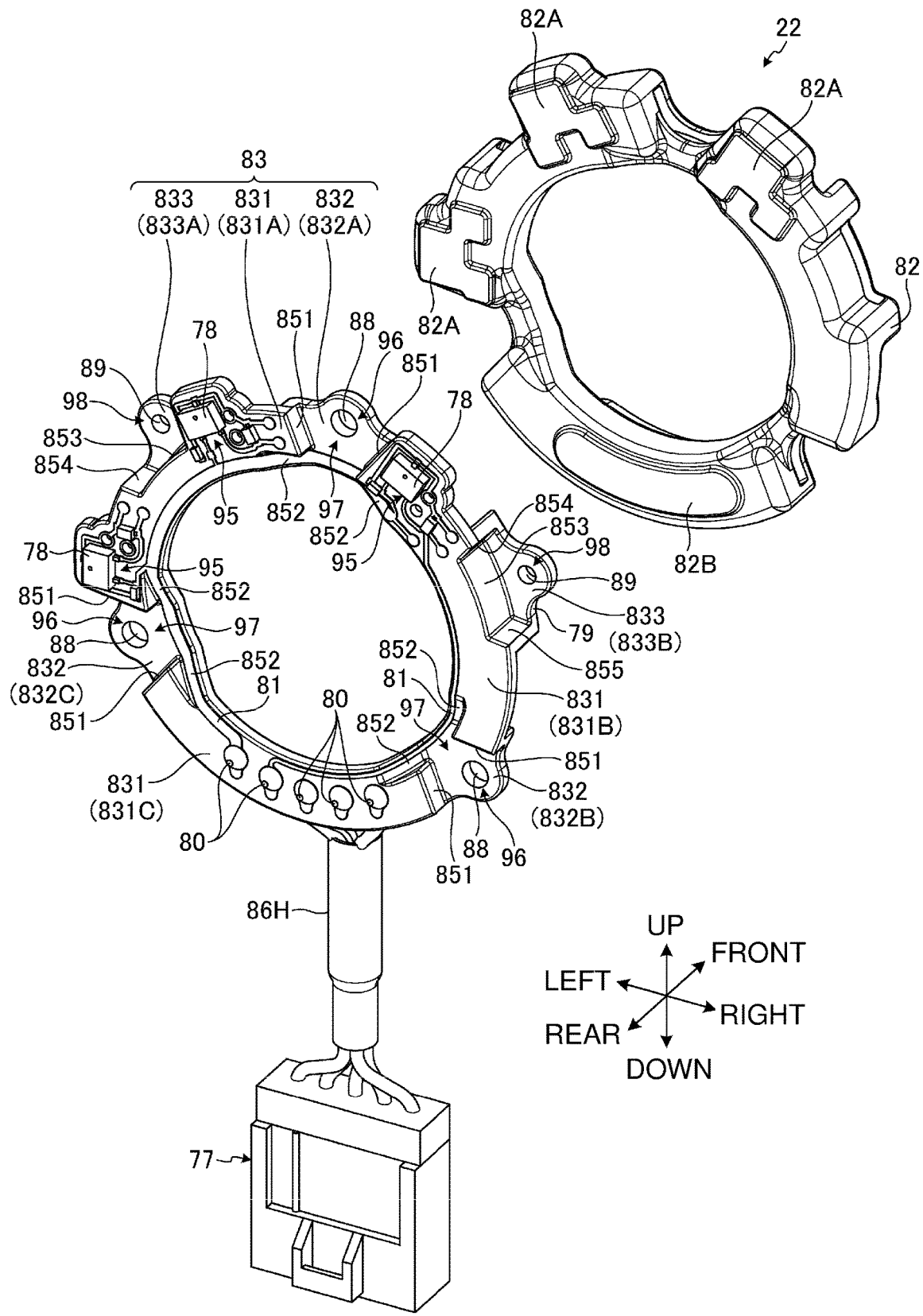
FIG. 23 is an exploded rear perspective view of the sensor unit in the first embodiment.

FIG. 17 is a front perspective view of the sensor unit 22 in the present embodiment. FIG. 18 is a rear perspective view of the sensor unit 22 in the present embodiment. FIG. 19 is a left side view of the sensor unit 22 in the present embodiment. FIG. 20 is a rear view of the sensor unit 22 in the present embodiment. FIG. 21 is a cross-sectional view of the sensor unit 22 in the present embodiment. FIG. 21 is a cross-sectional view taken along line C-C in FIG. 19 as viewed in the direction indicated by arrows. FIG. 22 is an exploded front perspective view of the sensor unit 22 in the present embodiment. FIG. 23 is an exploded rear perspective view of the sensor unit 22 in the present embodiment.

The sensor unit 22 detects rotation of the rotor 23. The sensor unit 22 at least partially faces the rotor 23.

The sensor unit 22 includes a sensor board 76 and a connector 77. The sensor board 76 includes rotation sensors 78, a plate 79, signal terminals 80, signal lines 81, and an insulating member 82.

The plate 79 supports the rotation sensors 78, the signal terminals 80, and the signal lines 81. The plate 79 is annular. The plate 79 surrounds the rotation axis AX. The plate 79 has an opening at its center.

The plate 79 includes a rear surface 83 and a front surface 84. The rear surface 83 faces rearward. The front surface 84 faces frontward. The rear surface 83 is annular. The front surface 84 is annular.

The rear surface 83 of the plate 79 includes first surfaces 831, second surfaces 832, and third surfaces 833. The first surfaces 831 are located rearward from the second surfaces 832. The second surfaces 832 are located rearward from the third surfaces 833. In other words, the third surfaces 833 are located most frontward, followed by the second surfaces 832, and the first surfaces 831 are located most rearward.

The front surface 84 of the plate 79 includes fourth surfaces 841, fifth surfaces 842, and sixth surfaces 843. The sixth surfaces 843 are located frontward from the fifth surfaces 842. The fifth surfaces 842 are located frontward from the fourth surfaces 841. In other words, the sixth surfaces 843 are located most frontward, followed by the fifth surfaces 842, and the fourth surfaces 841 are located most rearward.

The first surfaces 831 face the end face 27F of the rotor core 27. Three first surfaces 831 are located circumferentially at intervals. As shown in FIGS. 21 and 23, the first surfaces 831 include a first surface 831A, a first surface 831B, and a first surface 831C. The first surface 831A is at least partially on the upper left of the rotation axis AX. The first surface 831B is at least partially on the upper right of the rotation axis AX. The first surface 831C is at least partially below the rotation axis AX. The first surface 831A, the first surface 831B, and the first surface 831C are each arc-shaped in a plane orthogonal to the rotation axis AX.

The first surfaces 831 include support areas 95 that receive the rotation sensors 78. The support areas 95 are at three positions on the first surfaces 831. The support areas 95 in the present embodiment are defined at an end of the first surface 831A in the first circumferential direction, at the other end of the first surface 831A in the second circumferential direction, and at an end of the first surface 831B in the second circumferential direction.

The second surfaces 832 face at least parts of the stator 24. Three second surfaces 832 are located circumferentially at intervals. The second surfaces 832 include a second surface 832A, a second surface 832B, and a second surface 832C. The second surface 832A is circumferentially between the first surface 831A and the first surface 831B. The second surface 832B is circumferentially between the first surface 831B and the first surface 831C. The second surface 832C is circumferentially between the first surface 831C and the first surface 831A.

The second surfaces 832 include fastening areas 96 to be fastened to at least parts of the stator 24. The fastening areas 96 in the present embodiment are fastened to at least parts of the busbar unit 36. The fastening areas 96 are in contact with at least parts of the stator 24. The fastening areas 96 are at three positions on the second surfaces 832. The fastening areas 96 in the present embodiment are defined in the second surface 832A, in the second surface 832B, and in the second surface 832C.

The second surfaces 832 each include a non-contact area 97 at least partially surrounding the corresponding fastening area 96. In the present embodiment, each non-contact area 97 is at least partially radially inward from the corresponding fastening area 96. The non-contact areas 97 are not in contact with the stator 24.

The third surfaces 833 face at least parts of the stator 24. Two third surfaces 833 are located circumferentially apart from each other. The third surfaces 833 include a third surface 833A and a third surface 833B. The third surface 833A is adjacent to the first surface 831A. The third surface 833A and the first surface 831A are arranged radially. The third surface 833A is at least partially radially outward from the first surface 831A. The third surface 833A and the first surface 831A have the centers aligned circumferentially. The third surface 833B is adjacent to the first surface 831B. The third surface 833B and the first surface 831B are arranged radially. The third surface 833B is at least partially radially outward from the first surface 831B. The third surface 833B and the first surface 831B have the centers aligned circumferentially.

The third surfaces 833 each include a contact area 98 in contact with at least a part of the stator 24.

The fourth surfaces 841 are opposite to the first surfaces 831. The first surfaces 831 and the fourth surfaces 841 are substantially parallel to each other. As shown in FIG. 22, the fourth surfaces 841 include fourth surfaces 841A, 841B, and 841C. The fourth surface 841A is opposite to the first surface 831A. The fourth surface 841B is opposite to the first surface 831B. The fourth surface 841C is opposite to the first surface 831C.

The fifth surfaces 842 are opposite to the second surfaces 832. The second surfaces 832 and the fifth surfaces 842 are substantially parallel to each other. As shown in FIG. 22, the fifth surfaces 842 include fifth surfaces 842A, 842B, and 842C. The fifth surface 842A is opposite to the second surface 832A. The fifth surface 842B is opposite to the second surface 832B. The fifth surface 842C is opposite to the second surface 832C.

The sixth surfaces 843 are opposite to the third surfaces 833. The third surfaces 833 and the sixth surfaces 843 are substantially parallel to each other. As shown in FIG. 22, the sixth surfaces 843 include sixth surfaces 843A and 843B. The sixth surface 843A is opposite to the third surface 833A. The sixth surface 843B is opposite to the third surface 833B.

The distances between the first surfaces 831 and the fourth surfaces 841, between the second surfaces 832 and the fifth surfaces 842, and between the third surfaces 833 and the sixth surfaces 843 are the same. In other words, the plate 79 has a substantially uniform thickness.

As shown in FIG. 23, the first surfaces 831 and the second surfaces 832 are connected with each other with connecting surfaces 851 and slopes 852 between them. The connecting surfaces 851 are substantially parallel to the rotation axis AX. The slopes 852 are radially inward from the connecting surfaces 851. The slopes 852 slope circumferentially. Each slope 852 slopes frontward from the first surface 831 to the second surface 832.

The first surfaces 831 and the third surfaces 833 are connected with each other with connecting surfaces 853, 854, and 855 between them. The connecting surfaces 853 to 855 are each substantially parallel to the rotation axis AX. The connecting surfaces 853 face radially outward. The connecting surfaces 854 face in the first circumferential direction. The connecting surfaces 855 face in the second circumferential direction.

As shown in FIG. 22, the fourth surfaces 841 and the fifth surfaces 842 are connected with each other with connecting surfaces 856 and slopes 857 between them. The connecting surfaces 856 are substantially parallel to the rotation axis AX. The slopes 857 are radially inward from the connecting surfaces 856. The slopes 857 slope circumferentially. Each slope 857 slopes frontward from the fourth surface 841 to the fifth surface 842.

The fourth surfaces 841 and the sixth surfaces 843 are connected with each other with connecting surfaces 858, 859, and 860 between them. The connecting surfaces 858 to 860 are each substantially parallel to the rotation axis AX. The connecting surfaces 858 face radially inward. The connecting surfaces 859 face in the second circumferential direction. The connecting surfaces 860 face in the first circumferential direction.

The rear surface 83 is annular. The inner edge of the rear surface 83 includes the inner edges of the first surfaces 831, the inner edges of the second surfaces 832, and the inner edges of the slopes 852.

The front surface 84 is annular. The inner edge of the front surface 84 includes the inner edges of the fourth surfaces 841, the inner edges of the fifth surfaces 842, and the inner edges of the slopes 857.

The rotation sensors 78 detect rotation of the rotor 23. The rotation sensors 78 detect the positions of the permanent magnets 29 held in the rotor core 27 to detect the position of the rotor 23 in the rotation direction. The rotation sensors 78 are magnetic sensors each including a Hall device. The plate 79 includes three rotation sensors 78. The three rotation sensors 78 are arranged on an imaginary circle centered on the rotation axis AX. The three rotation sensors 78 are spaced at 60° intervals about the rotation axis AX.

The rotation sensors 78 are radially inward from the coils 35. The rotation sensors 78 are radially inward from the coil stoppers 53. The rotation sensors 78 are located in the support areas 95 in the rear surface 83 of the plate 79 to face the end face 27F of the rotor core 27.

The signal terminals 80 are connected to the rotation sensors 78 with the signal lines 81. The signal terminals 80 are radially inward from the coils 35. The signal terminals 80 are radially inward from the coil stoppers 53. The signal terminals 80 are located on one or more first surfaces 831 to face the end face 27F of the rotor core 27. The signal terminals 80 in the present embodiment are located on the first surface 831C.

The signal lines 81 connect the rotation sensors 78 and the signal terminals 80. The signal lines 81 are at least partially radially inward from the coils 35. The signal lines 81 are radially inward from the coil stoppers 53. The signal lines 81 are at least partially on the plate 79 to face the end face 27F of the rotor core 27.

The signal lines 81 are at least partially on the inner edge of the rear surface 83. The signal lines 81 are at least partially on the inner edges of the first surfaces 831, the inner edges of the second surfaces 832, and the inner edges of the slopes 852.

The signal lines 81 are at least partially on the inner edge of the front surface 84. The signal lines 81 are at least partially on the inner edges of the fourth surfaces 841, the inner edges of the fifth surfaces 842, and the inner edges of the slopes 857.

In the present embodiment, the sensor board 76 includes a molded interconnect device (MID). The signal lines 81 are patterned on the plate 79 by laser radiation on the plate 79.

As described above, the signal lines 81 are located on the first surfaces 831, the second surfaces 832, the slopes 852, the fourth surfaces 841, the fifth surfaces 842, and the slopes 857. To produce the MID, an MID production system directs laser light sequentially onto the first surfaces 831, the second surfaces 832, and the slopes 852. Similarly, the MID production system directs laser light sequentially onto the fourth surfaces 841, the fifth surfaces 842, and the slopes 857.

When, for example, the first surfaces 831 and the second surfaces 832 are connected with each other with the connecting surfaces 851 without the slopes 852 between them, the connecting surfaces 851 are substantially parallel to the rotation axis AX. The MID production system may fail to direct laser light sequentially onto the first surfaces 831, the second surfaces 832, and the connecting surfaces 851. Similarly, when the fourth surfaces 841 and the fifth surfaces 842 are connected with each other with the connecting surfaces 856 without the slopes 857 between them, the connecting surfaces 856 are substantially parallel to the rotation axis AX. The MID production system may fail to direct laser light sequentially onto the fourth surfaces 841, the fifth surfaces 842, and the connecting surfaces 856. In the present embodiment, the first surfaces 831 and the second surfaces 832 are connected with each other with the slopes 852 between them, and the fourth surfaces 841 and the fifth surfaces 842 are connected with each other with the slopes 857 between them. The MID production system can appropriately direct laser light onto the slopes 852 and the slopes 857, thus allowing smooth patterning of the signal lines 81.

The signal terminals 80 are connected with the connector 77 with cables 86. The multiple cables 86 are connected with the connector 77. The cables 86 are tied and held together by a holder 86H. As shown in FIG. 22, the plate 79 has openings 861 to receive at least parts of the cables 86. The openings 861 extend through the first surface 831C and the fourth surface 841C. Having at least parts received in the openings 861, the cables 86 have first ends connected with the signal terminals 80. The cables 86 have second ends extending from the fourth surface 841C and connected with the connector 77.

The connector 77 is located below the sensor board 76. The rotation sensors 78 output detection signals to the controller 9 through the signal lines 81, the signal terminals 80, and the connector 77. The controller 9 supplies a driving current to the coils 35 in response to the detection signals from the rotation sensors 78.

The plate 79 has multiple openings 88 to receive first screws 87. The openings 88 extend through the second surfaces 832 and the fifth surfaces 842. The fastening areas 96 surround the openings 88. Each of the second surfaces 832A to 832C has a single opening 88. In other words, the plate 79 has three openings 88.

The plate 79 has multiple positioning holes 89 to receive the positioning pins 70. The positioning holes 89 extend through the third surfaces 833 and the fifth surfaces 842. The contact areas 98 each surround the corresponding positioning hole 89. Each of the third surface 833A and the third surface 833B has a single positioning hole 89. In other words, the plate 79 has two positioning holes 89.

The insulating member 82 is formed from a synthetic resin. As described above, for the sensor board 76 including an MID, the insulating member 82 is formed from a functional resin usable for the MID. The insulating member 82 is annular and covers at least a part of the surface of the plate 79.

The insulating member 82 covers the first surfaces 831, the inner edges of the second surfaces 832, the connecting surfaces 851, the slopes 852, the connecting surfaces 853, the connecting surfaces 854, the connecting surfaces 855, the fourth surfaces 841, the inner edges of the fifth surfaces 842, the connecting surfaces 856, the slopes 857, the connecting surfaces 858, the connecting surfaces 859, and the connecting surfaces 860. The openings 88 and the positioning holes 89 are uncovered by the insulating member 82.

The insulating member 82 covers the rotation sensors 78, the signal terminals 80, and the signal lines 81.

The insulating member 82 has, on its rear surface, three first ridges 82A and a second ridge 82B. The first ridges 82A protrude rearward from the rear surface of the insulating member 82 to cover the rotation sensors 78. Each first ridge 82A covers one rotation sensor 78. The second ridge 82B protrudes rearward from the rear surface of the insulating member 82 to cover the signal terminals 80.

Connection Between the Busbar Unit and the Sensor Unit

Figure 24:
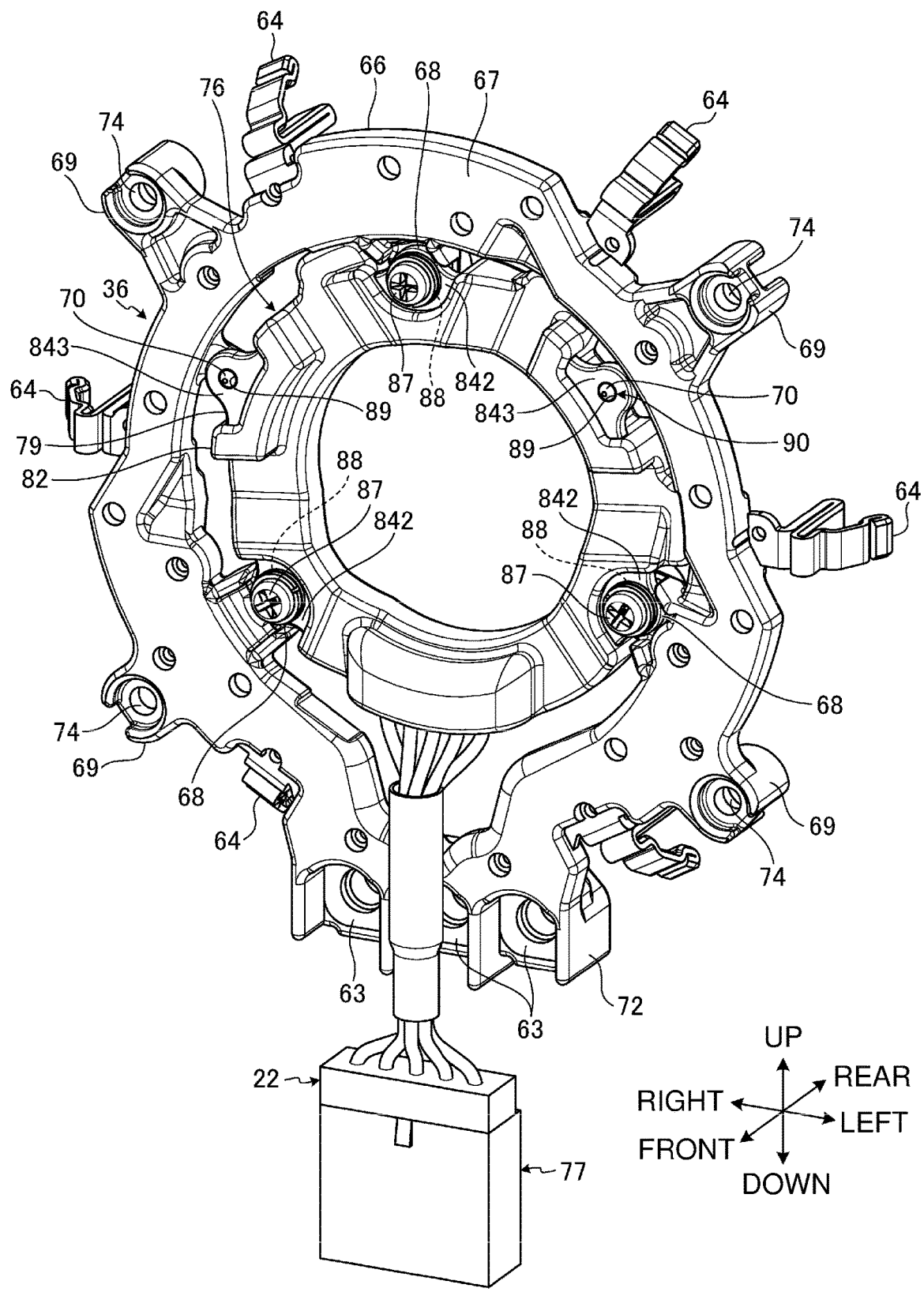
FIG. 24 is a front perspective view of the busbar unit and the sensor unit in the first embodiment.
Figure 25:
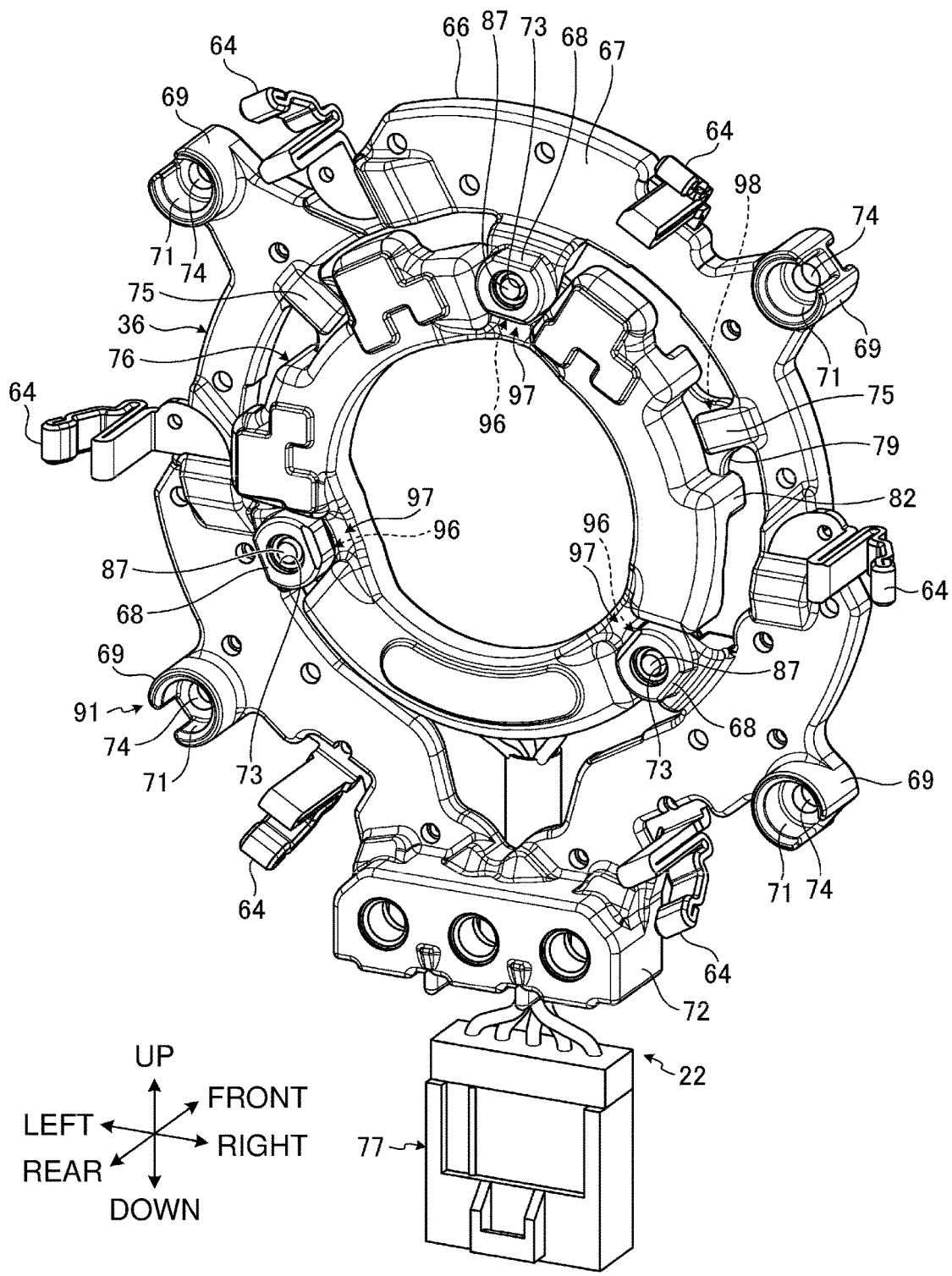
FIG. 25 is a rear perspective view of the busbar unit and the sensor unit in the first embodiment.
Figure 26:
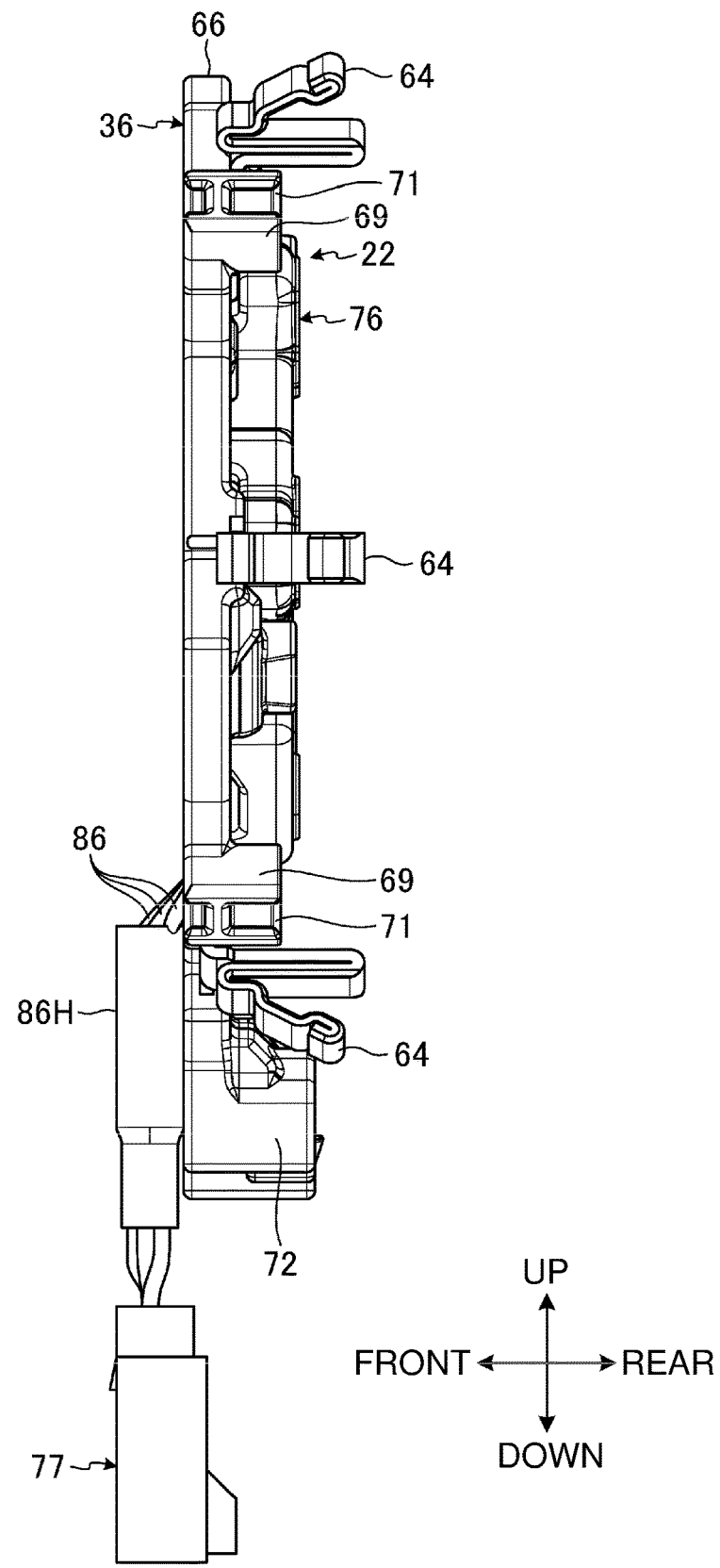
FIG. 26 is a left side view of the busbar unit and the sensor unit in the first embodiment.
Figure 27:
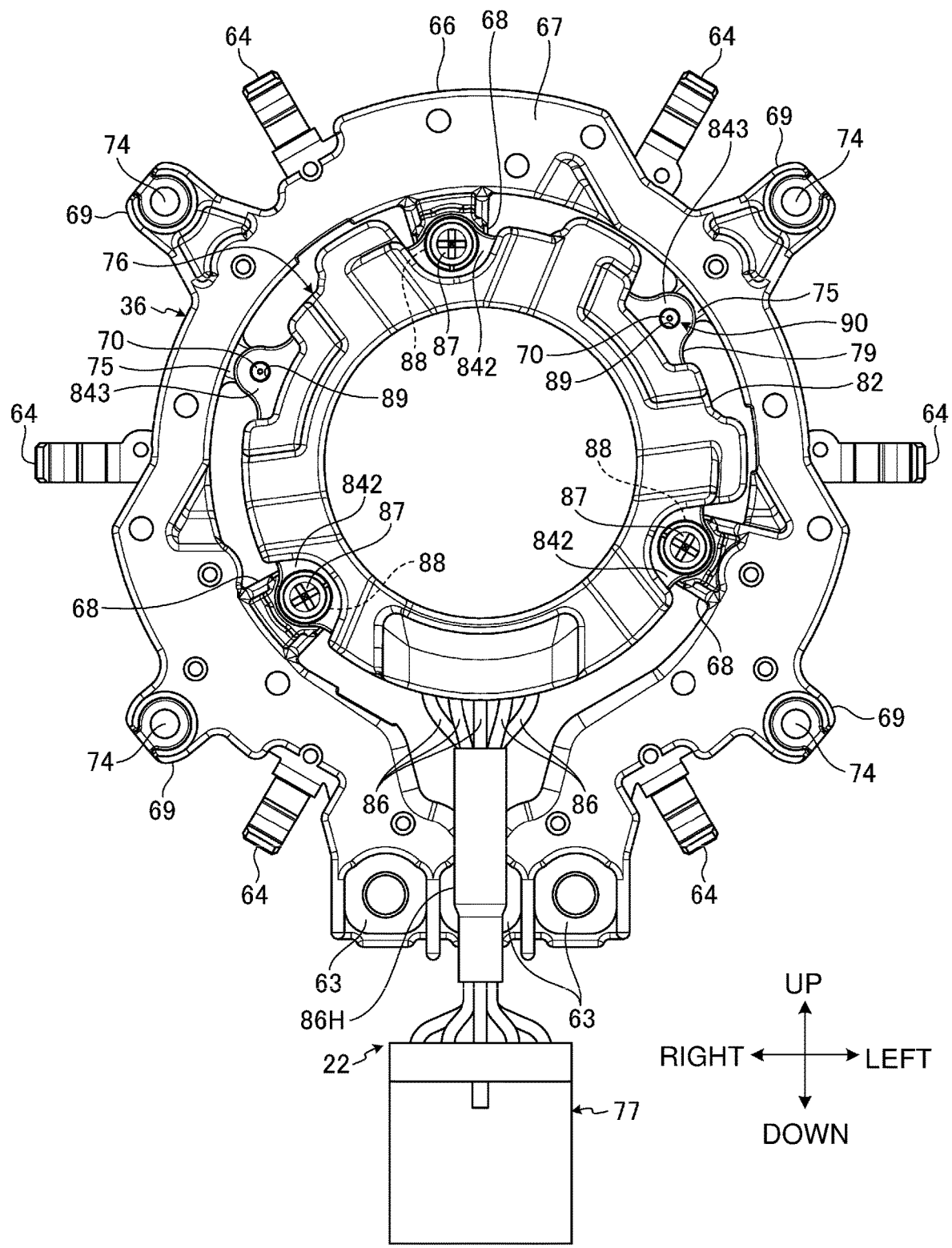
FIG. 27 is a front view of the busbar unit and the sensor unit in the first embodiment.
Figure 28:
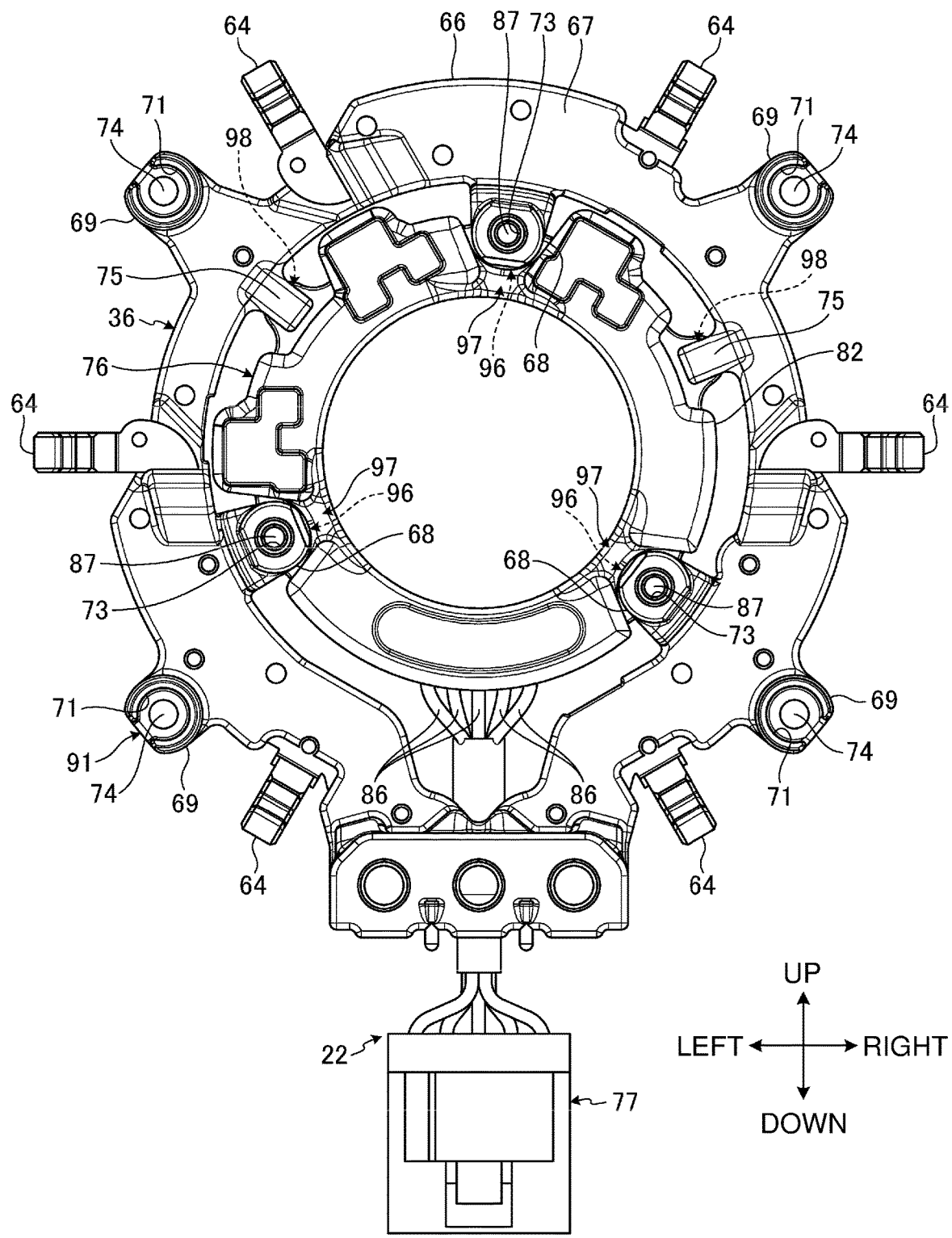
FIG. 28 is a rear view of the busbar unit and the sensor unit in the first embodiment.

FIG. 24 is a front perspective view of the busbar unit 36 and the sensor unit 22 in the present embodiment. FIG. 25 is a rear perspective view of the busbar unit 36 and the sensor unit 22 in the present embodiment. FIG. 26 is a left side view of the busbar unit 36 and the sensor unit 22 in the present embodiment. FIG. 27 is a front view of the busbar unit 36 and the sensor unit 22 in the present embodiment. FIG. 28 is a rear view of the busbar unit 36 and the sensor unit 22 in the present embodiment. The busbar unit 36 is included in the stator 24.

The insulating member 66 in the busbar unit 36 includes the base 67, the first screw bosses 68, the second screw bosses 69, the positioning pins 70, the supports 75, and the positioning recesses 71.

The first screw bosses 68 protrude radially inward from the inner edge of the base 67. The front surfaces of the first screw bosses 68 are located rearward from the front surface of the base 67. The rear surfaces of the first screw bosses 68 are located rearward from the rear surface of the base 67.

The supports 75 protrude radially inward from the inner edge of the base 67. The front surfaces of the supports 75 are located rearward from the front surface of the base 67.

The motor assembly 6 includes a first positioner 90. The first positioner 90 positions the plate 79 in the sensor unit 22 and the insulating member 66 in the busbar unit 36. The first positioner 90 includes the positioning pins 70 in the insulating member 66 and the positioning holes 89 in the plate 79. The positioning pins 70 in the positioning holes 89 position the plate 79 and the insulating member 66. The contact areas 98 surrounding the positioning holes 89 in the third surfaces 833 are in contact with the front surfaces of the supports 75.

The motor assembly 6 includes the first screws 87 to fasten the fastening areas 96 in the plate 79 and the insulating member 66 together. The first screws 87 are received in the screw holes 73 in the first screw bosses 68 in the insulating member 66 through the openings 88 in the plate 79. The first screws 87 fasten the plate 79 and the insulating member 66 together. The fastening areas 96 surrounding the openings 88 in the second surfaces 832 are in contact with the front surfaces of the first screw bosses 68. The first screws 87 fasten the fastening areas 96 in the plate 79 to the front surfaces of the first screw bosses 68.

The non-contact areas 97 are radially inward from the fastening areas 96 in the second surfaces 832. As shown in FIGS. 25 and 28, the non-contact areas 97 do not face the busbar unit 36 and are not in contact with the busbar unit 36. The insulating member 82 covering the non-contact areas 97 in the plate 79 does not face the busbar unit 36 and is not in contact with the busbar unit 36.

The sensor board 76 is located inside the base 67 in the insulating member 66. The front surface of the sensor board 76 is located rearward from the front surface of the base 67. The rear surface of the sensor board 76 is located rearward from the rear surface of the base 67.

Fastening of the Busbar Unit to the Insulator

The motor assembly 6 includes a second positioner 91 to position the insulating member 66 in the busbar unit 36 and the insulator 34. The second positioner 91 includes the screw bosses 57 in the insulator 34 and the positioning recesses 71 in the insulating member 66. The screw bosses 57 serve as positioning protrusions placed in the positioning recesses 71. The screw bosses 57 in the positioning recesses 71 position the insulating member 66 in the busbar unit 36 and the insulator 34.

The insulating member 66 in the busbar unit 36 is fastened to the insulator 34. As shown in FIGS. 5 to 8, the motor assembly 6 includes second screws 92 to fasten the insulating member 66 in the busbar unit 36 and the insulator 34 together. The second screws 92 are received in the second screw bosses 69 in the insulating member 66 and in the screw bosses 57 in the insulator 34. The second screws 92 are received in the screw holes 61 in the screw bosses 57 through the openings 74 in the second screw bosses 69 to fasten the insulating member 66 in the busbar unit 36 and the insulator 34 together. The busbar unit 36 is at least partially farther in the first axial direction than the insulator 34.

As described above, the connection wires 62 and the fuse terminals 64 are connected with each other. Each connection wire 62 is placed in the bent portion of the corresponding fuse terminal 64. Each connection wire 62 is welded to the corresponding fuse terminal 64.

The sensor board 76 is located frontward from the rotor core 27. The support areas 95 in the sensor board 76 face the end face 27F of the rotor core 27. The sensor board 76 in the sensor unit 22 surrounds a front portion of the rotor shaft 28. The rotation sensors 78 face the end face 27F of the rotor core 27. The rotation sensors 78 facing the end face 27F of the rotor core 27 detect rotation of the rotor 23. The rotation sensors 78 detect magnetic flux of the permanent magnets 29 to detect the position of the rotor 23 in the rotation direction.

Relationship Between the Sensor Unit and the Stator

Figure 29:
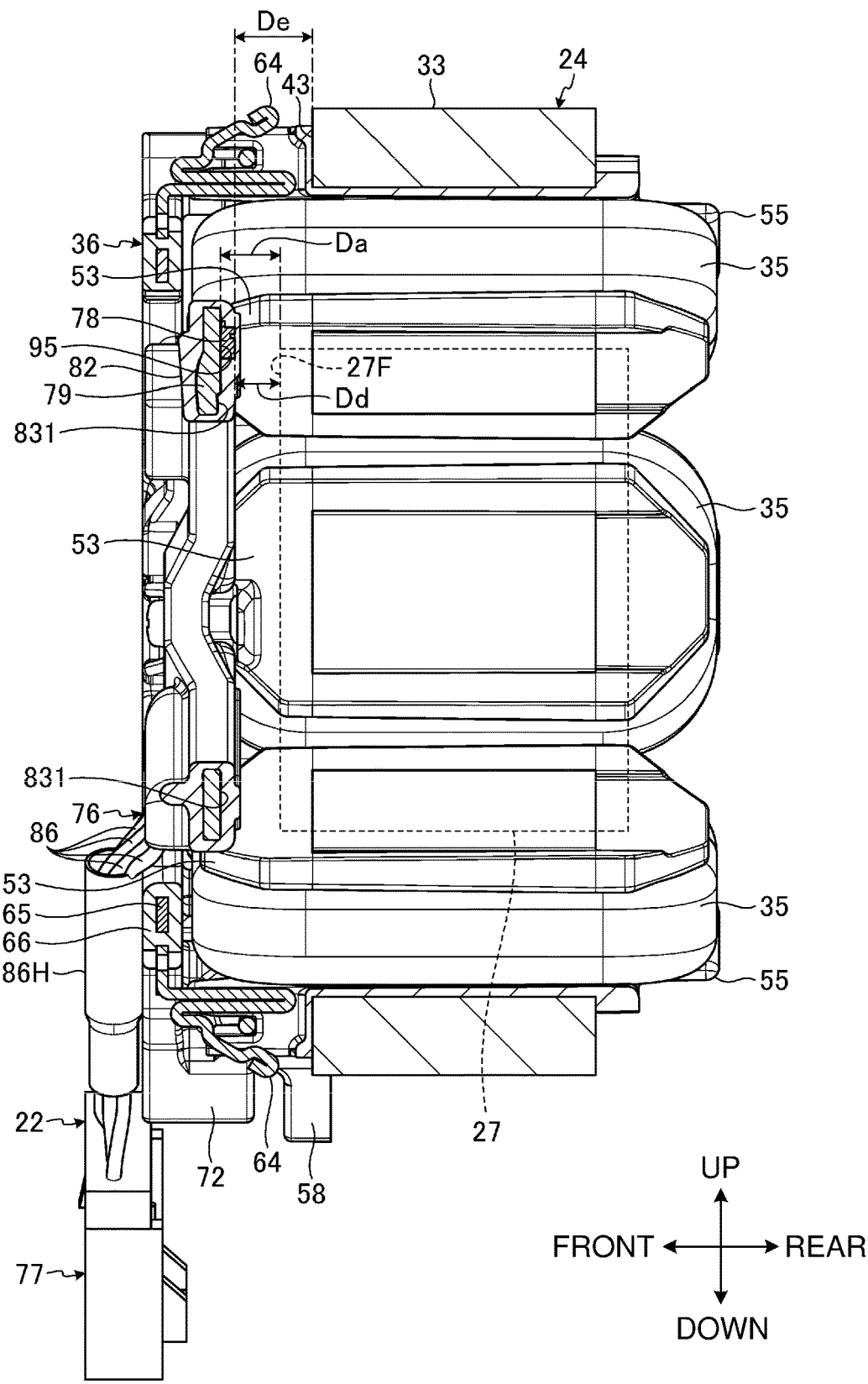
FIG. 29 is a cross-sectional view of the motor assembly in the first embodiment.
Figure 30:
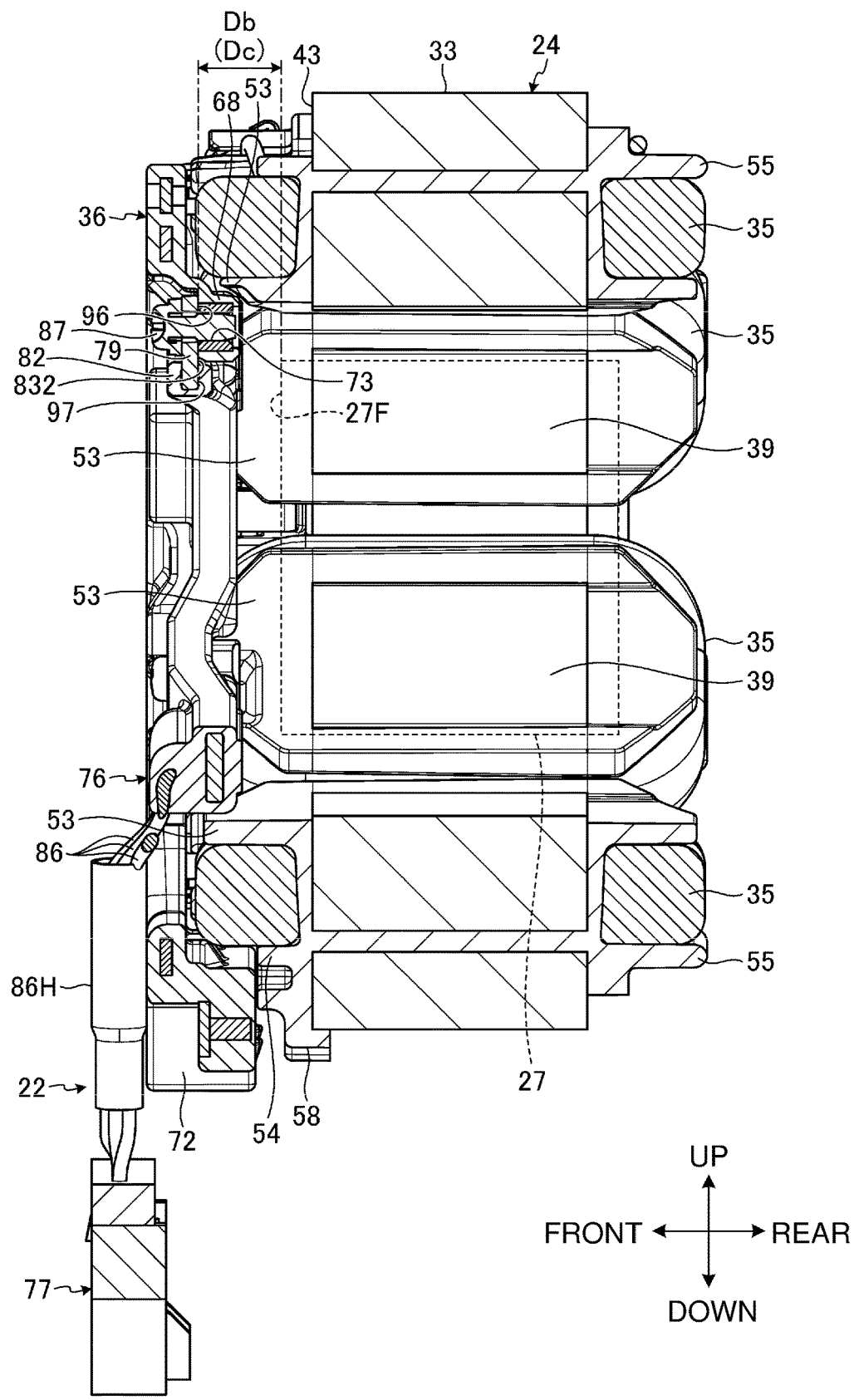
FIG. 30 is a cross-sectional view of the motor assembly in the first embodiment.
Figure 31:
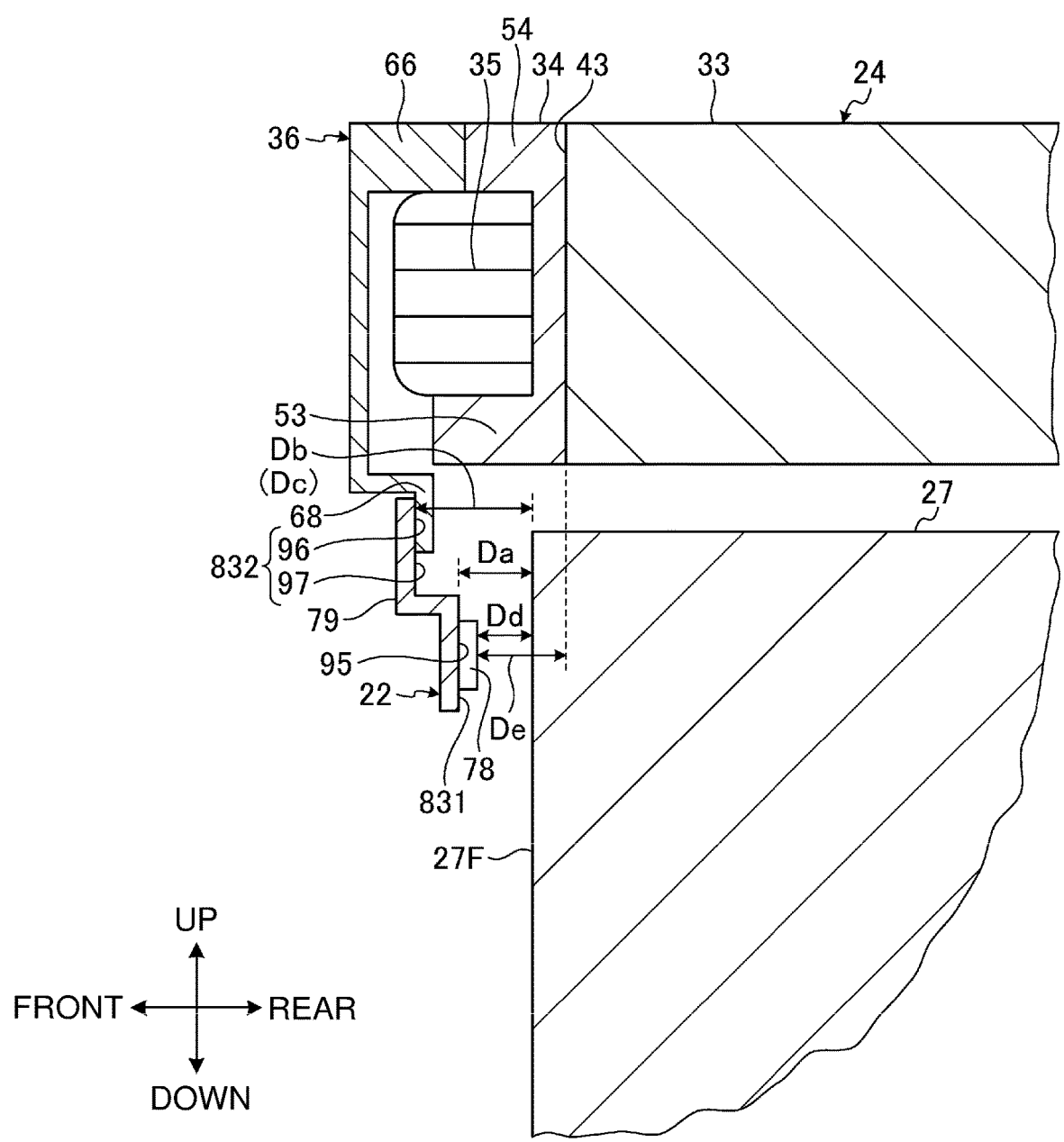
FIG. 31 is a schematic diagram describing the relationship between the sensor unit and the stator in the first embodiment.

FIGS. 29 and 30 each are a cross-sectional view of the motor assembly 6 in the present embodiment. FIG. 29 is a cross-sectional view taken along line A-A in FIG. 6 as viewed in the direction indicated by arrows. FIG. 30 is a cross-sectional view taken along line B-B in FIG. 6 as viewed in the direction indicated by arrows. FIG. 31 is a schematic diagram describing the relationship between the sensor unit 22 and the stator 24 in the present embodiment.

As described above, the rotation sensors 78 are located on the support areas 95 in the first surfaces 831 in the plate 79. The second surfaces 832 in the plate 79 face at least parts of the stator 24. The fastening areas 96 in the second surfaces 832 each face the front surface of the corresponding first screw boss 68 in the stator 24. The fastening areas 96 are radially inward from the coils 35. The non-contact areas 97 are radially inward from the fastening areas 96. The non-contact areas 97 in the second surfaces 832 are radially inward from the first screw bosses 68. The non-contact areas 97 in the second surfaces 832 do not face the stator 24.

In the axial direction, a distance Da between the support areas 95 in the first surfaces 831 in the plate 79 and the end face 27F of the rotor core 27 is shorter than a distance Db between at least a part of the second surfaces 832 and the end face 27F of the rotor core 27. In the present embodiment, the distance Db is a distance between the fastening areas 96 in the second surfaces 832 and the end face 27F of the rotor core 27. In the axial direction, the distance Da between the support areas 95 in the first surfaces 831 and the end face 27F of the rotor core 27 is shorter than the distance Db between the fastening areas 96 in the second surfaces 832 and the end face 27F of the rotor core 27. In other words, in the axial direction, the support areas 95 are located rearward from the fastening areas 96 (nearer the rotor core 27).

In the axial direction, the distance Da between the support areas 95 in the first surfaces 831 and the end face 27F of the rotor core 27 is shorter than a distance Dc between the non-contact areas 97 in the second surfaces 832 and the end face 27F of the rotor core 27. In the present embodiment, distance Db is equal to the distance Dc.

The insulator 34 includes the coil stoppers 53 radially inward from the coils 35. The rotation sensors 78 and at least parts of the coil stoppers 53 are aligned in the axial direction. In other words, the rotation sensors 78 have the rear ends rearward from the front ends of the coil stoppers 53.

In the axial direction, a distance Dd between the rotation sensors 78 and the end face 27F of the rotor core 27 is shorter than a distance De between the rotation sensors 78 and the end face 43 of the stator core 33. The distance Dd is a distance between the rear ends of the rotation sensors 78 and the end face 27F in the axial direction. The distance De is a distance between the rear ends of the rotation sensors 78 and the end face 43 in the axial direction.

As described above, the sensor board 76 in the present embodiment includes the rotation sensors 78 and the plate 79 supporting the rotation sensors 78. The plate 79 includes the first surfaces 831 facing the end face 27F of the rotor core 27 and the second surfaces 832 facing at least parts of the stator 24. The rotation sensors 78 are located on the support areas 95 in the first surfaces 831 to face the end face 27F of the rotor core 27. The distance Da between the support areas 95 and the end face 27F of the rotor core 27 is shorter than the distance Db between at least a part of the second surfaces 832 and the end face 27F of the rotor core 27. The support areas 95 are located rearward from at least parts of the second surfaces 832 (nearer the rotor core 27). This structure downsizes the motor assembly 6 in the axial direction. This reduces the size and weight of the motor assembly 6 in the electric work machine 1.

The second surfaces 832 include the fastening areas 96 to be fastened to at least parts of the stator 24. The sensor board 76 is thus fastened to the stator 24 with the fastening areas 96 between them.

The distance Da is shorter than the distance Db between the fastening areas 96 and the end face 27F of the rotor core 27. This structure downsizes the motor assembly 6 in the axial direction.

The second surfaces 832 each include the non-contact area 97 at least partially surrounding the corresponding fastening area 96. The distance Da is shorter than the distance Dc between the non-contact areas 97 and the end face 27F of the rotor core 27. This structure downsizes the motor assembly 6 in the axial direction.

The stator 24 includes the stator core 33 surrounding the rotor 23, the insulator 34 fixed to the stator core 33, the multiple coils 35 fixed to the insulator 34, the short-circuiting members 65 for short-circuiting the pairs of coils 35, and the insulating member 66 supporting the short-circuiting members 65. The fastening areas 96 are fastened to the insulating member 66 in the busbar unit 36. The sensor board 76 is thus fastened to the busbar unit 36 with the fastening areas 96 between them.

The plate 79 surrounds the rotation axis AX. The insulating member 66 surrounds the rotation axis AX. The plate 79 is at least partially radially inward from the insulating member 66. This structure downsizes the motor assembly 6 in the radial direction.

The motor assembly 6 includes the first screws 87 fastening the fastening areas 96 and the insulating member 66 in the busbar unit 36 together. The sensor board 76 is thus fastened to the busbar unit 36 with the first screws 87.

The insulating member 66 includes the annular base 67 and the first screw bosses 68 protruding radially inward from the inner edge of the base 67. The first screws 87 are received in the screw holes 73 in the first screw bosses 68. The sensor board 76 is thus radially inward from the insulating member 66 and is fastened to the insulating member 66 in the busbar unit 36.

The motor assembly 6 includes the first positioner 90 positioning the plate 79 and the insulating member 66. The plate 79 and the insulating member 66 are thus positioned and fastened together.

The insulating member 66 includes the supports 75 radially inward from the base 67 and the positioning pins 70 protruding frontward from the supports 75. The plate 79 has the positioning holes 89 to receive the positioning pins 70. The first positioner 90 includes the positioning pins 70 and the positioning holes 89. The positioning pins 70 placed in the positioning holes 89 position the plate 79 and the insulating member 66.

The motor assembly 6 includes the second screws 92 fastening the insulating member 66 in the busbar unit 36 and the insulator 34 together. The busbar unit 36 is thus fastened to the insulator 34 with the second screws 92.

The insulating member 66 includes the annular base 67 and the second screw bosses 69 protruding radially outward from the outer edge of the base 67. The second screws 92 are placed in the openings 74 in the second screw bosses 69. The second screws 92 are received in the screw holes 61 in the screw bosses 57 in the insulator 34 through the second screw bosses 69. The busbar unit 36 is thus radially outward from the sensor board 76 and is fastened to the insulator 34. After the busbar unit 36 and the insulator 34 are fastened together with the second screws 92, the fuse terminals 64 and the connection wires 62 are welded together smoothly.

The motor assembly 6 includes the second positioner 91 positioning the insulating member 66 in the busbar unit 36 and the insulator 34. The insulating member 66 and the insulator 34 are thus positioned and fastened together.

The insulating member 66 includes the positioning recesses 71 radially outward from the base 67 and recessed frontward. The insulator 34 includes the screw bosses 57 serving as positioning protrusions placed in the positioning recesses 71. The second positioner 91 includes the positioning recesses 71 and the screw bosses 57. The screw bosses 57 placed in the positioning recesses 71 position the insulating member 66 and the insulator 34.

The insulator 34 includes the coil stoppers 53 radially inward from the coils 35. The rotation sensors 78 and at least parts of the coil stoppers 53 are aligned in the axial direction. The rotation sensors 78 are at least partially rearward from the front ends of the coil stoppers 53 (nearer the rotor core 27). This structure downsizes the motor assembly 6 in the axial direction. This downsizes the motor assembly 6 in the electric work machine 1.

The rotation sensors 78 are radially inward from the coil stoppers 53. This structure downsizes the motor assembly 6 in the radial direction.

The distance Dd between the rotation sensors 78 and the end face 27F of the rotor core 27 is shorter than the distance De between the rotation sensors 78 and the end face 43 of the stator core 33. In this structure, the rotation sensors 78 are less likely to be placed inside the stator core 33. The rotation sensors 78 can thus accurately detect rotation of the rotor 23.

Other Examples

Figure 32:
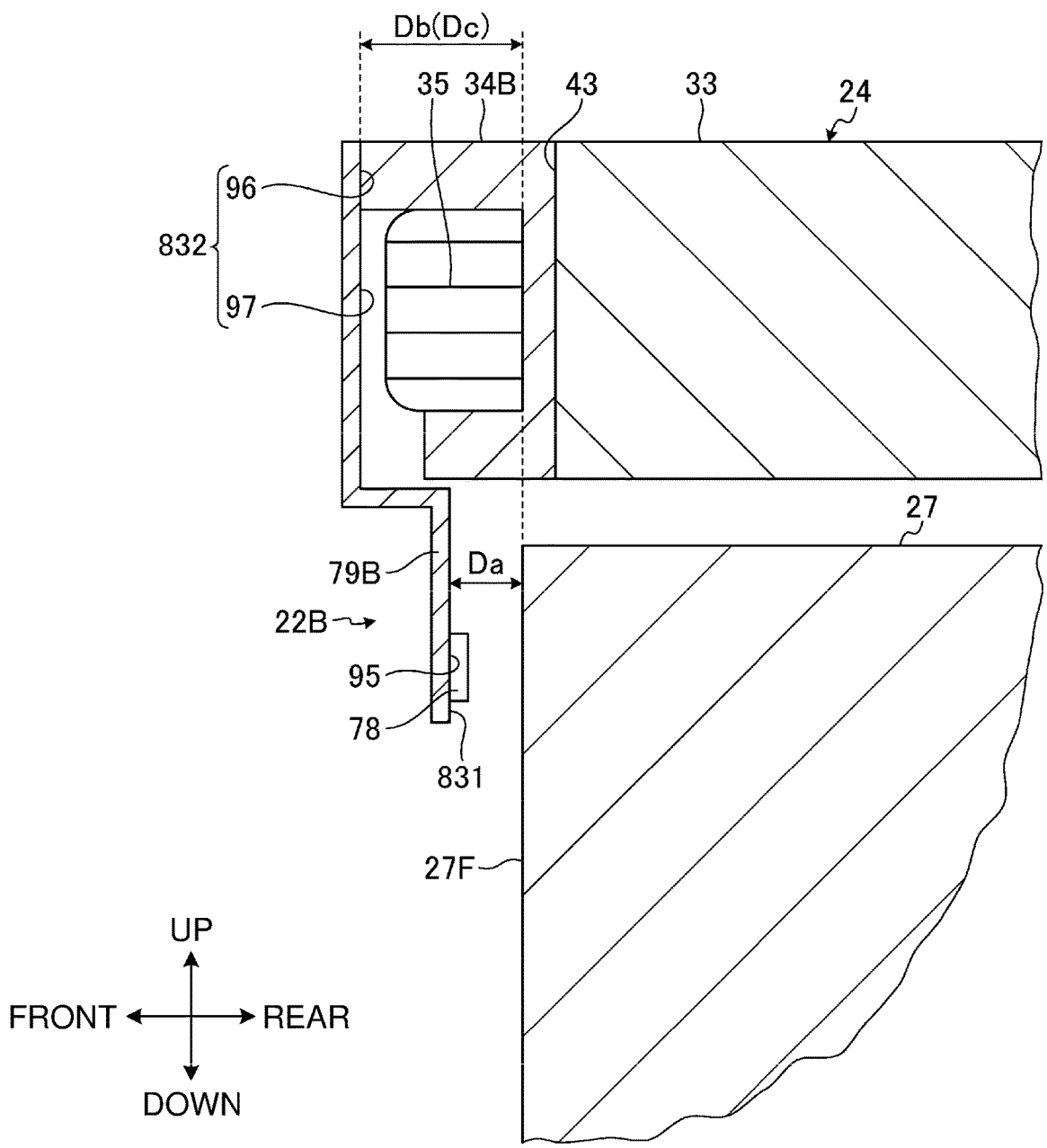
FIG. 32 is a schematic diagram describing the relationship between a sensor unit in another example of the first embodiment and the stator.

FIG. 32 is a schematic diagram describing the relationship between a sensor unit 22B in another example of the present embodiment and the stator 24. The sensor unit 22B includes the rotation sensors 78 and a plate 79B supporting the rotation sensors 78. The plate 79B includes the first surfaces 831 and the second surfaces 832. The first surfaces 831 face the end face 27F of the rotor core 27. The second surfaces 832 face at least parts of the stator 24. The rotation sensors 78 are located on the support areas 95 in the first surfaces 831 to face the end face 27F of the rotor core 27. The second surfaces 832 include the fastening areas 96 and the non-contact areas 97. The fastening areas 96 are fastened to an insulator 34B in the stator 24. The non-contact areas 97 are radially inward from the fastening areas 96. In the example shown in FIG. 32, the fastening areas 96 are radially outward from the coils 35. The non-contact areas 97 are not in contact with the stator 24. In the axial direction, the distance Da between the support areas 95 and the end face 27F of the rotor core 27 is shorter than the distance Db between the fastening areas 96 and the end face 27F of the rotor core 27. The distance Da is shorter than the distance Dc between the non-contact areas 97 and the end face 27F of the rotor core 27. In the example shown in FIG. 32, the distance Db is equal to the distance Dc. As shown in FIG. 32, the fastening areas 96 may be radially outward from the coils 35.

Figure 33:
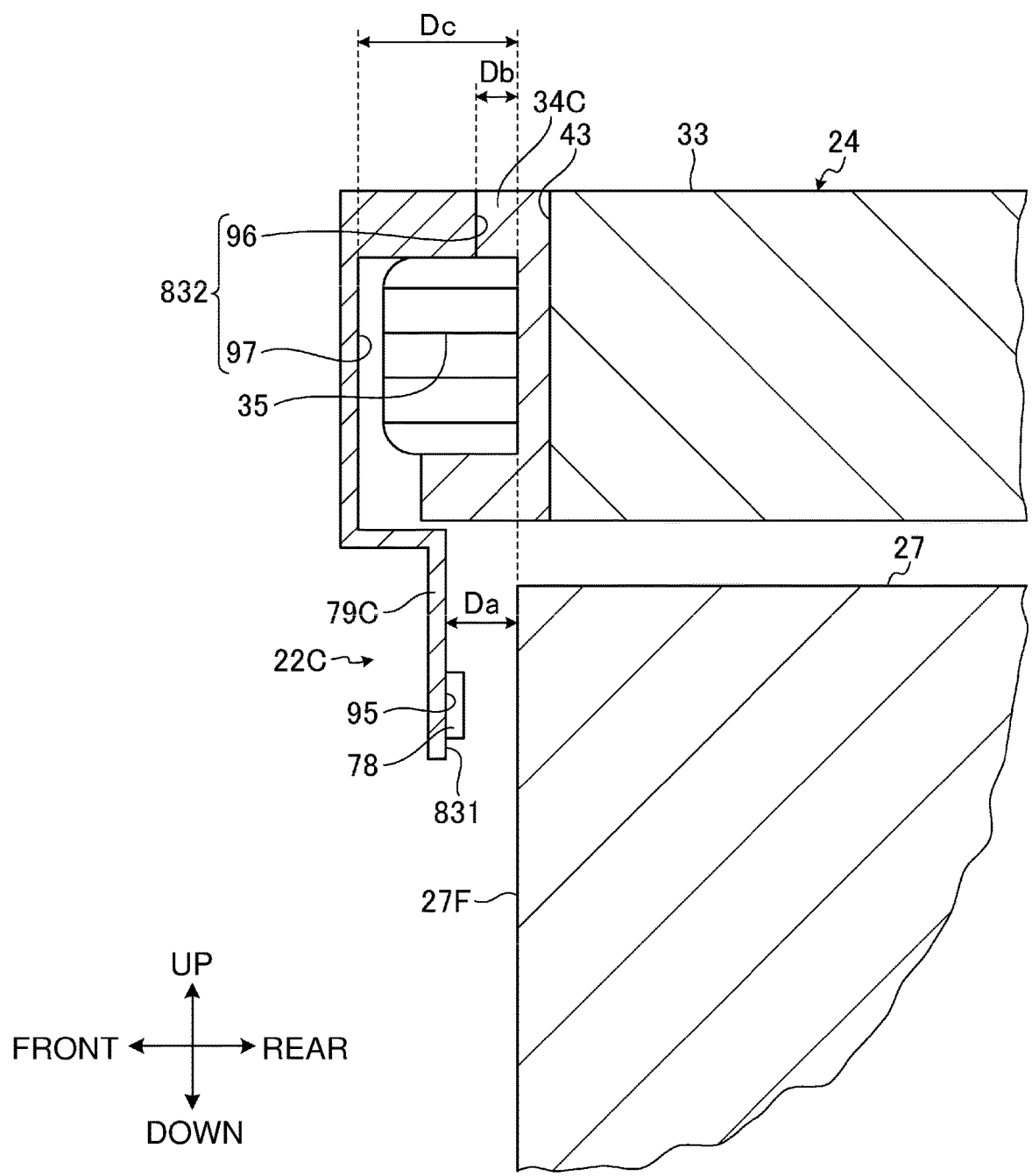
FIG. 33 is a schematic diagram describing the relationship between a sensor unit in still another example of the first embodiment and the stator.

FIG. 33 is a schematic diagram describing the relationship between a sensor unit 22C in still another example of the present embodiment and the stator 24. The sensor unit 22C includes the rotation sensors 78 and a plate 79C supporting the rotation sensors 78. The plate 79C includes the first surfaces 831 and the second surfaces 832. The first surfaces 831 face the end face 27F of the rotor core 27. The second surfaces 832 face at least parts of the stator 24. The rotation sensors 78 are located on the support areas 95 in the first surfaces 831 to face the end face 27F of the rotor core 27. The second surfaces 832 include the fastening areas 96 and the non-contact areas 97. The fastening areas 96 are fastened to an insulator 34C in the stator 24. The non-contact areas 97 are radially inward from the fastening areas 96. In the example shown in FIG. 33, the fastening areas 96 are radially outward from the coils 35. The non-contact areas 97 are not in contact with the stator 24. In the axial direction, the distance Da between the support areas 95 and the end face 27F of the rotor core 27 is longer than the distance Db between the fastening areas 96 and the end face 27F of the rotor core 27. The distance Da is shorter than the distance Dc between the non-contact areas 97 and the end face 27F of the rotor core 27. The distance Dc is longer than the distance Db. As shown in FIG. 33, in the axial direction, the distance Da between the support areas 95 and the end face 27F of the rotor core 27 may be longer than the distance Db between the fastening areas 96 and the end face 27F of the rotor core 27. In the axial direction, the distance Da between the support areas 95 and the end face 27F of the rotor core 27 may be shorter than a distance between at least a part of the second surfaces 832 and the end face 27F of the rotor core 27.

In the above embodiment, an end face of the rotor 23 is the end face 27F of the rotor core 27. The first surfaces 831 face the end face 27F of the rotor core 27. One or more sensor magnets other than the permanent magnets 29 may be located on the end face 27F of the rotor core 27. The sensor magnets allow the rotation sensors 78 to detect rotation of the rotor 23. In this case, an end face of the rotor 23 may include an end face of each sensor magnet. The distance Dd described above may be the distance between the rotation sensors and the sensor magnets.

Second Embodiment

A second embodiment will now be described. The same or corresponding components as those in the above embodiment are given the same reference numerals herein and will be described briefly or will not be described.

Figure 34:
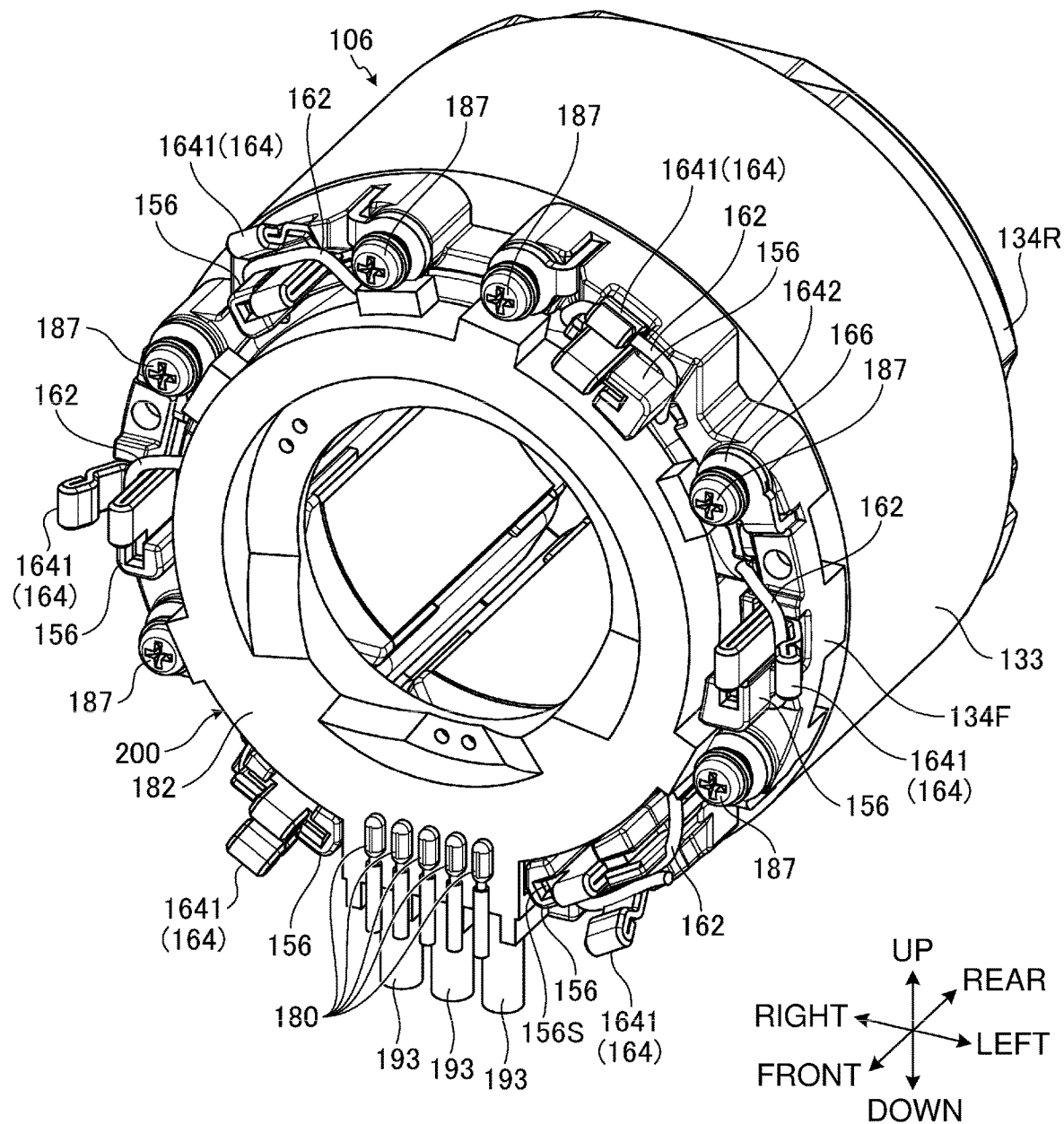
FIG. 34 is a front perspective view of a stator in a second embodiment.
Figure 35:
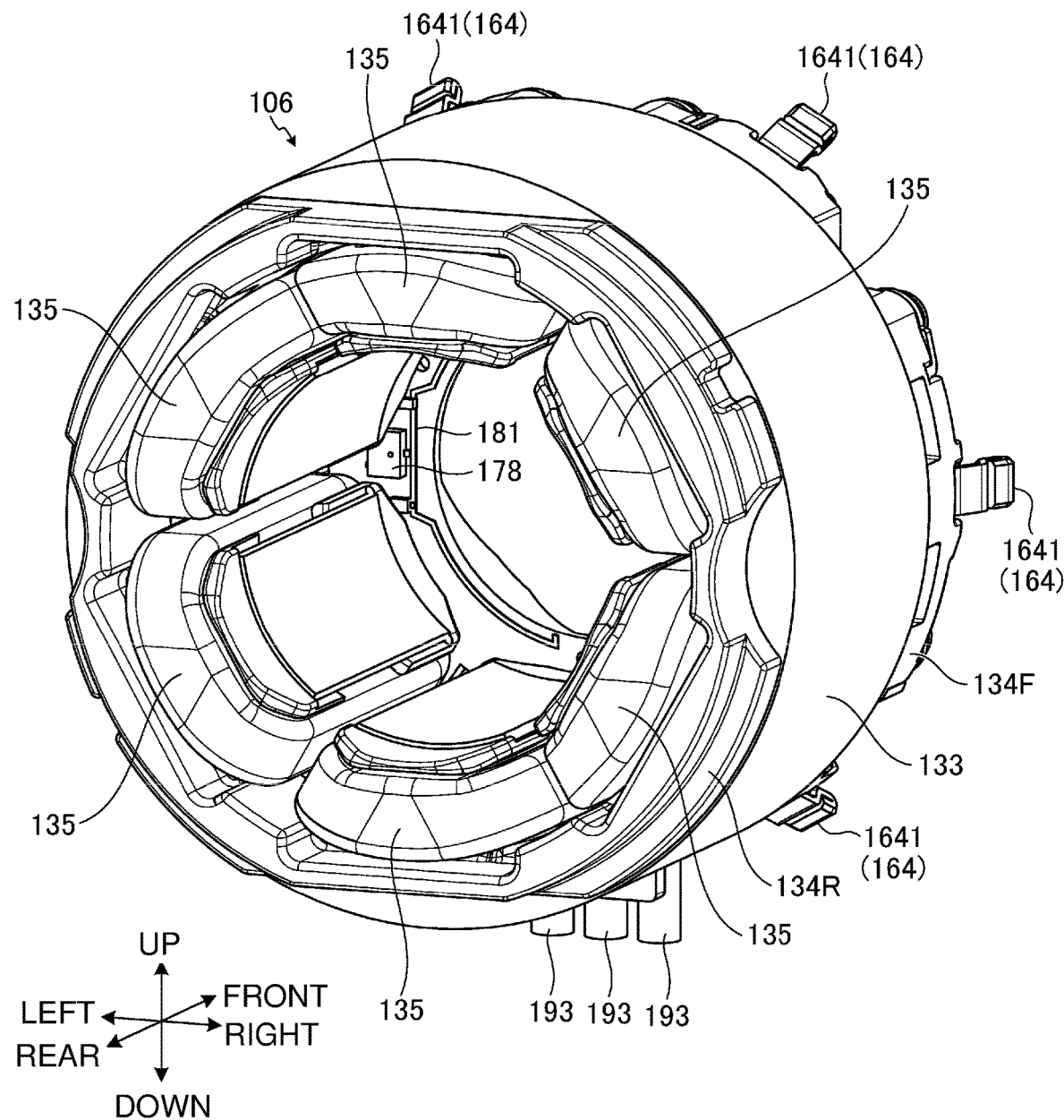
FIG. 35 is a rear perspective view of the stator in the second embodiment.
Figure 36:
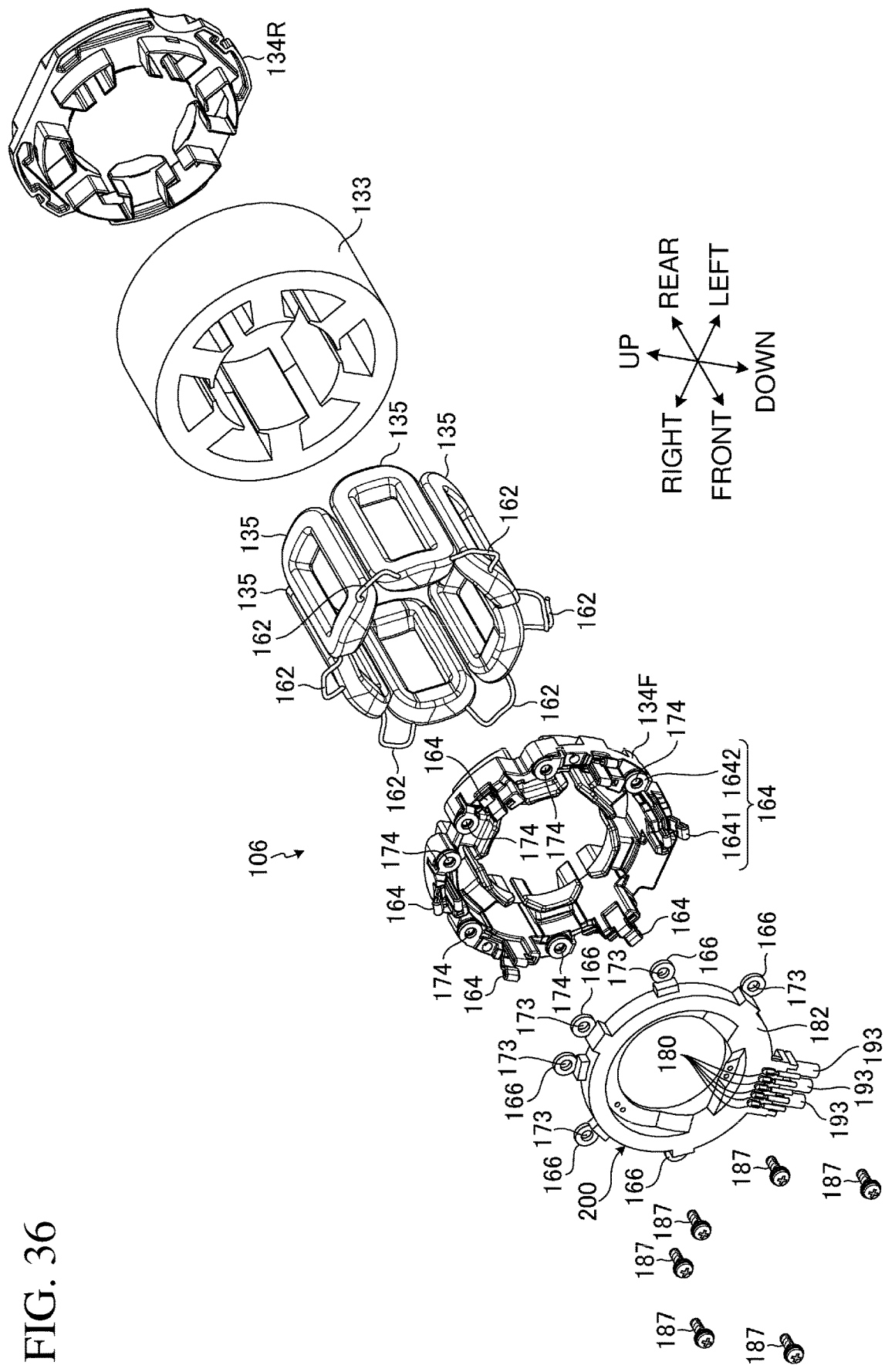
FIG. 36 is an exploded front perspective view of the stator in the second embodiment.
Figure 37:
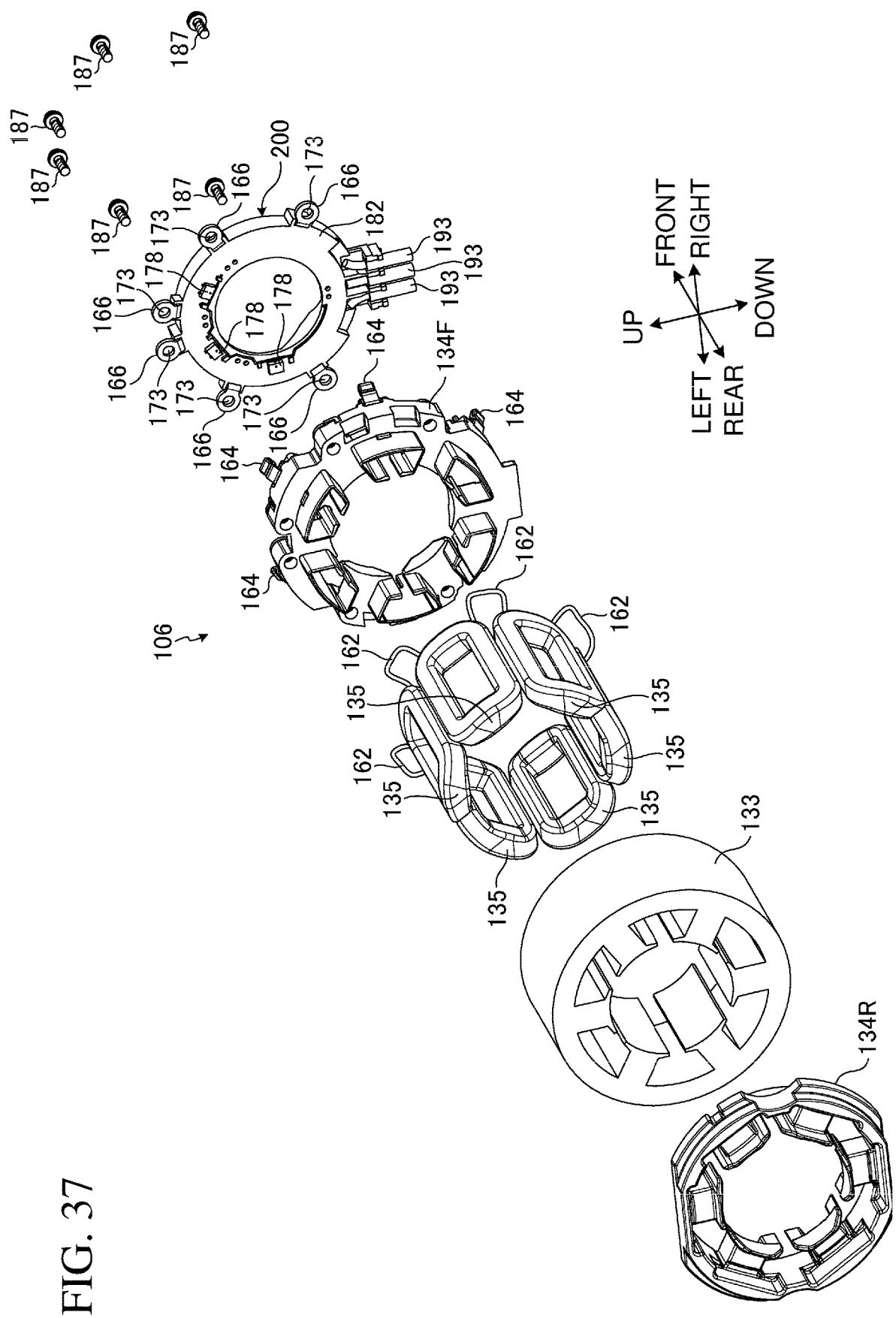
FIG. 37 is an exploded rear perspective view of the stator in the second embodiment.

FIG. 34 is a front perspective view of a motor assembly 106 in the present embodiment. FIG. 35 is a rear perspective view of the motor assembly 106 in the present embodiment. FIG. 36 is an exploded front perspective view of the motor assembly 106 in the present embodiment. FIG. 37 is an exploded rear perspective view of the motor assembly 106 in the present embodiment.

In the first embodiment, the insulating member 66 in the busbar unit 36 supports the short-circuiting members 65, and the plate 79 in the sensor board 76 supports the rotation sensors 78. The motor assembly 106 in the present embodiment includes a busbar unit 200 including short-circuiting members 165 and rotation sensors 178 that are integral with one another.

The motor assembly 106 includes a stator core 133, a front insulator 134F, a rear insulator 134R, coils 135, and the busbar unit 200.

The stator core 133 has the same structure as the stator core 33 described in the above embodiment. The front insulator 134F is fastened to the front of the stator core 133. The rear insulator 134R is fastened to the rear of the stator core 133. The coils 135 are wound around the stator core 133 with the front insulator 134F and the rear insulator 134R between them. The coils 135 have the same structure as the coils 35 described in the above embodiment. Each pair of coils 135 are connected together with a connection wire 162.

Figure 38:
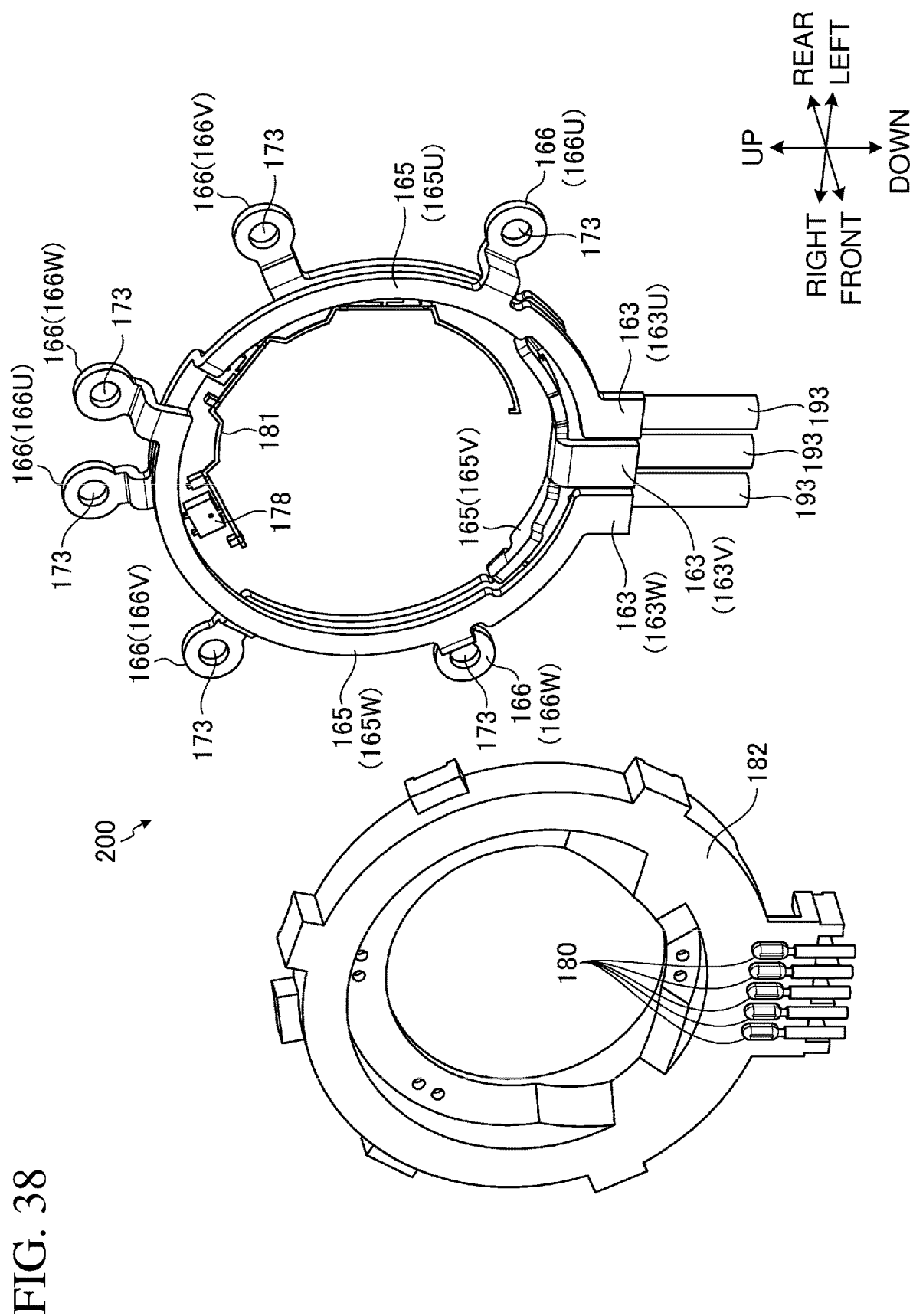
FIG. 38 is an exploded front perspective view of a busbar unit in the second embodiment.
Figure 39:
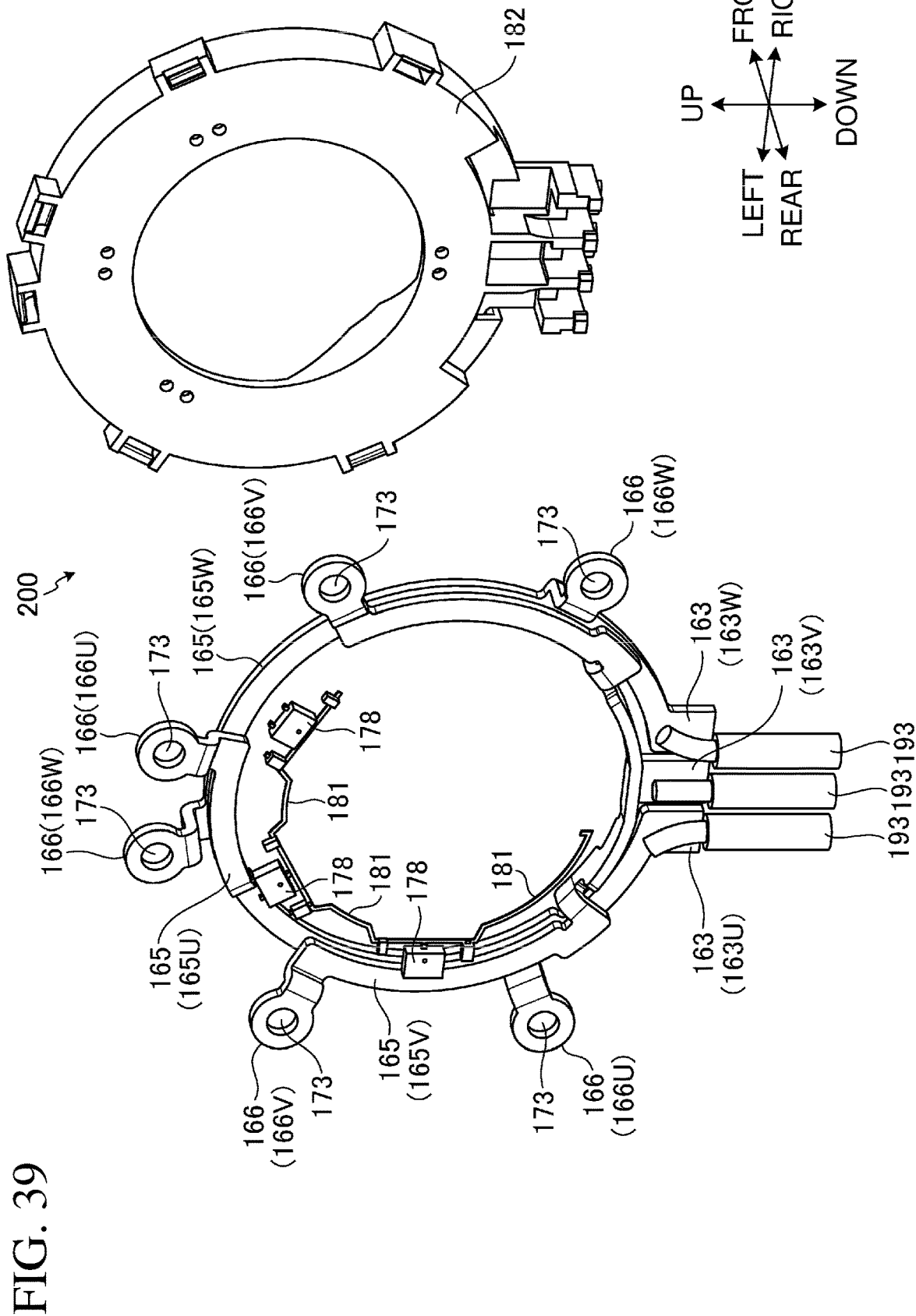
FIG. 39 is an exploded rear perspective view of the busbar unit in the second embodiment.

FIG. 38 is an exploded front perspective view of the busbar unit 200 in the present embodiment. FIG. 39 is an exploded rear perspective view of the busbar unit 200 in the present embodiment. The busbar unit 200 includes external terminals 163, the short-circuiting members 165, connector terminals 166, the rotation sensors 178, signal terminals 180, signal lines 181, and an insulating member 182. The external terminals 163, the short-circuiting members 165, and the connector terminals 166 are integral with one another.

A driving current from the battery pack 19 is supplied to the external terminals 163 through power supply lines 193. The busbar unit 200 includes three external terminals 163. The external terminals 163 include external terminals 163U, 163V, and 163W. A U-phase driving current is supplied to the external terminal 163U. A V-phase driving current is supplied to the external terminal 163V. A W-phase driving current is supplied to the external terminal 163W.

The short-circuiting members 165 each short-circuit a pair of coils 135. The short-circuiting members 165 each connect one external terminal 163 and a pair of connector terminals 166. The busbar unit 200 includes three short-circuiting members 165. The short-circuiting members 165 include short-circuiting members 165U, 165V, and 165W. The short-circuiting member 165U is connected to the external terminal 163U. The short-circuiting member 165V is connected to the external terminal 163V. The short-circuiting member 165W is connected to the external terminal 163W.

The connector terminals 166 include pairs of connector terminals 166U, 166V, and 166W. The pair of connector terminals 166U are connected to the short-circuiting member 165U. The pair of connector terminals 166V are connected to the short-circuiting member 165V. The pair of connector terminals 166W are connected to the short-circuiting member 165W. Each connector terminal 166 has an opening 173 to receive a screw 187.

The rotation sensors 178 detect rotation of the rotor 23. The busbar unit 200 includes three rotation sensors 178. Detection signals from the rotation sensors 178 are transmitted to the controller 9 through the signal terminals 180 and the signal lines 181.

The busbar unit 200 in the present embodiment includes an MID. The insulating member 182 is formed from a synthetic resin. The insulating member 182 is annular. The insulating member 182 covers the short-circuiting members 165, the rotation sensors 178, the signal terminals 180, and the signal lines 181. The short-circuiting members 165, the rotation sensors 178, the signal terminals 180, and the signal lines 181 are molded with the synthetic resin used for the insulating member 182. The short-circuiting members 165 and the rotation sensors 178 are integral with the insulating member 182. The insulating member 182 insulates the three short-circuiting members 165 from one another. The connector terminals 166 are located outward from the insulating member 182.

Figure 40:
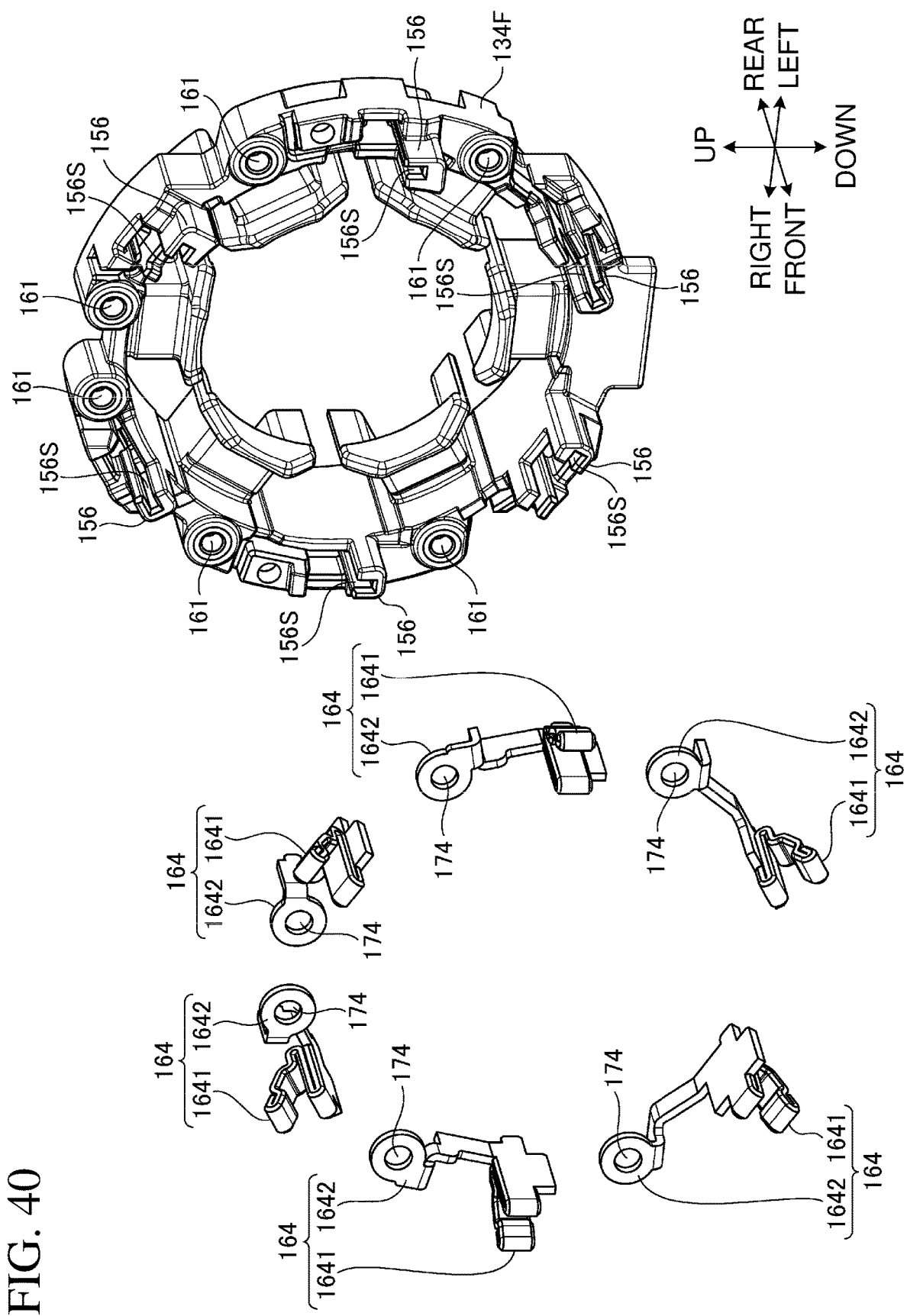
FIG. 40 is an exploded front perspective view of an insulator in the second embodiment.
Figure 41:
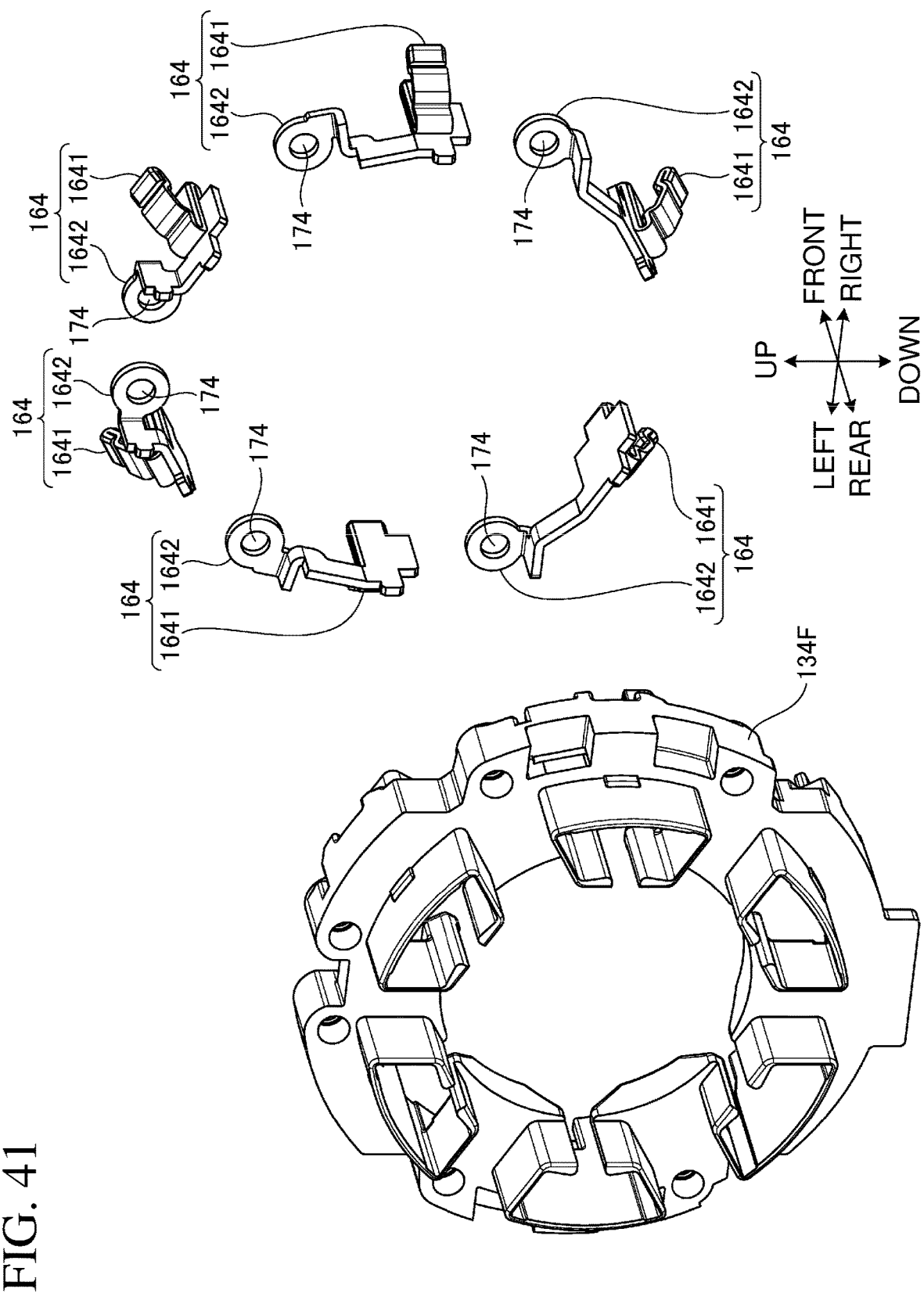
FIG. 41 is an exploded rear perspective view of the insulator in the second embodiment.

FIG. 40 is an exploded front perspective view of the front insulator 134F in the present embodiment. FIG. 41 is an exploded rear perspective view of the front insulator 134F in the present embodiment.

The front insulator 134F supports fuse terminals 164. Each fuse terminal 164 includes a fuse portion 1641 and a terminal portion 1642. Each fuse portion 1641 is connected to the corresponding connection wire 162. Each terminal portion 1642 is connected to the corresponding connector terminal 166. The multiple (six in the present embodiment)

fuse terminals 164 correspond one-to-one with the coils 135. Each terminal portion 1642 has an opening 174 to receive a screw 187.

The front insulator 134F includes screw holes 161 to receive the screws 187. The screw holes 161 are located in the front of the front insulator 134F. The front insulator 134F includes six screw holes 161.

The front insulator 134F includes wire supports 156. The wire supports 156 protrude frontward from the front of the front insulator 134F. The connection wires 162 are supported on the outer surfaces of the wire supports 156. Each wire support 156 includes a recess 156S to receive at least a part of the corresponding fuse portion 1641. In the present embodiment, each fuse portion 1641 is at least partially placed in the corresponding recess 156S. Each fuse portion 1641 is placed in the recess 156S in the wire support 156 to have the opening 174 in the terminal portion 1642 aligned with the screw hole 161.

The screws 187 fasten the busbar unit 200 and the front insulator 134F together. The connector terminals 166 in the busbar unit 200 are located between the terminal portions 1642 and the front surface of the front insulator 134F to have the openings 173 aligned with the respective holes 161 and openings 174. Each screw 187 is then received in the corresponding screw hole 161 through the opening 174 and the opening 173. The busbar unit 200 and the front insulator 134F are thus fastened together. Each fuse portion 1641 and the corresponding connection wire 162 are then welded together.

As described above, the short-circuiting members 165 and the rotation sensors 178 are integral with the insulating member 182 between them. This structure downsizes the motor assembly 106.

OTHER EMBODIMENTS

The electric work machine 1 according to the above embodiments is a vibration driver drill, which is an example of a power tool. The power tool is not limited to a vibration driver drill, and may be, for example, a driver drill, an angle drill, an impact driver, a grinder, a hammer, a hammer drill, a circular saw, or a reciprocating saw. The electric work machine 1 may be outdoor power equipment. Examples of outdoor power equipment include a chain saw, a hedge trimmer, a lawn mower, a mowing machine, and a blower.

In the above embodiments, the electric work machine is powered by the battery pack 19 attached to the battery mount. In some embodiments, the electric work machine may use utility power (alternating-current power supply).

REFERENCE SIGNS LIST 1 electric work machine
2 housing
3 rear cover
4 gear case
5 battery mount
6 motor assembly
7 power transmission
8 spindle
8C chuck unit
9 controller
10 trigger switch
11 forward-reverse switch lever
12 speed switch lever
13 mode change ring
14 change ring
15 lamp
16 motor compartment
17 grip
18 controller compartment
19 battery pack
20 motor
21 fan
22 sensor unit
22B sensor unit
22C sensor unit
23 rotor
24 stator
25 inlet
26 outlet
27 rotor core
27F end face
27R end face
27S outer surface
28 rotor shaft
29 permanent magnet
30 magnet slot
31 resin
32 recess
33 stator core
34 insulator
34B insulator
34C insulator
35 coil
35E wind end portion
35M middle portion
35S wind start portion
35U U-phase coil
35V V-phase coil
35W W-phase coil
36 busbar unit
37 outer cylinder
38 tooth
39 inner wall
40 protrusion
41 inner surface
42 outer surface
43 end face
43A end face
43B end face
43C end face
44 end face
44A end face
44B end face
44C end face
45 opposing surface
46 opposing surface
47 side surface
48 side surface
49 cover
50 cover
51 cover
52 cover
53 coil stopper
54 coil stopper
55 coil stopper
56 wire support
57 screw boss
58 joint
59 protrusion
60 protrusion
61 screw hole
62 connection wire 63 external terminal
63U external terminal
63V external terminal
63W external terminal
64 fuse terminal (terminal)
64U fuse terminal
64V fuse terminal
64W fuse terminal
65 short-circuiting member
65U short-circuiting member
65V short-circuiting member
65W short-circuiting member
66 insulating member
67 base
68 first screw boss
69 second screw boss
70 positioning pin
71 positioning recess
72 joint
72R recess
73 screw hole
74 opening
75 support
76 sensor board
77 connector
78 rotation sensor
79 plate
79B plate
79C plate
80 signal terminal
81 signal line
82 insulating member
82A first ridge
82B second ridge
83 rear surface
84 front surface
86 cable
86H holder
87 first screw
88 opening
89 positioning hole
90 first positioner
91 second positioner
92 second screw
93U power supply line
93V power supply line
93W power supply line
95 support area
96 fastening area
97 non-contact area
98 contact area
106 motor assembly
110 rib
111 rib
112 rib
113 rib
114 rib
133 stator core
134F front insulator
134R rear insulator
135 coil
156 wire support
156S recess
161 screw hole
162 connection wire
163 external terminal
163U external terminal
163V external terminal
163W external terminal
164 fuse terminal
165 short-circuiting member
165U short-circuiting member
165V short-circuiting member
165W short-circuiting member
166 connector terminal
166U connector terminal
166V connector terminal
166W connector terminal
173 opening
174 opening
178 rotation sensor
180 signal terminal
181 signal line
182 insulating member
187 screw
193 power supply line
200 busbar unit
491 cover area
492 cover area
493 cover area
494 cover area
495 cover area
501 cover area
502 cover area
503 cover area
504 cover area
505 cover area
506 cover area
620 wire
831 first surface
831A first surface
831B first surface
831C first surface
832 second surface
832A second surface
832B second surface
832C second surface
833 third surface
833A third surface
833B third surface
841 fourth surface
841A fourth surface
841B fourth surface
841C fourth surface
842 fifth surface
842A fifth surface
842B fifth surface
842C fifth surface
843 sixth surface
843A sixth surface
843B sixth surface
851 connecting surface
852 slope
853 connecting surface
854 connecting surface
855 connecting surface
856 connecting surface
857 slope
858 connecting surface
859 connecting surface
860 connecting surface
861 opening
1641 fuse portion
1642 terminal portion Da distance
Db distance
Dc distance
Dd distance
De distance

What is claimed is:

1. An electric work machine, comprising:
a motor including a stator and a rotor, the rotor being rotatable about a rotation axis; and
a sensor board including
a rotation sensor configured to detect rotation of the rotor, and
a plate supporting the rotation sensor, the plate including
a first surface facing an end face of the rotor in an axial direction parallel to the rotation axis, the first surface including a support area receiving the rotation sensor that faces the end face of the rotor, and
a second surface facing at least a part of the stator, wherein in the axial direction, a distance between the support area and the end face of the rotor is shorter than a distance between at least a part of the second surface and the end face of the rotor.

2. The electric work machine according to claim 1, wherein
the second surface includes a fastening area fastened to at least a part of the stator.

3. The electric work machine according to claim 2, wherein
the second surface includes a non-contact area at least partially surrounding the fastening area, and
in the axial direction, the distance between the support area and the end face of the rotor is shorter than a distance between the non-contact area and the end face of the rotor.

4. The electric work machine according to claim 2, wherein
in the axial direction, the distance between the support area and the end face of the rotor is shorter than a distance between the fastening area and the end face of the rotor.

5. The electric work machine according to claim 2, wherein
in the axial direction, the distance between the support area and the end face of the rotor is longer than a distance between the fastening area and the end face of the rotor.

6. The electric work machine according to claim 2, wherein
the stator includes
a stator core surrounding the rotor,
an insulator fixed to the stator core,
a plurality of coils fixed to the insulator,
a short-circuiting member configured to short-circuit a pair of the coils, and
an insulating member supporting the short-circuiting member, and
the fastening area is fastened to the insulating member.

7. The electric work machine according to claim 6, wherein
the plate surrounds the rotation axis,
he insulating member surrounds the rotation axis, and
the plate includes at least a part radially inward from the insulating member.

8. The electric work machine according to claim 7, further comprising:
a first screw fastening the fastening area and the insulating member together.

9. The electric work machine according to claim 8, wherein
the insulating member includes
an annular base, and
a first screw boss protruding radially inward from an inner edge of the base, and
the first screw is received in the first screw boss.

10. The electric work machine according to claim 9, further comprising:
a first positioner positioning the plate and the insulating member.

11. The electric work machine according to claim 10, wherein
the insulating member includes a positioning pin radially inward from the base, and the positioning pin protrudes in the axial direction,
the plate includes a positioning hole receiving the positioning pin, and
the first positioner includes the positioning pin and the positioning hole.

12. The electric work machine according to claim 7, further comprising:
a second screw fastening the insulating member and the insulator together.

13. The electric work machine according to claim 12, wherein
the insulating member includes
an annular base, and
a second screw boss protruding radially outward from an outer edge of the base,
wherein the second screw is received in the insulator through the second screw boss.

14. The electric work machine according to claim 13, further comprising:
a second positioner positioning the insulating member and the insulator.

15. The electric work machine according to claim 14, wherein
the insulating member includes a positioning recess radially outward from the base and recessed in the axial direction,
the insulator includes a positioning protrusion in the positioning recess, and
the second positioner includes the positioning recess and the positioning protrusion.

16. The electric work machine according to claim 6, wherein
the insulator includes coil stoppers radially inward from the coils, and
the rotation sensor and at least a part of each of the coil stoppers overlap in a radial direction relative to the rotation axis.

17. The electric work machine according to claim 16, wherein
the rotation sensor is radially inward from the coil stopper.

18. The electric work machine according to claim 6, wherein
in the axial direction, a distance between the rotation sensor and the end face of the rotor is shorter than a distance between the rotation sensor and an end face of the stator core.

19. The electric work machine according to claim 1, wherein
the rotor includes
a rotor core, and
a permanent magnet supported by the rotor core, and
the end face of the rotor includes the end face of the rotor core.

* * * * *